(12) United States Patent
Policicchio

(10) Patent No.: US 11,903,542 B2
(45) Date of Patent: Feb. 20, 2024

(54) CLEANING ARTICLE WITH DOUBLE BONDED TOW TUFTS

(71) Applicant: The Procter & Gamble Company, Cincinnati, OH (US)

(72) Inventor: Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 344 days.

(21) Appl. No.: 15/943,739

(22) Filed: Apr. 3, 2018

(65) Prior Publication Data

US 2019/0298140 A1     Oct. 3, 2019

(51) Int. Cl.
| | |
|---|---|
| *A47L 13/16* | (2006.01) |
| *D04H 11/00* | (2006.01) |
| *D04H 1/435* | (2012.01) |
| *A47L 13/38* | (2006.01) |
| *B32B 5/02* | (2006.01) |
| *A47L 13/20* | (2006.01) |

(52) U.S. Cl.
CPC ............... *A47L 13/16* (2013.01); *A47L 13/38* (2013.01); *D04H 1/435* (2013.01); *A47L 13/20* (2013.01); *B32B 5/022* (2013.01); *D04H 11/00* (2013.01)

(58) Field of Classification Search
CPC .......... A47L 13/16; A47L 13/20; A47L 13/38; Y10T 428/23907; Y10T 428/23929; Y10T 428/23936; B32B 3/02; B32B 3/10; B32B 3/26; B32B 3/263; B32B 3/266; B32B 2432/00; B32B 5/12; B32B 5/26; B32B 5/266; B32B 5/267; B32B 7/05; D04H 11/00

See application file for complete search history.

(56) References Cited

U.S. PATENT DOCUMENTS

| | | |
|---|---|---|
| 823,725 A | 6/1906 | Hayden |
| 4,145,787 A | 3/1979 | Bastian |
| 5,691,035 A | 11/1997 | Chappell et al. |
| 6,143,393 A | 11/2000 | Abe et al. |
| 6,241,835 B1 | 6/2001 | Abe et al. |
| 6,245,413 B1 | 6/2001 | Kenmochi et al. |
| 6,319,593 B1 | 11/2001 | Kenmochi et al. |
| 6,329,308 B1 | 12/2001 | Kenmochi et al. |
| 6,550,092 B1 | 4/2003 | Brown et al. |

(Continued)

FOREIGN PATENT DOCUMENTS

| | | |
|---|---|---|
| EP | 0923902 A3 | 11/1999 |
| JP | 2000316772 A | 11/2000 |

(Continued)

OTHER PUBLICATIONS

U.S. Appl. No. 15/943,740, filed Apr. 3, 2018, Policicchio.

(Continued)

*Primary Examiner* — Cheryl Juska
(74) *Attorney, Agent, or Firm* — Gary J. Foose

(57) ABSTRACT

A cleaning article defining an XY plane and a Z direction perpendicular to the plane. The cleaning article has discrete tufts of tow fibers disposed on a carrier sheet. The discrete tufts have bond lines external to the tufts. The bond lines interrupt the Z-direction thickness of the tufts, to provide channels for improved collection and retention of debris from a target surface.

5 Claims, 61 Drawing Sheets

(56) References Cited

U.S. PATENT DOCUMENTS

| | | |
|---|---|---|
| 6,554,937 B1 | 4/2003 | Kenmochi et al. |
| 6,774,070 B1 | 8/2004 | Kenmochi et al. |
| 6,777,064 B1 | 8/2004 | Brown et al. |
| 6,797,357 B2 | 9/2004 | Fereshtehkhou et al. |
| 6,813,801 B2 | 11/2004 | Tanaka et al. |
| 6,936,330 B2 | 8/2005 | Fereshtehkhou et al. |
| 6,984,615 B2 | 1/2006 | Kenmochi et al. |
| 7,003,856 B2 | 2/2006 | Hayashi et al. |
| 7,291,359 B2 | 11/2007 | Haskett et al. |
| 7,302,729 B2 | 12/2007 | Tanaka |
| 7,386,907 B2 | 6/2008 | Otsuka et al. |
| 7,560,398 B2 | 7/2009 | Zillig et al. |
| 7,566,671 B2 | 7/2009 | Hoadley et al. |
| 7,682,686 B2 | 3/2010 | Curro et al. |
| 7,712,178 B2 | 5/2010 | Yamada |
| 7,779,502 B2 | 8/2010 | Fujiwara et al. |
| 7,786,030 B2 | 8/2010 | Tsuchiya |
| 7,803,726 B2 | 9/2010 | Policicchio et al. |
| 7,838,099 B2 | 11/2010 | Curro et al. |
| 7,870,635 B2 | 1/2011 | Yamada |
| 7,937,797 B2 | 5/2011 | Tsuchiya et al. |
| 8,075,977 B2 | 12/2011 | Curro et al. |
| 8,146,197 B2 | 4/2012 | Yamada |
| 8,151,402 B2 | 4/2012 | Takabayashi et al. |
| 8,161,594 B2 | 4/2012 | Policicchio et al. |
| 8,186,001 B2 | 5/2012 | Tsuchiya et al. |
| 8,225,453 B2 | 7/2012 | Yamada |
| 8,245,349 B2 | 8/2012 | Tsuchiya et al. |
| 8,528,151 B2 | 9/2013 | Przepasniak |
| 8,536,074 B2 | 9/2013 | Fereshtehkhou et al. |
| 8,617,685 B2 | 12/2013 | Yamada |
| 8,621,704 B2* | 1/2014 | Tsuchiya ............... A47L 13/38 15/229.3 |
| 8,646,144 B2 | 2/2014 | Wada et al. |
| 8,752,232 B2 | 6/2014 | Otsuka et al. |
| 8,756,746 B2 | 6/2014 | Policicchio |
| 8,763,197 B2 | 7/2014 | Policicchio et al. |
| 8,793,832 B2 | 8/2014 | Yamada |
| 8,851,776 B2 | 10/2014 | Schwarz et al. |
| 9,113,768 B2 | 8/2015 | Wada et al. |
| 9,198,553 B2 | 12/2015 | Policicchio |
| 9,204,775 B2 | 12/2015 | Pung et al. |
| 9,296,176 B2 | 3/2016 | Escaffre et al. |
| 9,339,165 B2 | 5/2016 | Vetter et al. |
| 10,722,091 B2* | 7/2020 | Policicchio ........... A47L 13/255 |
| 10,730,081 B2* | 8/2020 | Policicchio ............... B32B 7/04 |
| 11,045,061 B2* | 6/2021 | Policicchio ............ B32B 27/32 |
| 11,253,128 B2* | 2/2022 | Policicchio ............ A47L 13/16 |
| 2002/0065012 A1 | 5/2002 | Takabayashi et al. |
| 2002/0148061 A1 | 10/2002 | Tanaka |
| 2006/0171764 A1 | 8/2006 | Hoadley |
| 2006/0185108 A1* | 8/2006 | Hoadley ................ A47L 13/20 15/209.1 |
| 2008/0028560 A1 | 2/2008 | Policicchio et al. |
| 2008/0235890 A1* | 10/2008 | Tsuchiya ................ A47L 13/20 15/208 |
| 2009/0007355 A1* | 1/2009 | Policicchio ............ A47L 13/38 15/145 |
| 2010/0015383 A1* | 1/2010 | Yamada ................ A47L 13/20 428/91 |
| 2010/0088837 A1* | 4/2010 | Wada ...................... A47L 13/38 15/209.1 |
| 2010/0154156 A1* | 6/2010 | Takabayashi .......... D21H 27/30 15/209.1 |
| 2011/0088189 A1 | 4/2011 | Wada |
| 2011/0277258 A1 | 11/2011 | Otsuka |
| 2012/0297563 A1* | 11/2012 | Tsuchiya ................ B60S 3/045 15/229.3 |
| 2012/0311803 A1 | 12/2012 | Yamada |
| 2014/0182767 A1* | 7/2014 | Goto ...................... B32B 37/04 156/64 |
| 2014/0187406 A1* | 7/2014 | Matsumoto ......... B32B 37/0076 493/374 |
| 2015/0336366 A1* | 11/2015 | Matsumoto ............ A47L 13/38 156/229 |
| 2015/0351602 A1 | 12/2015 | Goto |
| 2015/0374196 A1* | 12/2015 | Suda ...................... A47L 13/12 15/114 |
| 2017/0360271 A1* | 12/2017 | Policicchio ............ A47L 13/16 |
| 2018/0042439 A1 | 2/2018 | Policicchio |
| 2019/0075993 A1* | 3/2019 | Policicchio ............ A47L 13/20 |
| 2019/0075994 A1* | 3/2019 | Policicchio ............ A47L 13/20 |
| 2019/0075995 A1 | 3/2019 | Policicchio |
| 2019/0076886 A1* | 3/2019 | Policicchio ............... B32B 7/04 |
| 2019/0104909 A1* | 4/2019 | Policicchio ........... A47L 13/255 |
| 2019/0298140 A1* | 10/2019 | Policicchio ............ A47L 13/38 |
| 2019/0298141 A1* | 10/2019 | Policicchio ............ A47L 13/44 |
| 2019/0298142 A1 | 10/2019 | Policicchio |
| 2019/0343365 A1* | 11/2019 | Tsuchiya ................ A47L 13/20 |

FOREIGN PATENT DOCUMENTS

| | | |
|---|---|---|
| WO | 2008146821 A1 | 12/2008 |
| WO | WO2009084500 A1 | 7/2009 |

OTHER PUBLICATIONS

U.S. Appl. No. 15/943,741, filed Apr. 3, 2018, Policicchio.
PCT Search Report for appl. No. PCT/US2019/023571, dated Jun. 4, 2019, 15 pages.
PCT Search Report for appl. No. PCT/US2019/023574, dated Jun. 19, 2019, 16 pages.
PCT Search Report for appl. No. PCT/US2019/023578, dated Jun. 17, 2019, 18 pages.
All Office Actions, U.S. Appl. No. 15/943,740.
All Office Actions, U.S. Appl. No. 15/943,741.
All Office Actions; U.S. Appl. No. 17/743,918, filed May 13, 2022.
Unpublished U.S. Appl. No. 17/743,918, filed May 13, 2022, to Policicchio Nicola John (POLIC/NJ) et al.

* cited by examiner

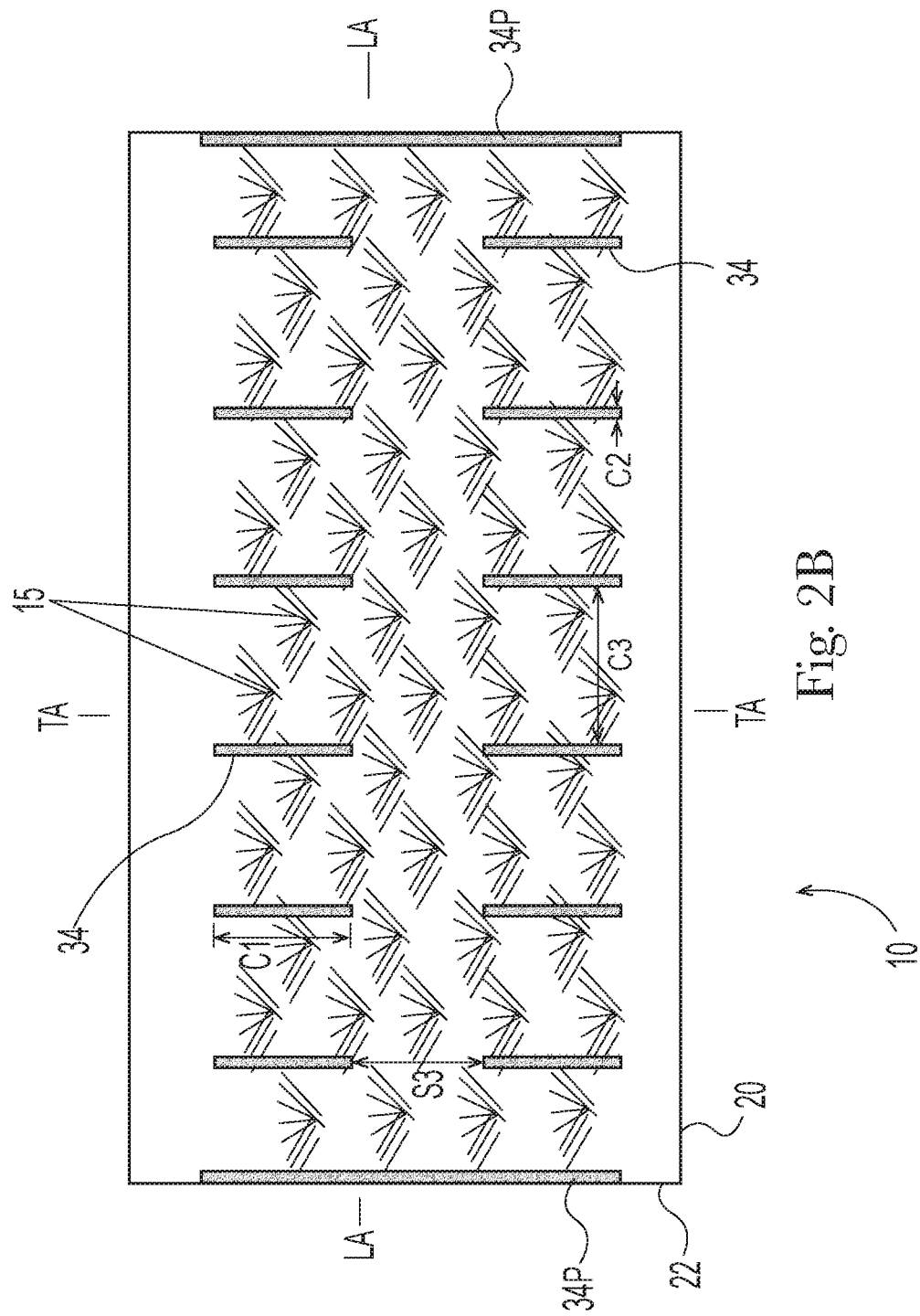

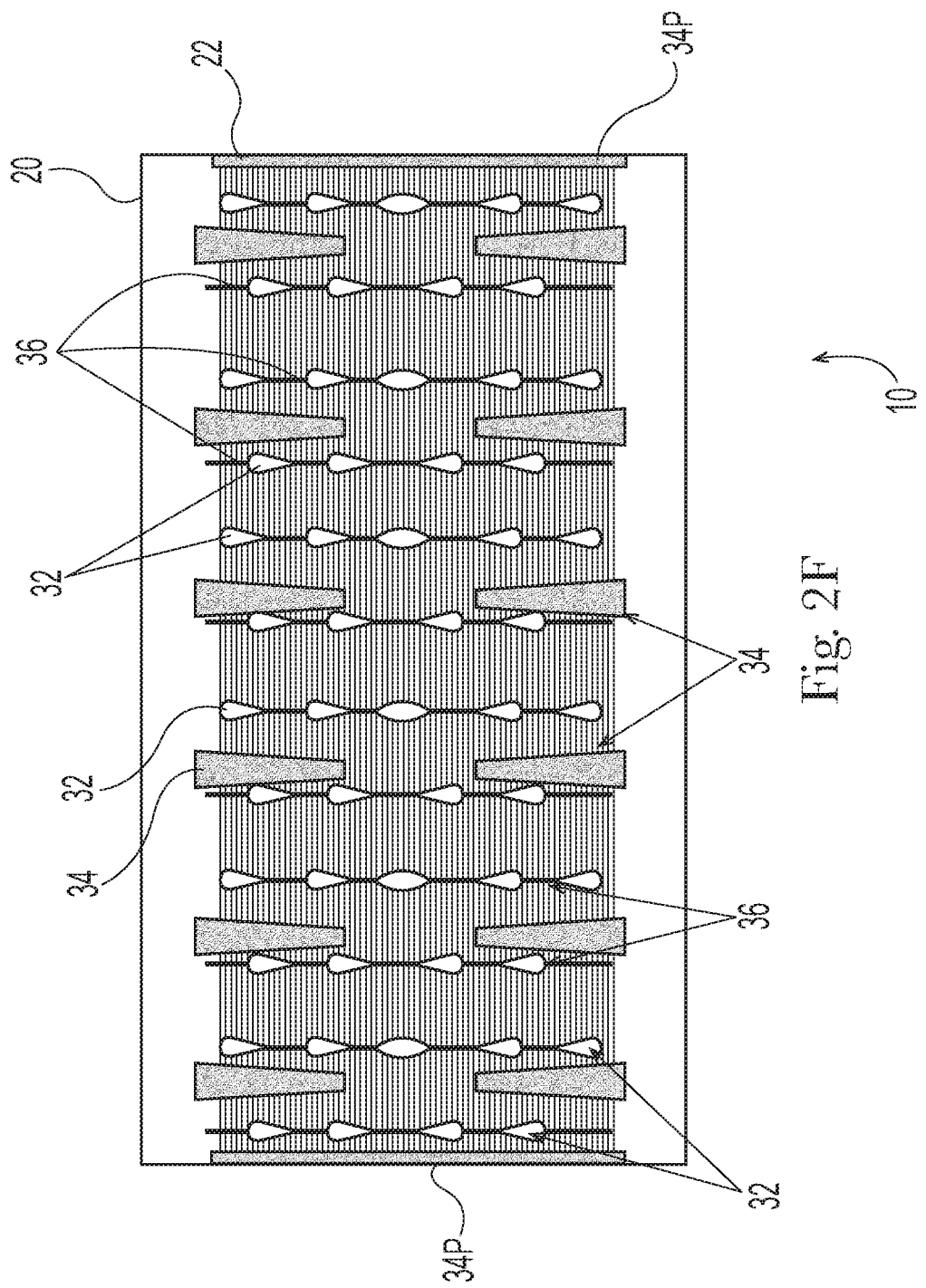

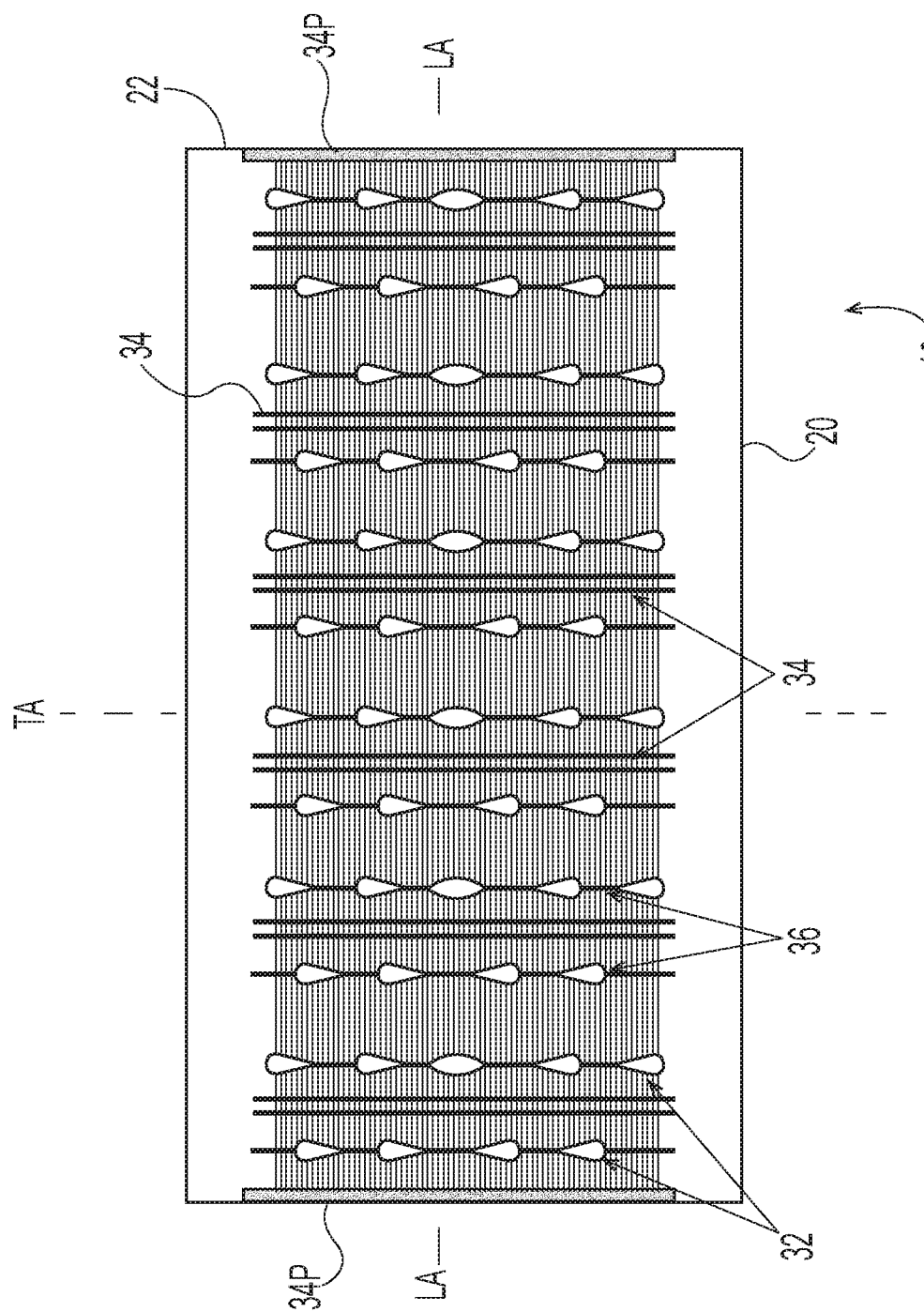

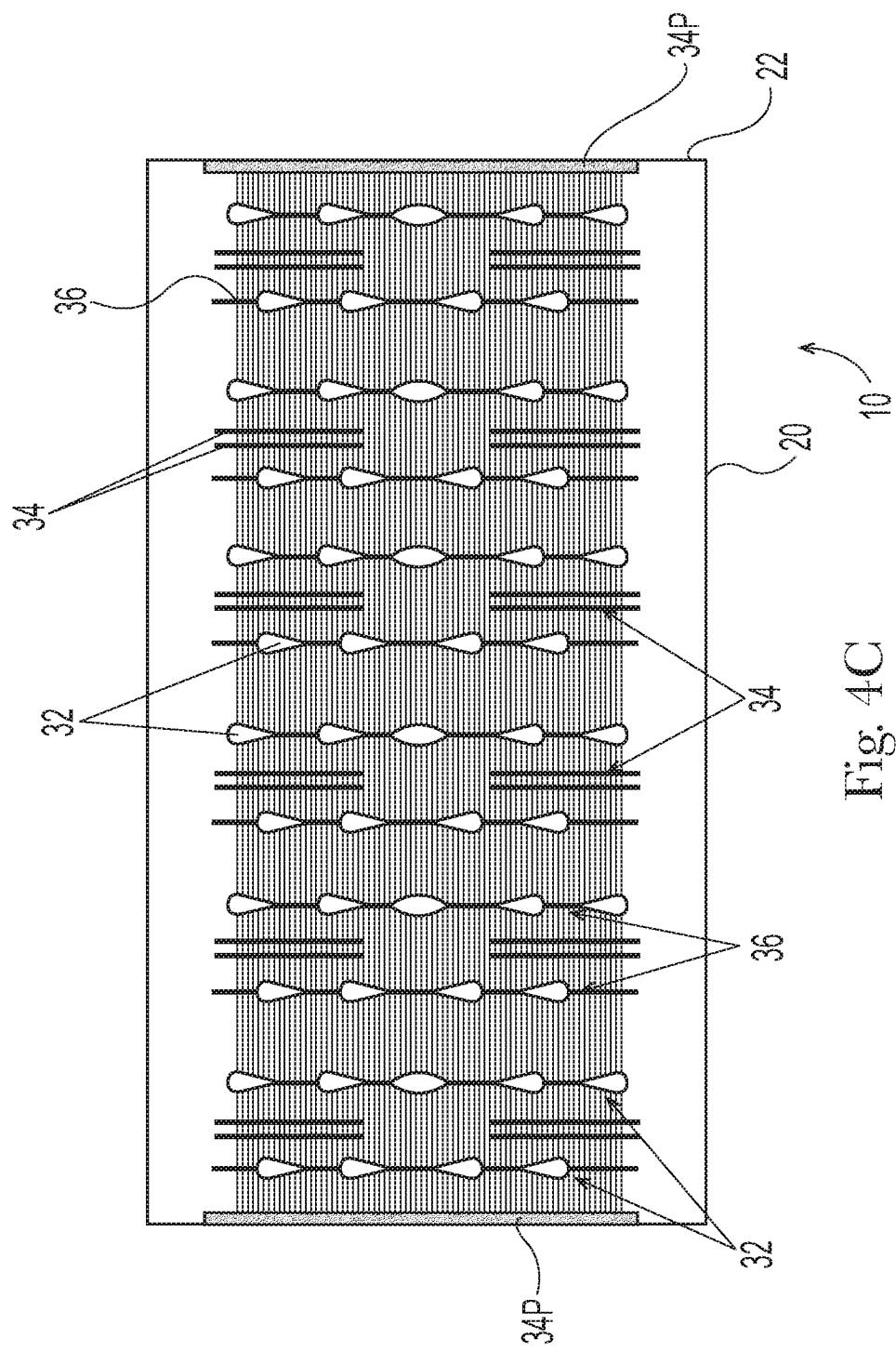

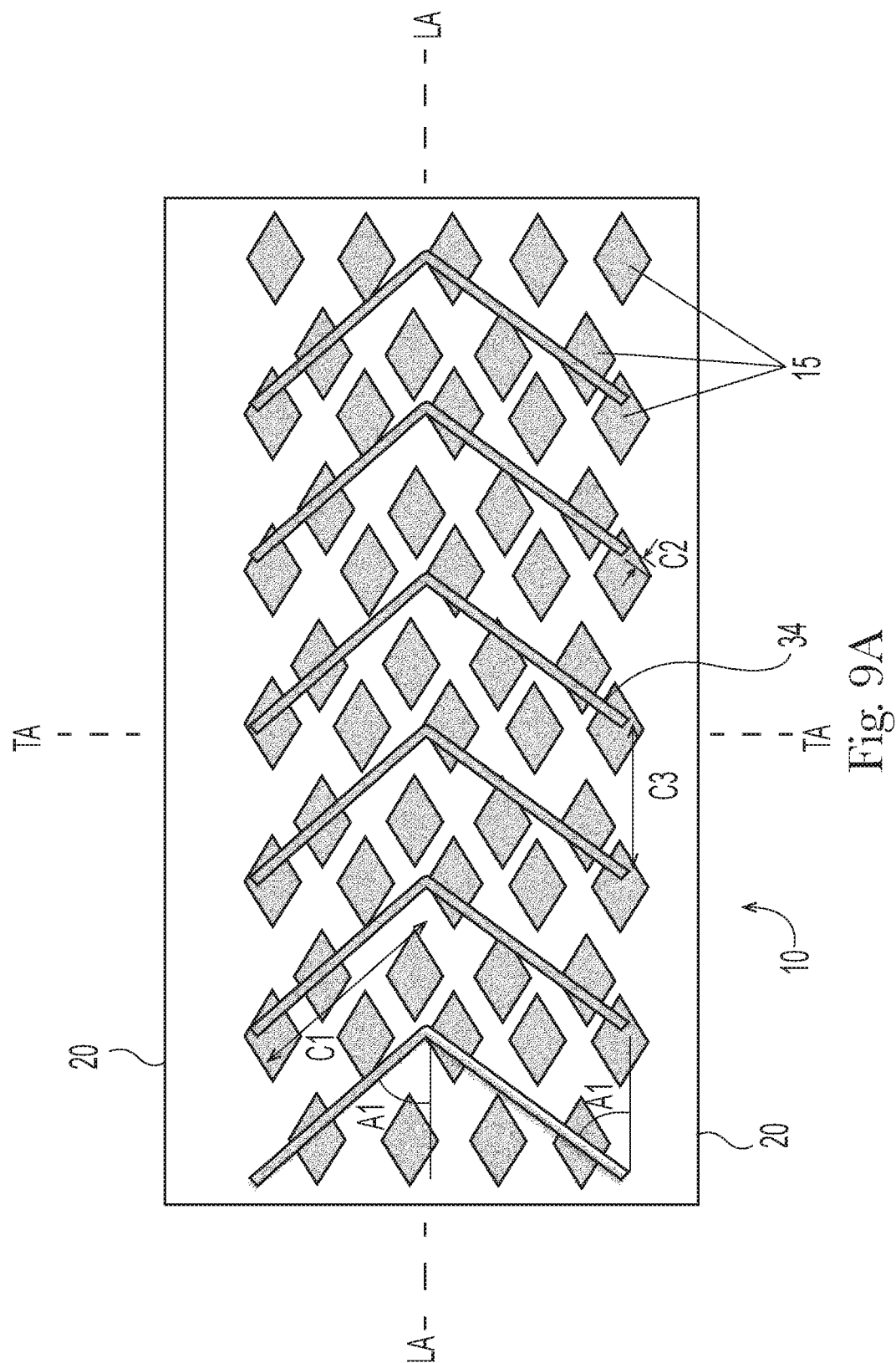

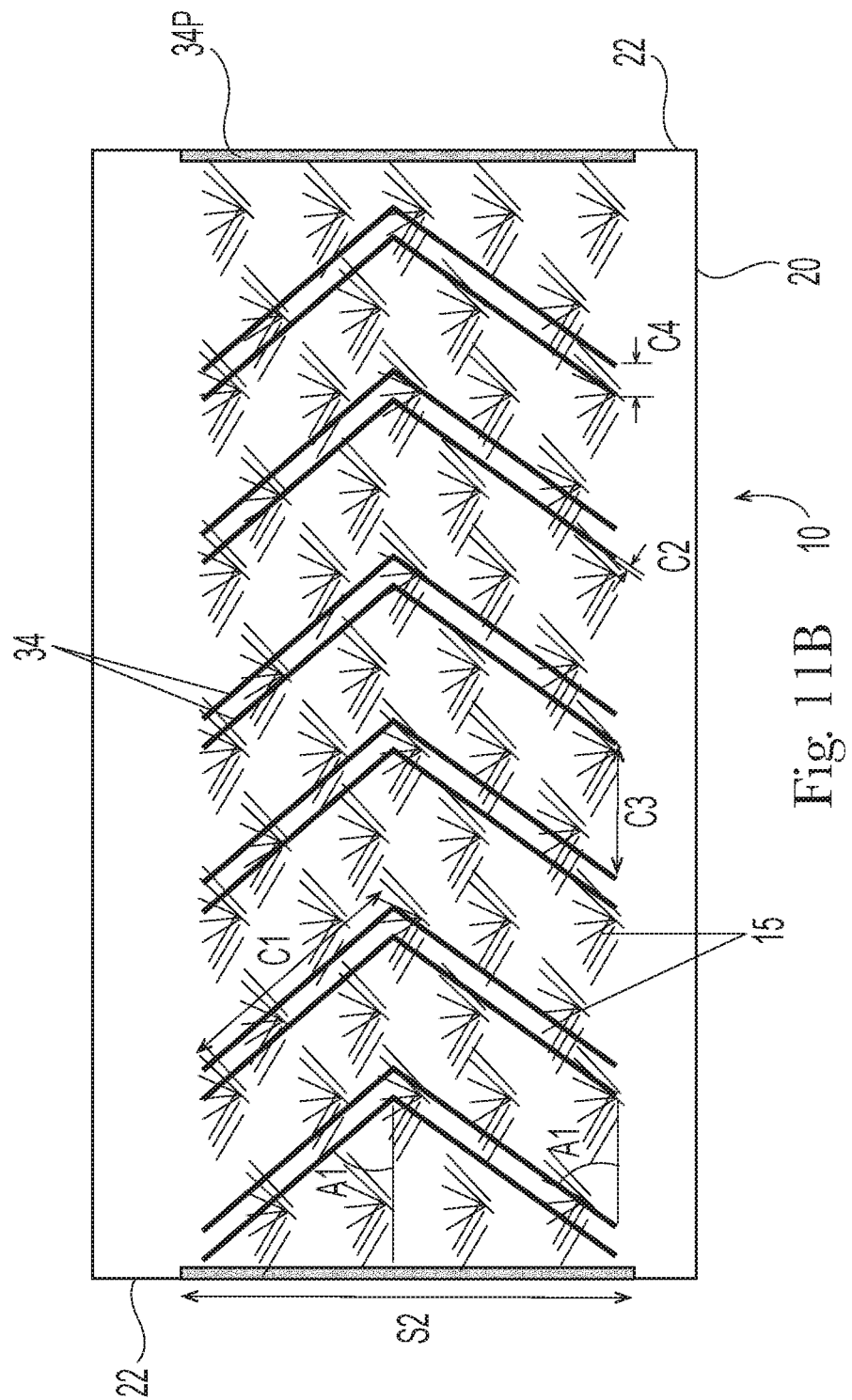

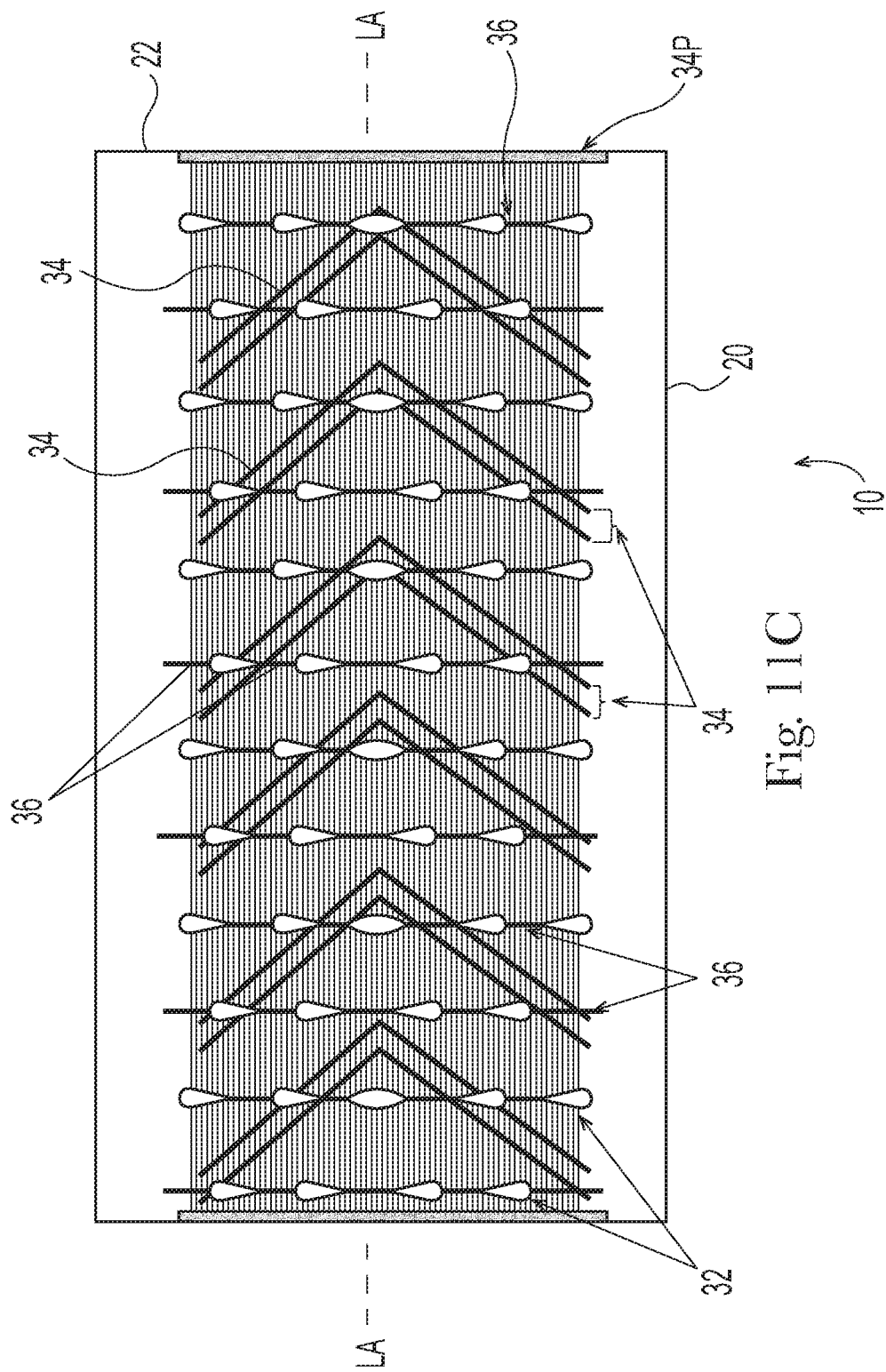

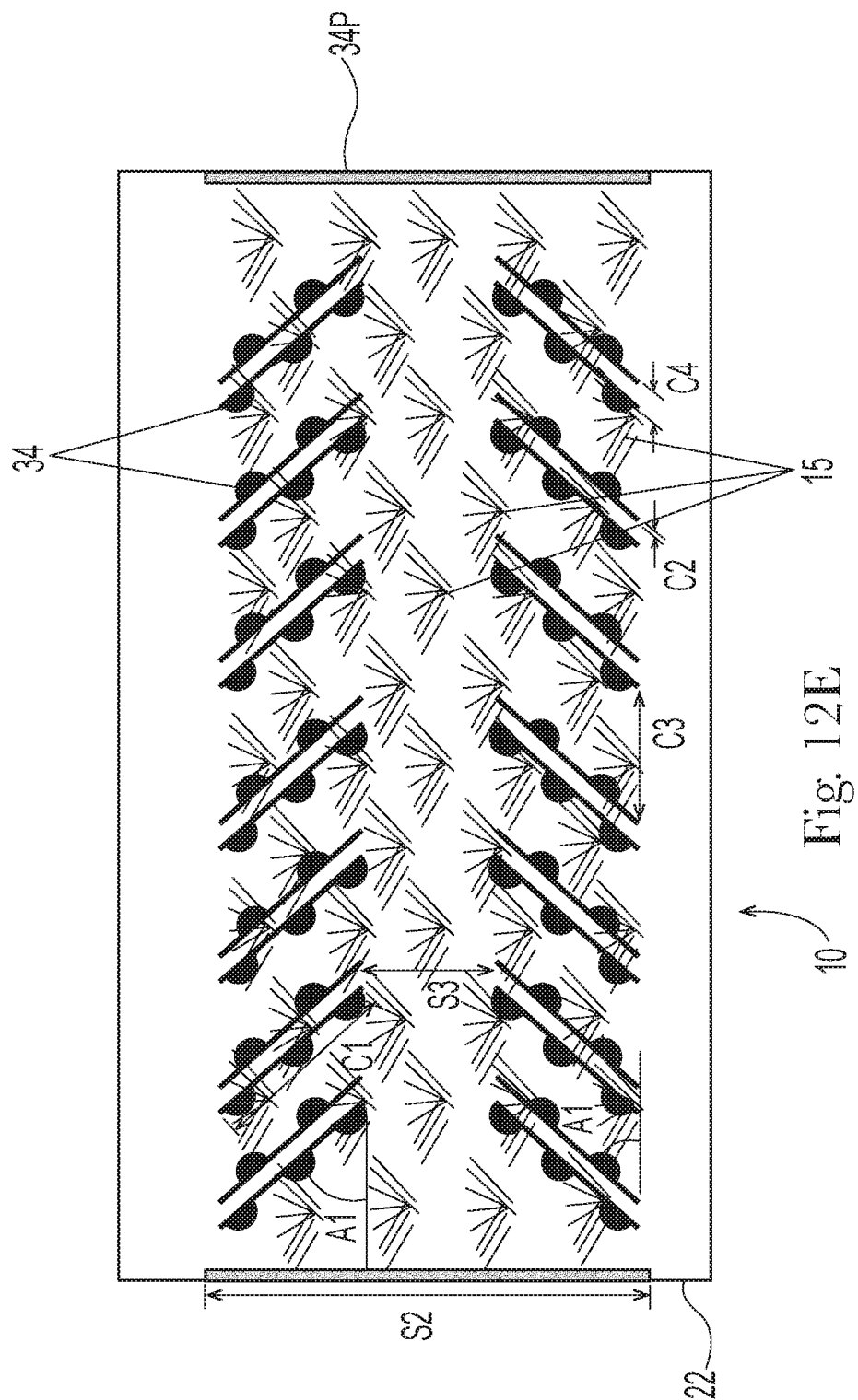

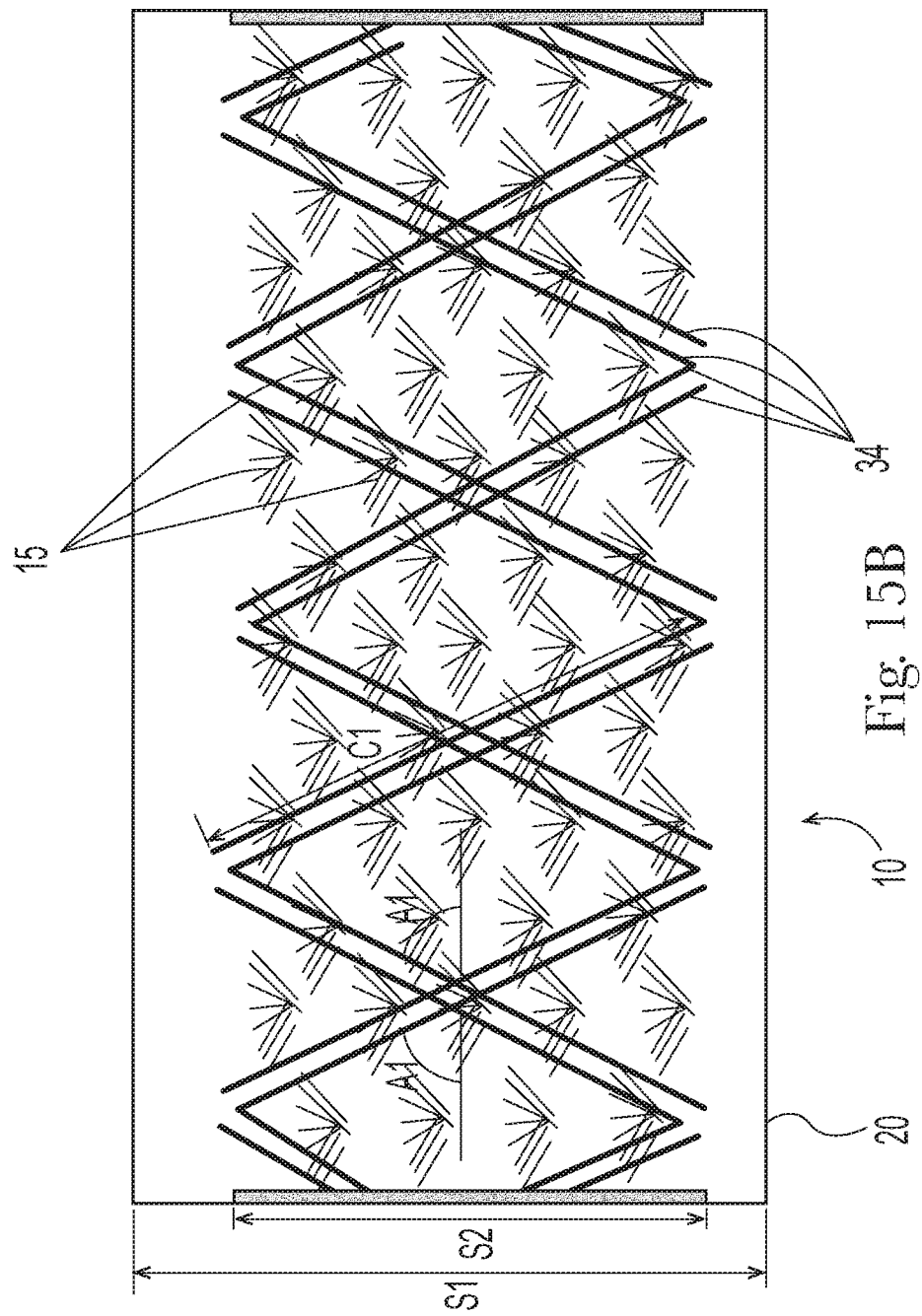

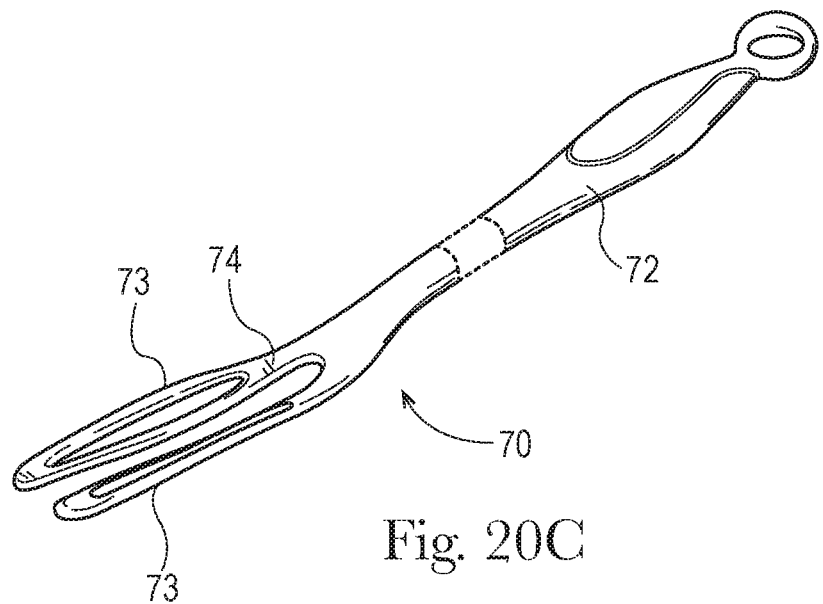
Fig. 20C
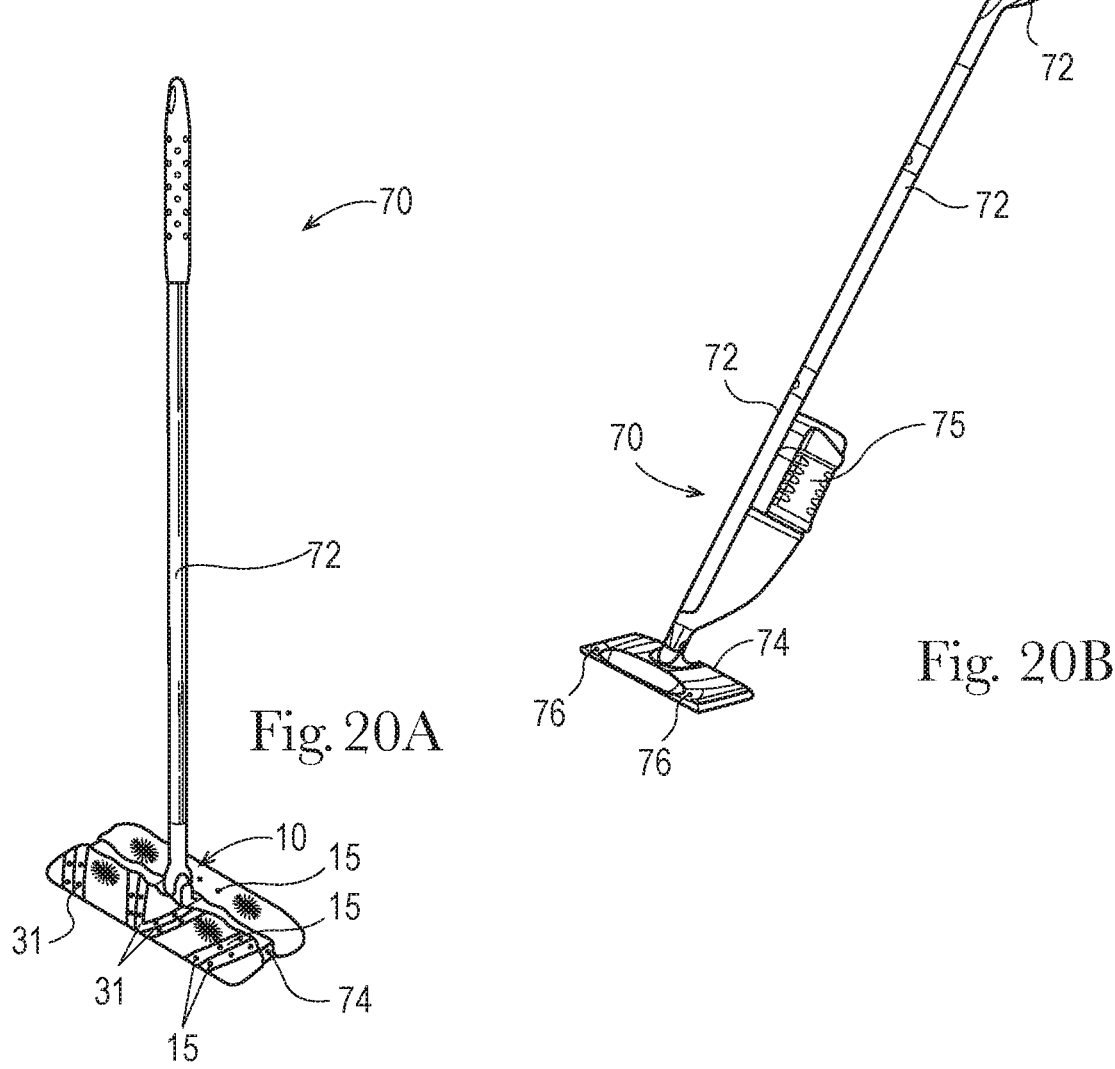
Fig. 20B
Fig. 20A

CLEANING ARTICLE WITH DOUBLE BONDED TOW TUFTS

FIELD OF THE INVENTION

The present invention relates to cleaning articles having tufts of tow fibers for cleaning.

BACKGROUND OF THE INVENTION

Various cleaning articles have been created for dusting and light cleaning. For example, cloth rags and paper towels used dry or wetted with polishing and cleaning compositions have been used on relatively flat surfaces such as countertops, showers, sinks and floors. Laminiferous wipes have been proposed, as disclosed in U.S. Pat. No. 9,296,176. But, rags, wipes, and paper towels are problematic for reasons such as hygiene (the user's hands may touch chemicals, dirt or the surface during cleaning), reach (it may be difficult to insert the user's hand with the rag, wipe or paper towel into hard-to-reach places) and inconvenience (cleaning between closely-spaced articles typically requires moving the articles).

To overcome the problems associated with using rags and paper towels, various reusable dust gathering devices using felt and hair have been utilized for more than a century, as illustrated by U.S. Pat. No. 823,725 issued in 1906 to Hayden and using yarns as illustrated in U.S. Pat. No. 4,145,787. To address the problems with reusable dust gathering devices, disposable cleaning articles have been developed which have limited re-usability. These disposable cleaning articles may include synthetic fiber tufts, called tow fibers, attached to a sheet as shown in US Application 2006/0171764; U.S. Pat. Nos. 6,143,393; 6,241,835; 6,319, 593; 6,329,308; 6,554,937; 6,774,070; 6,813,801; 6,830, 801; 6,984,615; 7,003,856; 7,566,671; 7,712,178; 7,779, 502; 7,870,635; 7,937,797; 8,146,197; 8,151,402; 8,161, 594, 8,186,001; 8,225,453; 8,245,349; 8,646,144; 8,528, 151; 8,617,685; 8,646,144; 8,752,232; 8,756,746; 8,763, 197; 8,793,832; 9,113,768; 9,198,553 and in commonly assigned U.S. Pat. No. 8,075,977.

Disposable dusters having tow fibers may provide for wet cleaning as disclosed in U.S. Pat. No. 7,566,671 and in commonly assigned U.S. Pat. No. 7,803,726 and commonly assigned US Application 2008/0028560. But tow fibers may become matted when wet and not be suitable for cleaning a large or heavily wetted surface, such as a floor. Thus, dusters may not suitable for cleaning extremely large or heavily soiled surfaces.

Thus various sheets have been proposed for cleaning larger target surfaces, such as floors. Webs with elastic behavior have been proposed in commonly assigned U.S. Pat. No. 5,691,035. Sheets with recesses have also been proposed, as disclosed in U.S. Pat. Nos. 6,245,413; and 7,386,907. Sheets with cavities have been proposed, as disclosed in U.S. Pat. No. 6,550,092. An adhesive cleaning sheet is proposed in U.S. Pat. No. 7,291,359. Tufts are taught in commonly assigned U.S. Pat. Nos. 7,682,686, 7,838,099 and/or 8,075,977. Yet other attempts use coatings of wax and/or oil. Coatings, such as wax and oil are generally disclosed in U.S. Pat. Nos. 6,550,092; 6,777,064; 6,797,357; 6,936,330; 6,984,615; 7,386,907; 7,560,398; 7,786,030; 8,536,074; 9,204,775 and 9,339,165. Specific amphiphilic coatings are disclosed in U.S. Pat. No. 8,851,776.

Some of the prior art attempted to focus on debris as simply large and small, based upon the size of the debris intended to be collected. But these teachings do not always address the proper use of tow fibers to collect the range of debris commonly found when cleaning a floor. Prior art attempts to incorporate tow fibers into cleaning sheets did not account for such differences in volume and density. Higher density, granular debris, such as dirt, is not necessarily captured by tow fibers. Tow fibers which are spaced too far apart may not even come in contact with dense, granular debris, much less clean such debris from the surface. And tow fibers which are spaced too closely may not intercept and hold the more voluminous, lower density debris. Even if such debris is initially captured, prior art sheets have not addressed the problem of how to retain such debris by the sheet.

Accordingly, this invention addresses the problem of how to incorporate tow fibers into a hard surface cleaning article for capture and retention of the wide range of debris encountered in everyday cleaning by through the preferential treatment of tow tufts on a cleaning sheet.

SUMMARY OF THE INVENTION

The invention comprises a cleaning article bounded by edges, having a longitudinal axis and comprising a carrier sheet, and a plurality of discretely spaced tufts of tow fibers joined to the carrier sheet. The tufts have secondary bonds therethrough, creating channels for the accumulation of debris.

BRIEF DESCRIPTION OF THE DRAWINGS

In the figures, the bond lines and the footprint of the cleaning article are drawn to scale. The tufts of tow fibers are shown schematically. As used herein, the top view is the view of the cleaning article which faces towards and contacts the target surface. The bottom view is opposed to the top view and faces towards the head of a cleaning device when the cleaning article is attached thereto.

FIG. 2B is a top view of the cleaning article of FIG. 2A having discrete tufts represented with a common proximal end for each tuft.

FIG. 2F is a bottom plan view of the cleaning article of FIGS. 2D and 2E.

FIG. 3C is a bottom plan view of the cleaning article of FIGS. 3A and 3B.

FIG. 4C is a bottom plan view of the cleaning article of FIGS. 4A and 4B.

FIG. 9A is a top view of a cleaning article according to the present invention and having discrete tufts represented as diamonds, with continuous chevron secondary bonds oriented in the longitudinal direction.

FIG. 11B is a top view of the cleaning article of FIG. 11A having discrete tufts represented with a common proximal end for each tuft.

FIG. 11C is a bottom plan view of the cleaning article of FIGS. 11A and 11B.

FIG. 12E is a top view of the cleaning article of FIG. 12D having discrete tufts represented with a common proximal end for each tuft.

FIG. 15B is a top view of the cleaning article of FIG. 15A having discrete tufts represented with a common proximal end for each tuft.

FIG. 19A schematically shows accumulation of large and medium sized debris at the leading edge of the tufts.

FIG. 20A is a perspective view of a floor cleaning implement suitable for use with the claimed invention and having a cleaning article attachable thereto.

FIG. 20B is a perspective view of a floor cleaning implement suitable for use with the present invention and which sprays liquid cleanser on the floor.

FIG. 20C is a perspective view of a handle suitable for use with a duster type cleaning article according to the claimed invention.

DETAILED DESCRIPTION OF THE INVENTION

Figure 1A:
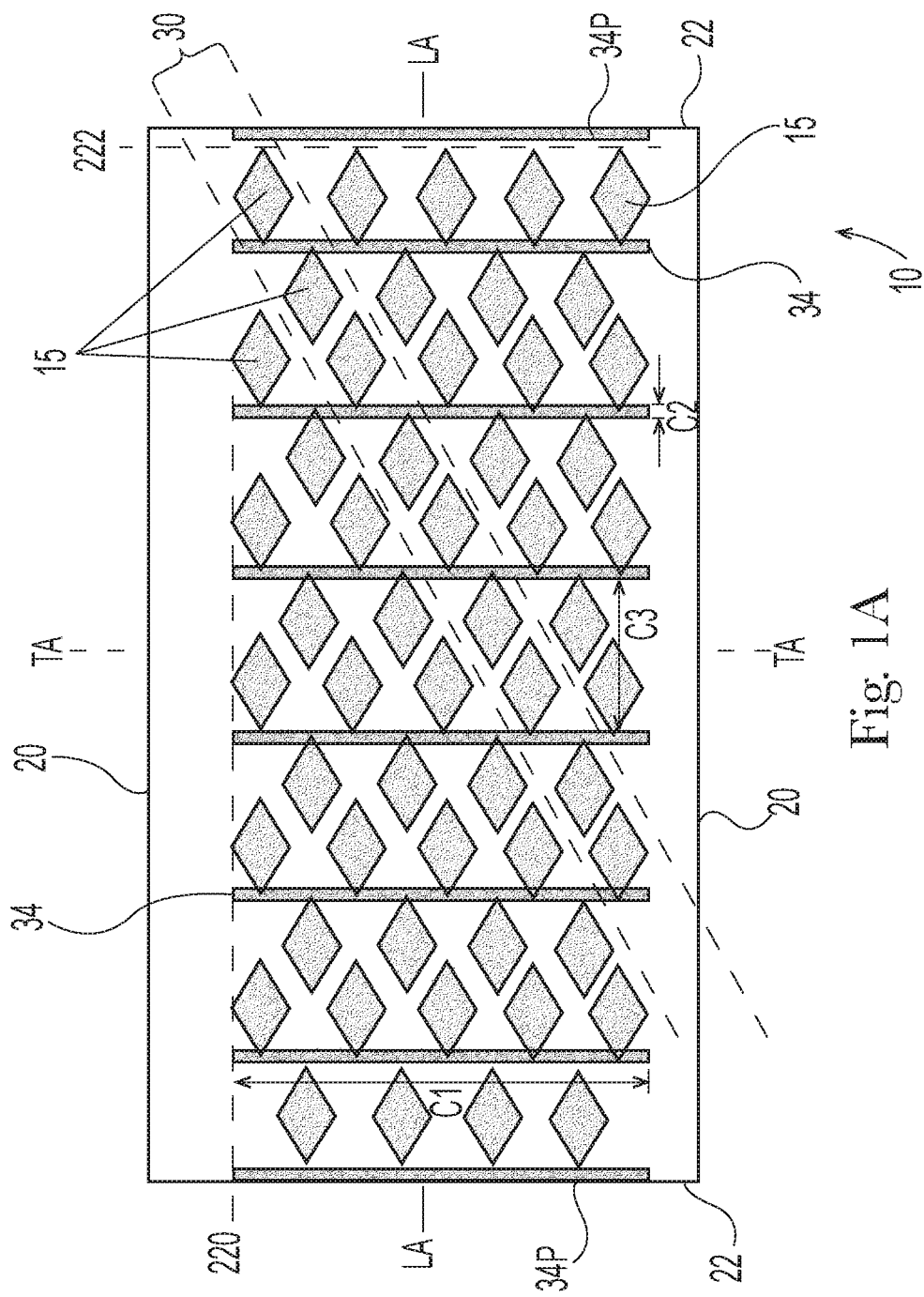
FIG. 1A is a top view of a cleaning article according to the present invention and having discrete tufts represented as diamonds, with constant width continuous secondary bonds oriented generally parallel to the transverse axis.

Referring generally to FIGS. 1A-17, the cleaning article 10 may be generally elongate, and rectangular, although other shapes are contemplated and feasible. The cleaning article 10 may comprise two or more components joined in a laminate form to provide cleaning article 10 suitable for floor cleaning. The cleaning article 10 may have a carrier sheet, which forms a chassis for attachment of other components thereto. The cleaning article 10 has a plurality of tufts 15 made of tow fibers. The tufts 15 may be disposed in rows 30 forming a grid or field of tufts 15. The tufts 15 are joined to the carrier sheet by a first plurality of primary bonds 32. A second plurality of secondary bonds 34 forms channels or groves through the tufts 15, to provide for accumulation of debris therein.

The cleaning article 10 may be disposable. By disposable it is meant that the cleaning article 10 may be used for one cleaning task, or generally for not more than several square meters, then discarded. In contrast, a reusable cleaning article 10 is laundered or otherwise restored after use.

As used herein, the cleaning article 10 according to the present invention, and particularly the carrier sheet thereof is macroscopically planar and defines an XY plane. The tufts 15 extend outwardly in the Z direction perpendicular to the XY plane. The cleaning article 10 may have a longitudinal axis LA defining a longitudinal direction and a transverse axis TA orthogonal thereto and defining a transverse direction, both axes LA, TA lying within the XY plane. The cleaning article 10, and respective components thereof, may have two longitudinal edges 20 parallel to the longitudinal axis LA and two transverse edges 22 parallel to the transverse axis TA. For example, the field of tufts 15 may define a longitudinal edge 220 and transverse edge 222 disposed within the carrier sheet.

The length of the cleaning article 10 is taken in the longitudinal direction. The width of the cleaning article 10 corresponds to the transverse direction perpendicular to the length direction and disposed within the plane of the sheet. The XY plane is defined as the plane defined by the cleaning article 10. The Z-direction of the cleaning article 10 is the direction perpendicular to the plane of the cleaning article 10. The thickness is defined as the dimension in the Z direction. The cleaning article 10 may have a length from 20 to 50 cm and a width of 10 to 30 cm. The cleaning article 10 may particularly be 30+/−2 cm long by 14+/−2 cm wide, as measured at the greatest dimensions, in order to fit the head 74 of a typical cleaning implement 70, as discussed below. Of course, one of skill will recognize that other shapes are feasible and within the scope of the present invention.

The cleaning article 10 may have an outwardly facing cleaning side and an attachment side opposed thereto. The cleaning article 10 is intended to be used dry, although wet cleaning is contemplated and within the scope of the present invention. The cleaning article 10 may also have an optional absorbent core for wet cleaning. An optional core may particularly have a width of 6.5+/−2 cm and a length of 26+/−2 cm.

More particularly, the cleaning article 10 may comprise a construction of at least one tow fiber tuft 15 and at least one carrier sheet. The tow fiber tuft 15 and carrier are joined in face-to-face relationship with at least one permanent primary bond 32 to form a laminate. The tow fiber tuft(s) 15 may be distended from and extend outwardly from the plane of the carrier sheet to provide a thickness in the z-direction. The tufts 15 may be disposed directly on a carrier sheet. Optionally, the tufts 15 may be bonded to a precursor sheet, which, in turn, is joined to a carrier sheet.

The carrier sheet may particularly comprise a synthetic nonwoven. A carrier sheet having synthetic fibers provides for convenient joining of the tow fibers thereto. Nonwovens include spun bonded, carded and airlaid materials, as are known in the art and made from synthetic fibers. A suitable nonwoven sheet may be made according to commonly assigned U.S. Pat. No. 6,797,357. The carrier sheet may optionally comprise a polyolefinic film, or a microfiber and be liquid pervious or impervious.

The carrier sheet may comprise cellulose, to provide absorptive capacity. A cellulosic sheet may have permanent wet strength resin added thereto, as is known in the art. Or the carrier sheet may preferably comprise a mixture of cellulosic and synthetic fibers, to provide both absorptive and barrier properties.

The carrier sheet may comprise a hydroentangled spunbond nonwoven with a basis weight of 20 to 80 gsm. A 45 gsm nonwoven from Avgol Nonwovens of Tel-Aviv, Israel has been found suitable. The carrier sheet may comprise a laminate of two, three or more plies joined together using adhesive and/or thermal bonds as are known in the art. Optional attachment stripes of loop or similar material may be joined to the attachment side to removably join the cleaning article 10 to a handle 72 or implement 70. One or more plies of the carrier sheet may comprise a microfiber, particularly a nylon microfiber, as is known in the art.

The cleaning article 10 may have an optional cleaning strip element. The cleaning strip element may comprise a polyolefinic film, having integral protrusions as disclosed in commonly assigned U.S. Pat. No. 8,407,848 or may be a rope of tow fibers. The cleaning strip element may preferably comprise a mixture of wet laid fibers formed into a tissue which is bonded onto a synthetic nonwoven using a process such as spun lace or hydroentangling. The cleaning element may particularly comprise a 23 gsm tissue with a 17 gsm polypropylene spunbond as a composite, sold under the name Genesis tissue by Suominen of Helsinki, Finland. Or, the cleaning strip element, precursor sheet and/or the carrier sheet may alternatively or additionally comprise nylon microfiber.

The tow fibers, and tufts 15 formed therewith, may be synthetic, comprising polymers including polyester, polypropylene, polyethylene, bio-derived polymers such as polylactic acid, bio-polyethylene, bio-polyester and the like. Tow fibers may also include fibers from natural sources such as cellulose, cellulose acetate, flax, hemp, jute and mixtures thereof manufactured wherein the individual fibers are relatively long strands manufactured in bundles. Preferred tow fibers are bicomponent fibers having a PP or PE core with a polyethylene sheath. The tow fibers may have a denier per filament of 1.5 to 8.0 and a total crimped denier of 15,000 to 95,000. Tow fibers are a component in Swiffer® Dusters™ sold by the instant assignee.

The tow fiber tuft(s) 15 may be joined to the carrier sheet by a plurality of permanent primary bonds 32. The primary bonds 32 are intended to minimize or prevent stray or dislodged tow fibers from becoming loose from the carrier sheet. Such sheets 12 and tow fiber tuft(s) 15 may typically be directly superimposed on one another, with or without intervening sheets, members or components therebetween. The primary bonds 32 may be ultrasonic bonds, adhesive bonds, thermal bonds or a combination thereof, as are known in the art.

The cleaning article 10 also has a secondary plurality of secondary bonds 34. The secondary bonds 34 are formed after the tufts 15 are joined to the carrier sheet by the primary bonds 32. The secondary bonds 34 are generally linear, having an aspect ratio within the XY plane of at least 1, preferably at least 10 and more preferably at least 20. The secondary bonds 34 reduce the thickness of the tufts 15 in the Z direction. The reduced thickness of the secondary bonds 34, relative to the balance of the tufts 15 aligned with the edges of the secondary bonds 34, creates channels to intercept debris. The secondary bonds 34 may be of constant width, or may converge towards a distal end thereof.

The secondary bonds 34 may be of uniform size, orientation relative to the longitudinal axis, and spacing. Alternatively, the secondary bonds 34 may be of variable width, length, spacing, angular orientation and/or geometry, as desired.

The channels formed by the secondary bonds 34 allow large debris to enter in a direction approaching the longitudinal axis LA of the cleaning article 10. Particularly, this arrangement provides the benefit during ordinary use that larger debris can be intercepted in the channel formed by the secondary bond, while smaller debris is intercepted by the tufts 15.

The secondary bonds 34 may have adhesive disposed thereon. The adhesive assists in retention of debris which enters the channels formed by the secondary bonds 34. Suitable adhesive includes contact adhesive. The adhesive may be applied to the secondary bonds 34 by spraying, rollers and other techniques known in the art for zone coating.

The transverse edge 222 of the field of tufts 15 may be juxtaposed with or coincident the transverse edge 22 of the carrier sheet. Preferably a perimeter bond 34P joins the tow fibers of the field of tufts 15 at the respective transverse edges, 22, 222. This arrangement prevents loss of tow fibers from occurring when separating an individual cleaning article 10 from a continuous web or upon a slit 36 being near a transverse edge 22 without an intervening primary bond 32. As used herein, a slit 36 is a cut through the two fibers and underlying carrier sheet, thereby forming a tuft 15.

The cleaning article 10 according to the present invention may be made by providing a carrier sheet. Tow fibers are disposed on the carrier sheet. For the embodiments shown herein, the tow fibers are generally aligned in the longitudinal direction, although the invention is not so limited. The tow fibers are joined to the carrier sheet with transversely offset primary bonds 32. The primary bonds 32 are oriented in the transverse direction. The primary bonds 32 are shown as teardrops, although the invention is not so limited. The primary bonds 32 may be linear or of any desired shape and size, so long as the tow fibers are permanently joined to the carrier sheet thereby.

Tufts 15 are created by cutting the carrier sheet and tow fibers between the primary bonds 32 with a plurality of slits. The proximal ends of the tow fibers forming a tuft 15 are defined by a respective primary bond 32. Two continuous slits 36 define and form the proximal ends of the tow fibers of a respective tuft 15.

The tufts 15 may be optionally fluffed to increase the thickness of the tufts 15 in the Z direction. Optional fluffing may be accomplished by blowing air, as is known in the art.

After the slits 36 are formed and fluffing, if any, occurs, the secondary bonds 34 are applied. The secondary bonds 34 may be formed in the same manner as the primary bonds 32, or may be formed by different methods. The secondary bonds 34 may be ultrasonic bonds, adhesive bonds, thermal bonds or a combination thereof, as are known in the art. Any such method of forming the secondary bonds 34 is suitable, so long as visually discernable secondary bonds 34 are formed and provide a thickness difference in the Z direction between the secondary bond 34 and at least two or more adjacent tufts 15 of tow fibers.

The secondary bonds 34 preferably intercept the longitudinal edge 220 of the field of tufts 15. This arrangement allows an opening for large debris to enter the field of tufts 15 in a direction towards the longitudinal axis and be retained by adhesive and/or tufts 15 adjacent to and which form the border of the secondary bond. Without the secondary bonds 34, large debris may become entrapped on the longitudinal edge 220 of the field of tufts 15 and occlude the tufts 15 from intercepting additional debris.

This geometry provides the benefit that when used with a common sized cleaning implement 70, such as the Swiffer® Sweeper™ implement 70 sold by the instant assignee, tufts 15 and secondary bonds 34 may wrap the nose of the head 74 of the cleaning implement. Wrapping the nose of the head 74 of the cleaning implement 70 is believed to improve cleaning along walls and baseboards. The amount of tufts 15 on the nose can be controlled by and is inversely proportional to the width of the secondary bonds 34.

Referring particularly to FIGS. 1A-4C, the cleaning article 10 may have continuous secondary bonds 34 which are parallel to the transverse axis TA. This geometry provides the benefit that the secondary bond 34 channels can allow debris to enter generally in the direction of forward and backward motion while, providing sufficient volume to accommodate large amounts of debris.

The secondary bond 34 alignment being parallel to the transverse direction is generally oriented in the cross-machine direction and perpendicular to the machine direction. Thermal bonding and ultrasonic bonding typically occur in the cross-machine direction at any point in time. As the size of the secondary bond 34 increases in the cross-machine direction, the amount of amperage necessary to form the secondary bond 34 likewise increases. Increased amperage typically results in increased equipment cost and resulting increased manufacturing cost. Certain variant embodiments described below are stated to have the advantage of reduced amperage necessary to form the secondary bond 34 relative to the amperage required to form a comparable secondary bond 34 parallel to the transverse direction using thermal bonding and/or ultrasonic bonding.

While generally parallel and equally spaced rows of tufts 15 are shown, the invention is not so limited. Prophetically from two to 15 rows could be used, with equal or unequal spacing and equal or unequal variable widths and equal or unequal tuft 15 density. The rows of tufts 15 may be mutually parallel to the transverse axis, mutually skewed thereto or be mutually skewed relative to other rows. Optionally, adhesive may be disposed in the spaces between the rows 30. The rows 30 may both extend throughout the transverse direction and be interrupted at the longitudinal axis. The tapered intra-tuft spaces between the tufts 15 provide the benefit that no tufts 15 are interrupted by the spaces. Thus all tufts 15 can be selected to be of a size large enough for efficacious cleaning.

The pitch, and thus tuft 15 density, may be constant at any predetermined spacing from the longitudinal edge 20. The tufts 15 may be bilaterally staggered relative to the longitudinal axis and transverse axis. The tufts 15 may fully overlap the position of adjacent tufts 15, in both directions, to provide adequate spacing therebetween and debris retention during back and for the sweeping. Alternatively, each tuft 15 having a maximum diameter, or other maximum dimension taken parallel to the longitudinal axis, and the pitch between adjacent tufts 15 in a particular row may be greater than that maximum diameter/dimension.

The cleaning article according may be tri-folded generally parallel to said longitudinal axis, as is common in the art. This arrangement provides two outboard trisections, commonly used for attachment to the head 74 of a cleaning implement. If desired, tufts 15 may be disposed in at least one of, and optionally both of, the outboard trisections, to provide for cleaning along walls and baseboards.

This geometry provides the benefit that when used with a common sized cleaning implement 70, such as the Swiffer® Sweeper™ implement 70 sold by the instant assignee, tufts 15 may wrap the nose of the head 74 of the cleaning implement. Wrapping the nose of the head 74 of the cleaning implement 70 is believed to improve cleaning along walls and baseboards. The amount of tufts 15 on the nose can be controlled by and is inversely proportional to the width of the spaces 31.

The cleaning article may optionally be completely or partially coated with adhesive, wax, Newtonian oils and/or non-Newtonian oils or a combination thereof, in order to improve cleaning and increase retention of absorbed debris. Particularly, the tow fiber tuft 15, in any configuration, may be coated with a mineral oil coating. The coating may comprise a mixture of mineral oil and surfactant at a ratio of about 90% to 10% oil to surfactant. The surfactant provides the benefit inducing the oil to wet the tow fibers by reducing the surface energy. The surfactant may be a non-ionic surfactant.

Figure 1B:
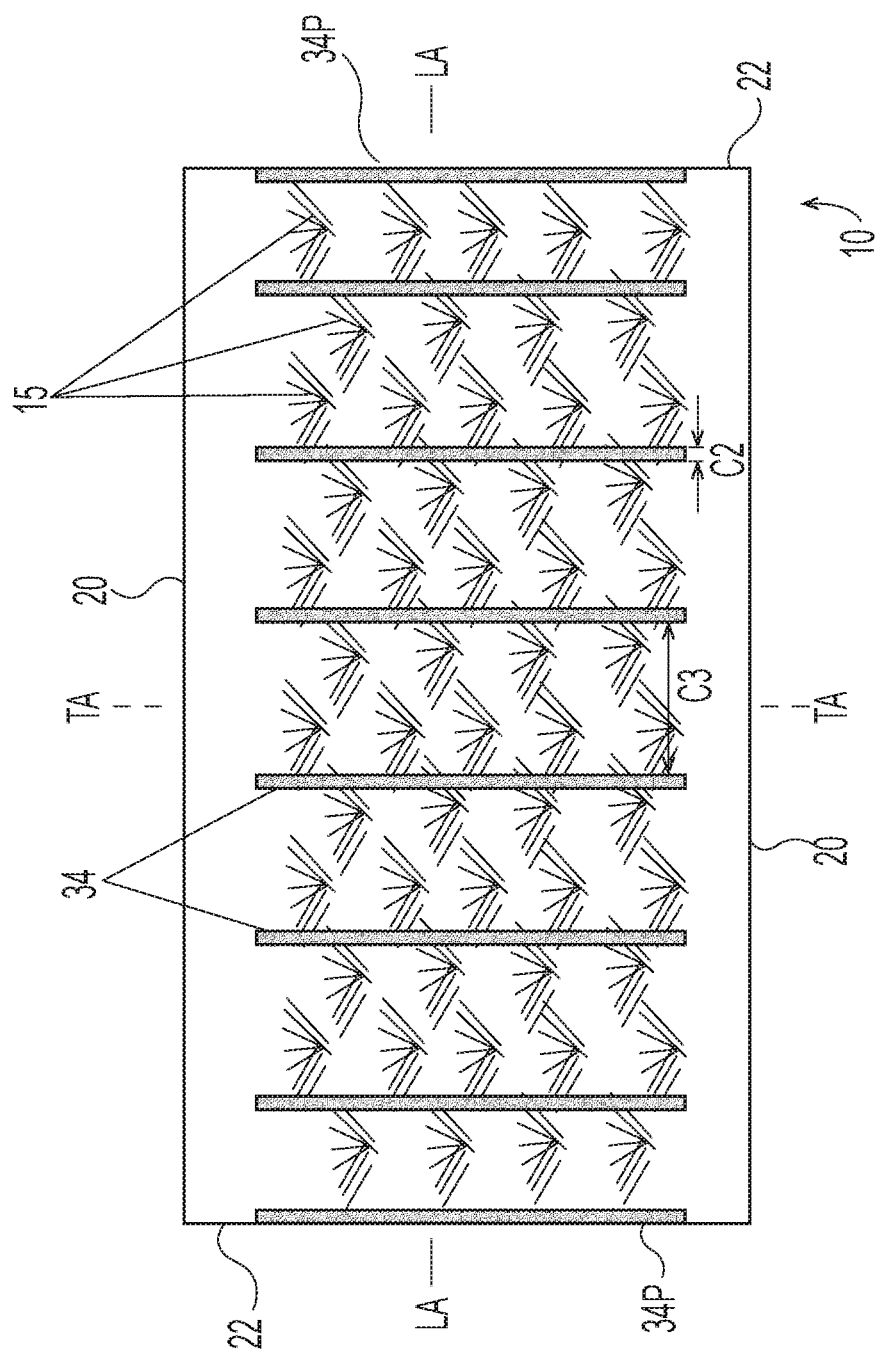
FIG. 1B is a top view of the cleaning article of FIG. 1A having discrete tufts represented with a common proximal end for each tuft.
Figure 1C:
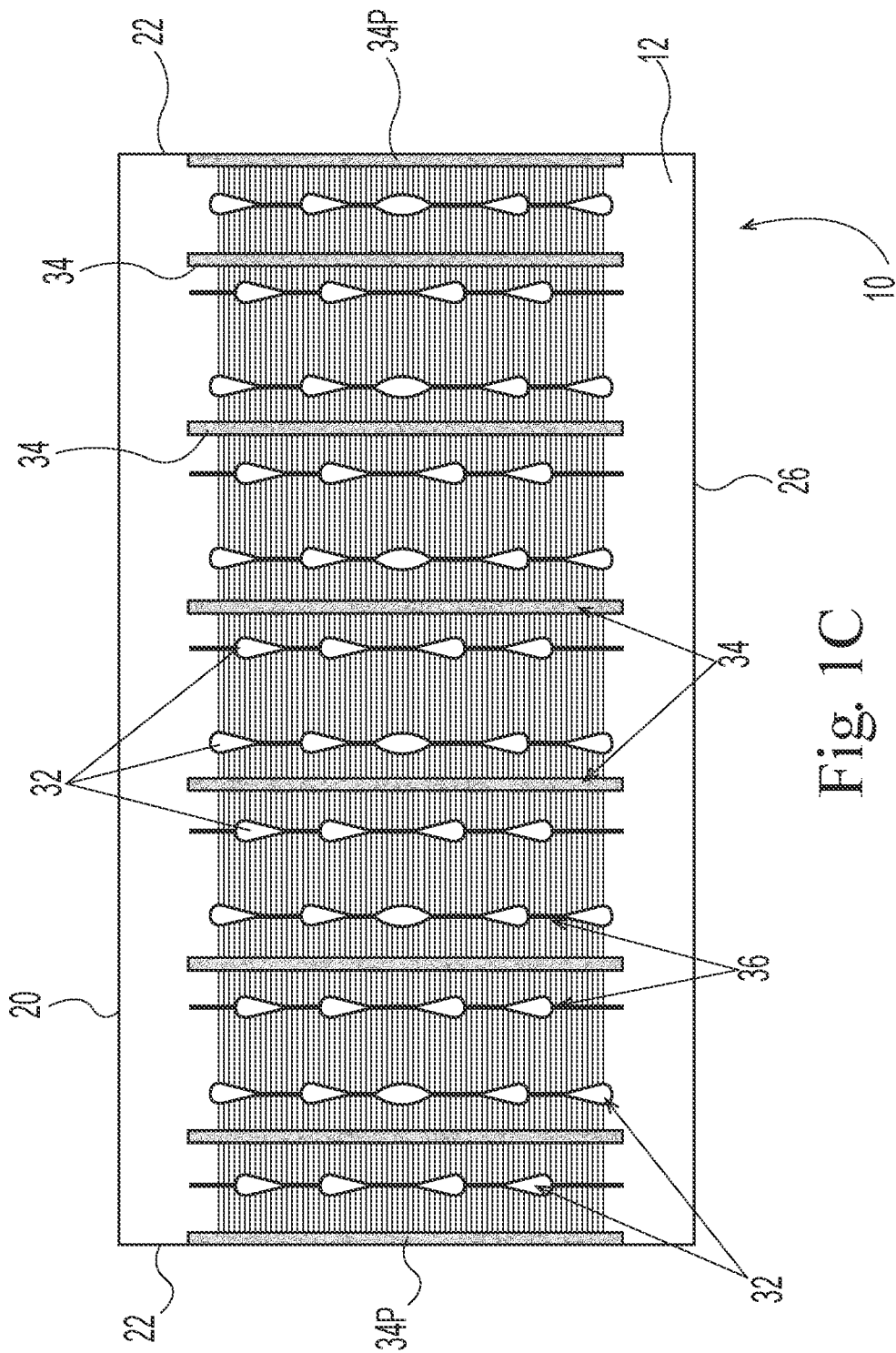
FIG. 1C is a bottom plan view of the cleaning article of FIGS. 1A and 1B.

Referring particularly to FIGS. 1A-1C, the secondary bonds 34 may have a length C1 of 11 to 20 cm, a width C2 of 0.1 to 1.5 cm and a pitch C3 therebetween of 1 to 10 cm. These secondary bonds 34 intercept both longitudinal edges 220 of the field of tufts 15 to allow convenient entry of debris. While six equally spaced secondary bonds 34 are shown, the invention is not so limited. More or fewer secondary bonds 34 of similar or different size and/or spacing may be utilized.

Figure 1D:
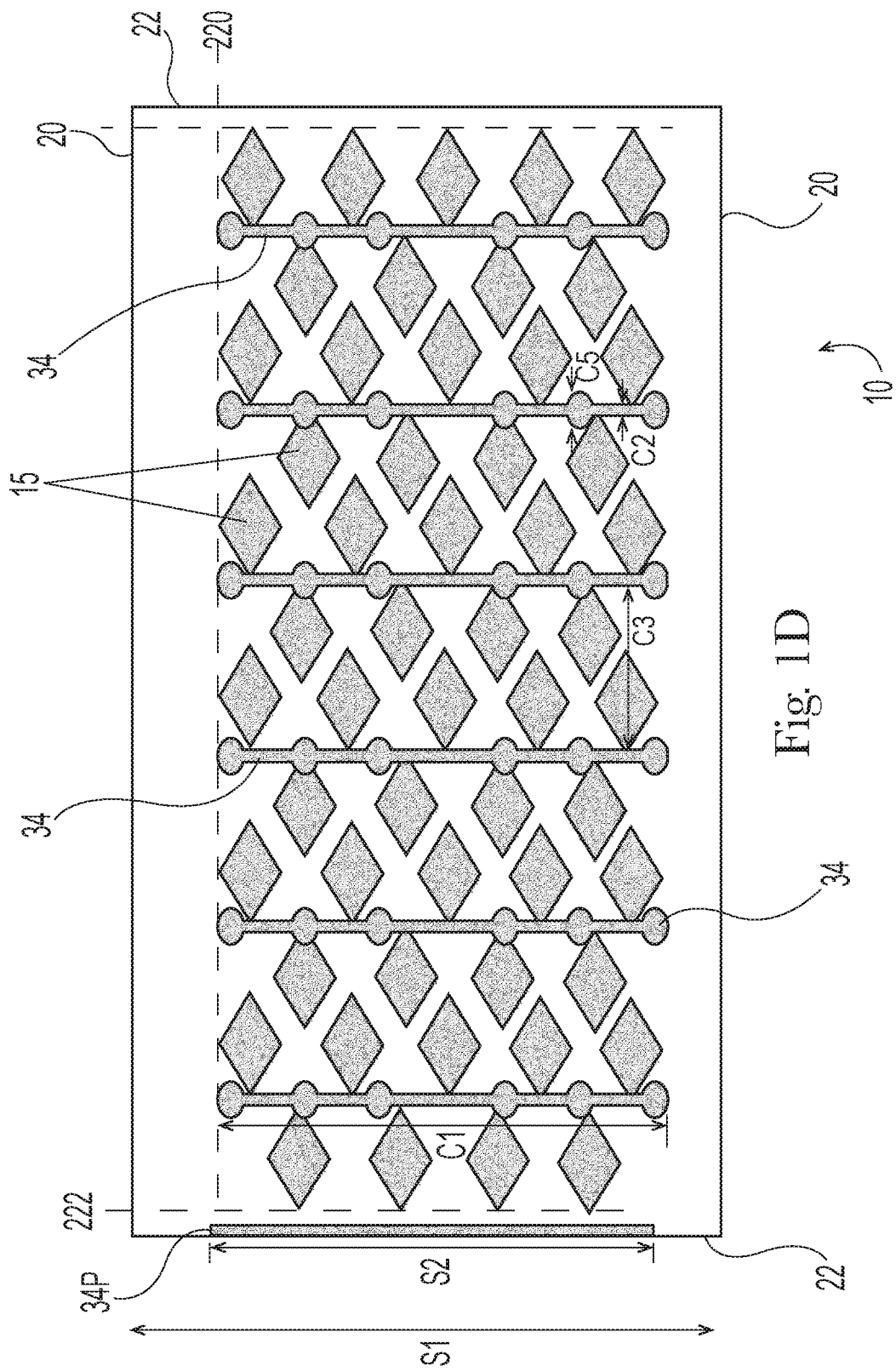
FIG. 1D is a top view of a cleaning article according to the present invention and having discrete tufts represented as diamonds, with variable width continuous secondary bonds oriented generally parallel to the transverse axis.
Figure 1E:
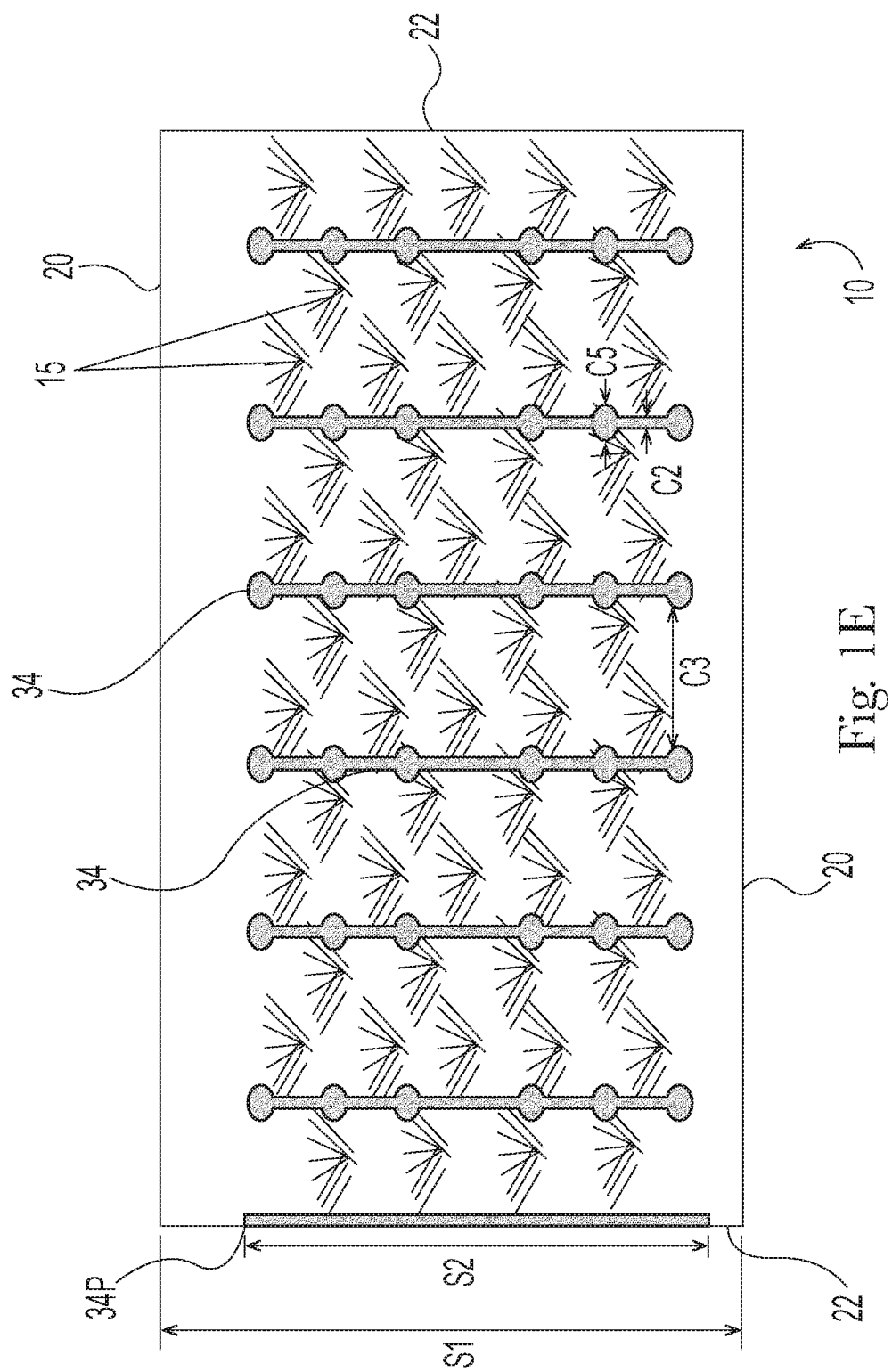
FIG. 1E is a top view of the cleaning article of FIG. 1D having discrete tufts represented with a common proximal end for each tuft.
Figure 1F:
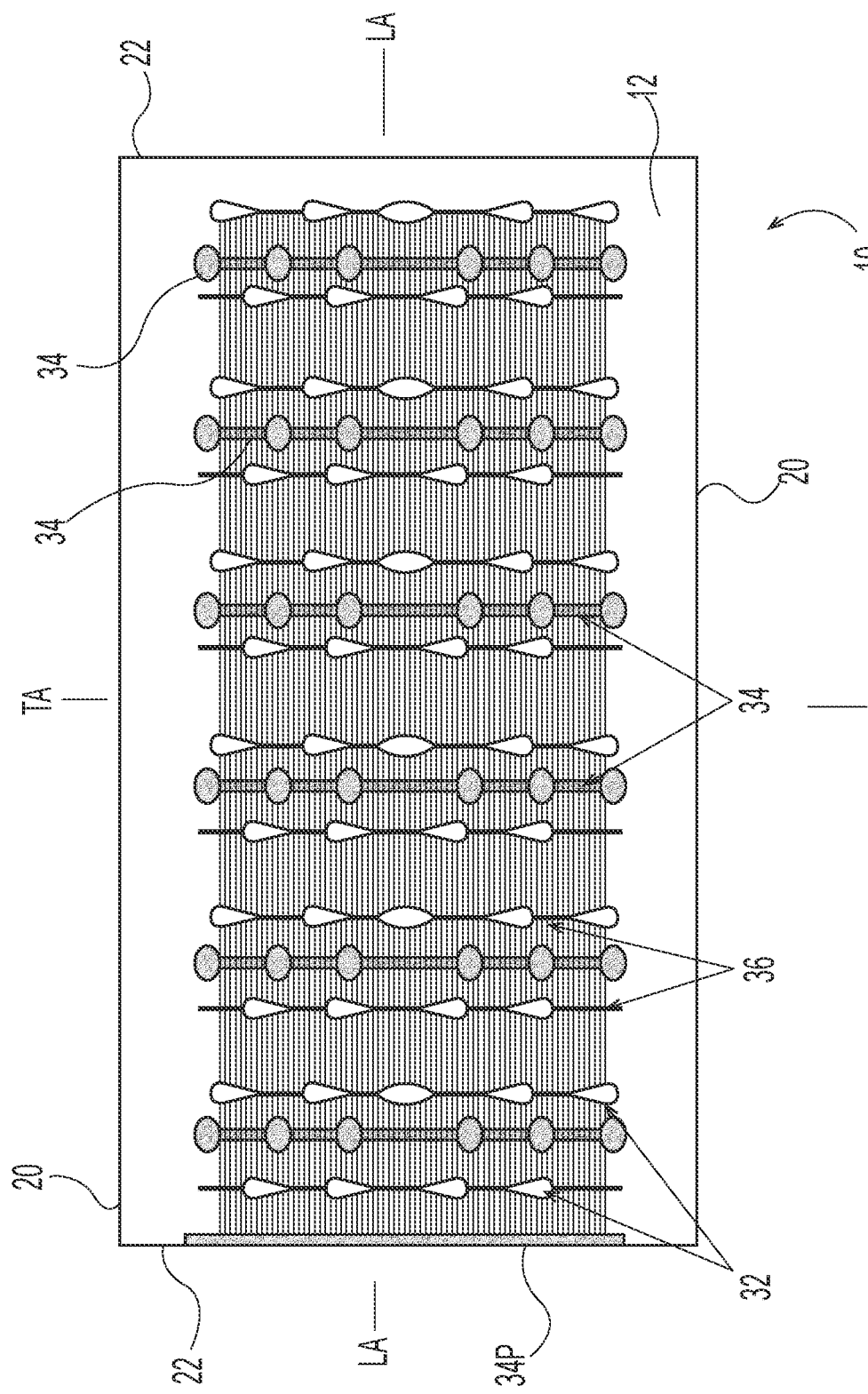
FIG. 1F is a bottom plan view of the cleaning article of FIGS. 1D and 1E.

Referring to FIGS. 1D-1F, the secondary bonds 34 may be of variable width, to increase surface of the channels formed by the bonds to increase debris retention. The secondary bonds 34 may be monotonically tapered, or bulbous as shown.

Figure 2A:
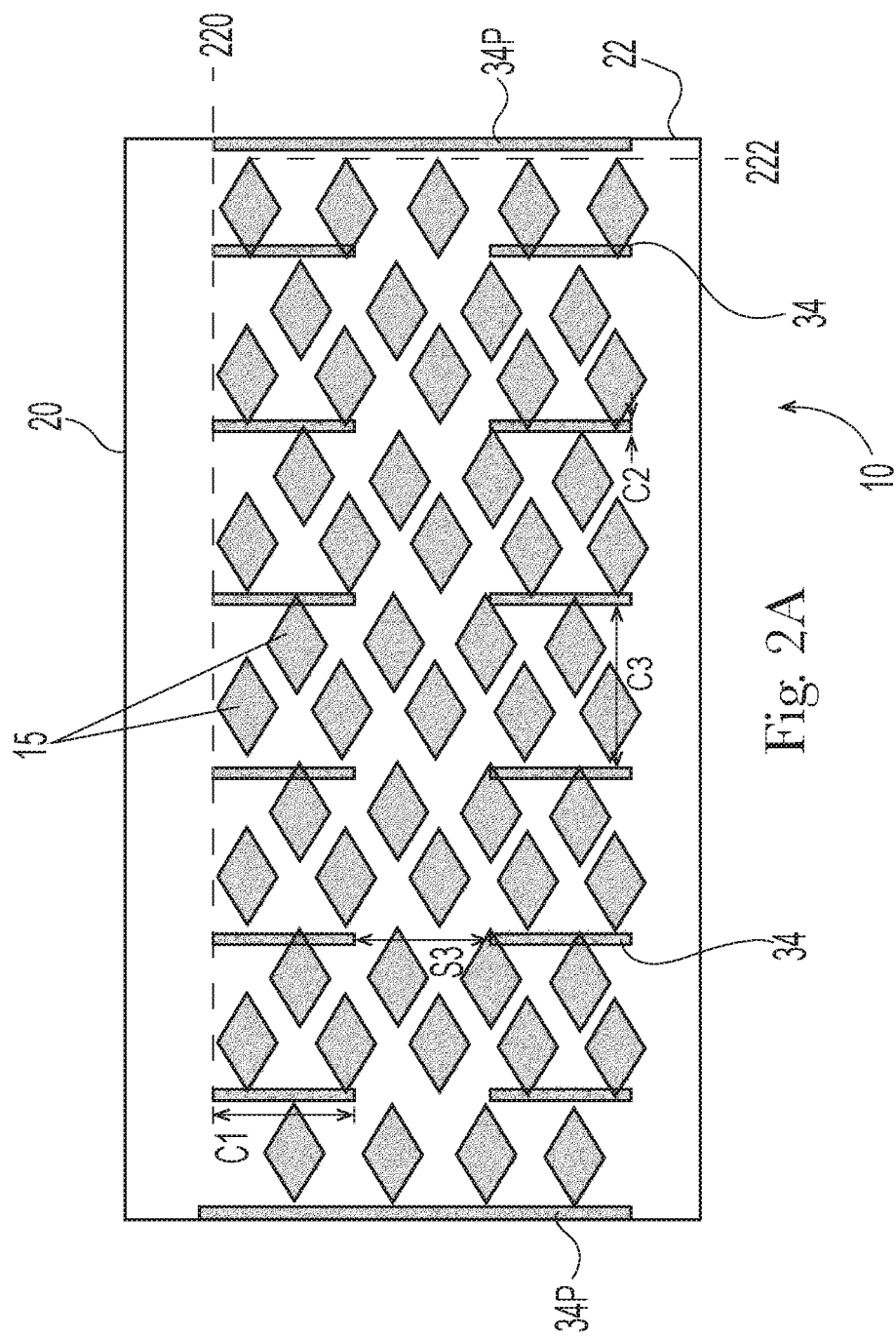
FIG. 2A is a top view of a cleaning article according to the present invention and having discrete tufts represented as diamonds, with interrupted constant width secondary bonds oriented generally parallel to the transverse axis.
Figure 2C:
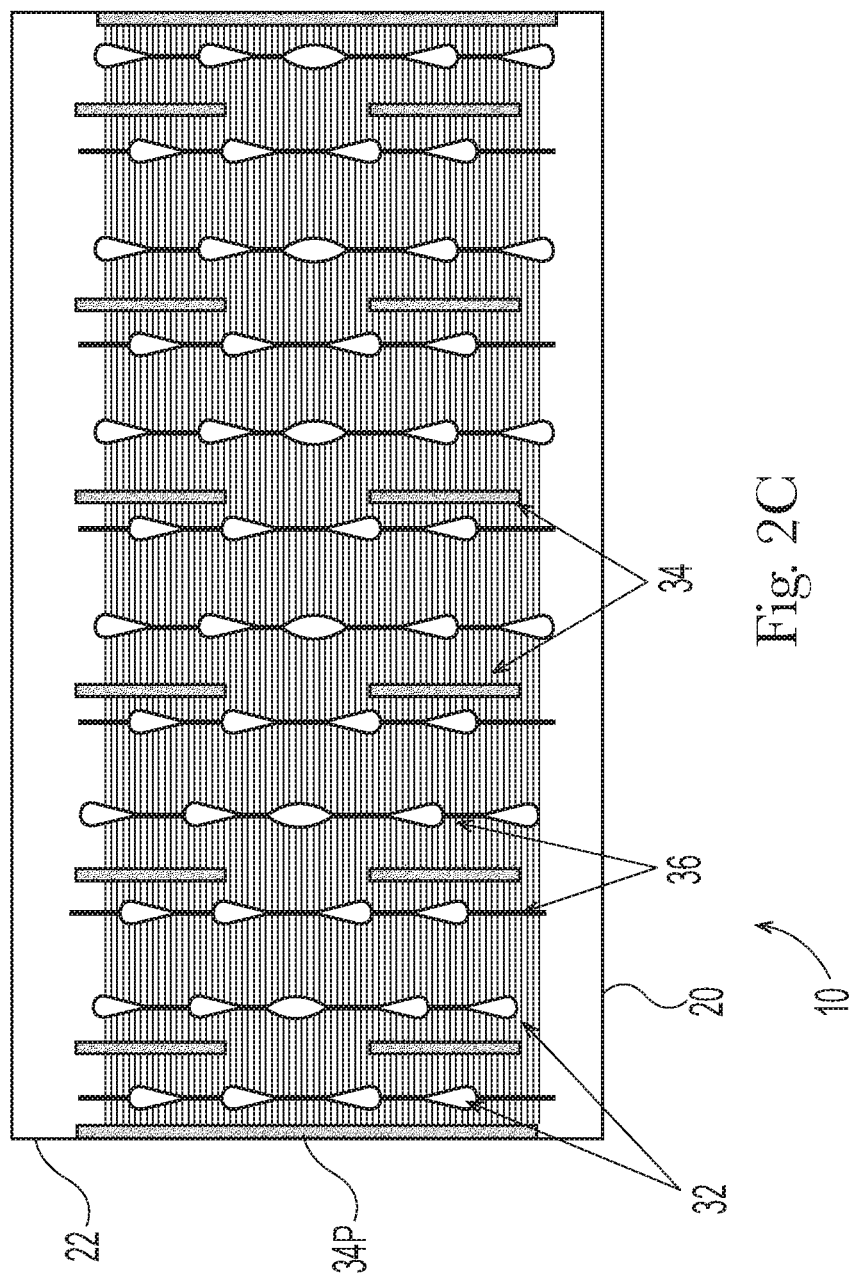
FIG. 2C is a bottom plan view of the cleaning article of FIGS. 2A and 2B.

Referring particularly to FIGS. 2A-2C, the cleaning article 10 may have interrupted secondary bonds 34 which are parallel to the transverse axis TA. The secondary bonds 34 may have a length C1 of 2 to 8 cm, and a width C2 of 0.1 to 1.5 cm. The secondary bonds 34 may have a pitch C3 therebetween of 1 to 10 cm. The transverse spacing S3 between secondary bonds 34 may range from 1 to 6 cm. These secondary bonds 34 intercept both longitudinal edges 220 of the field of tufts 15 to allow convenient entry of debris.

This geometry provides the benefit that the secondary bond 34 channels can allow debris to enter generally in the direction of forward and backward motion while having tufts 15 on and proximate to the longitudinal axis LA for retention of large debris.

While 12 equally spaced secondary bonds 34 are shown, the invention is not so limited. More or fewer secondary bonds 34 of similar or different size and/or spacing may be utilized.

Figure 2D:
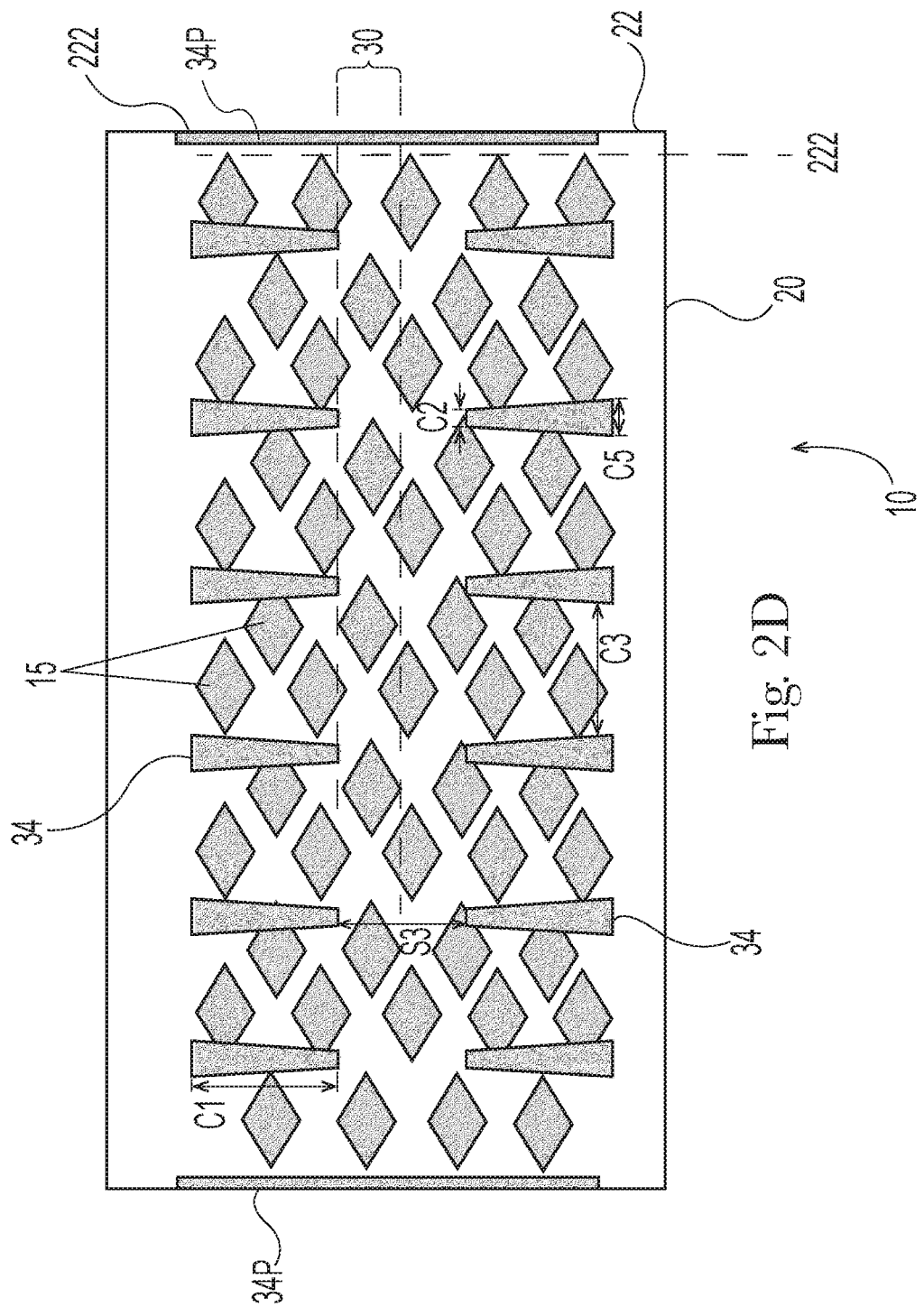
FIG. 2D is a top view of a cleaning article according to the present invention and having discrete tufts represented as diamonds, with interrupted variable width secondary bonds oriented generally parallel to the transverse axis.
Figure 2E:
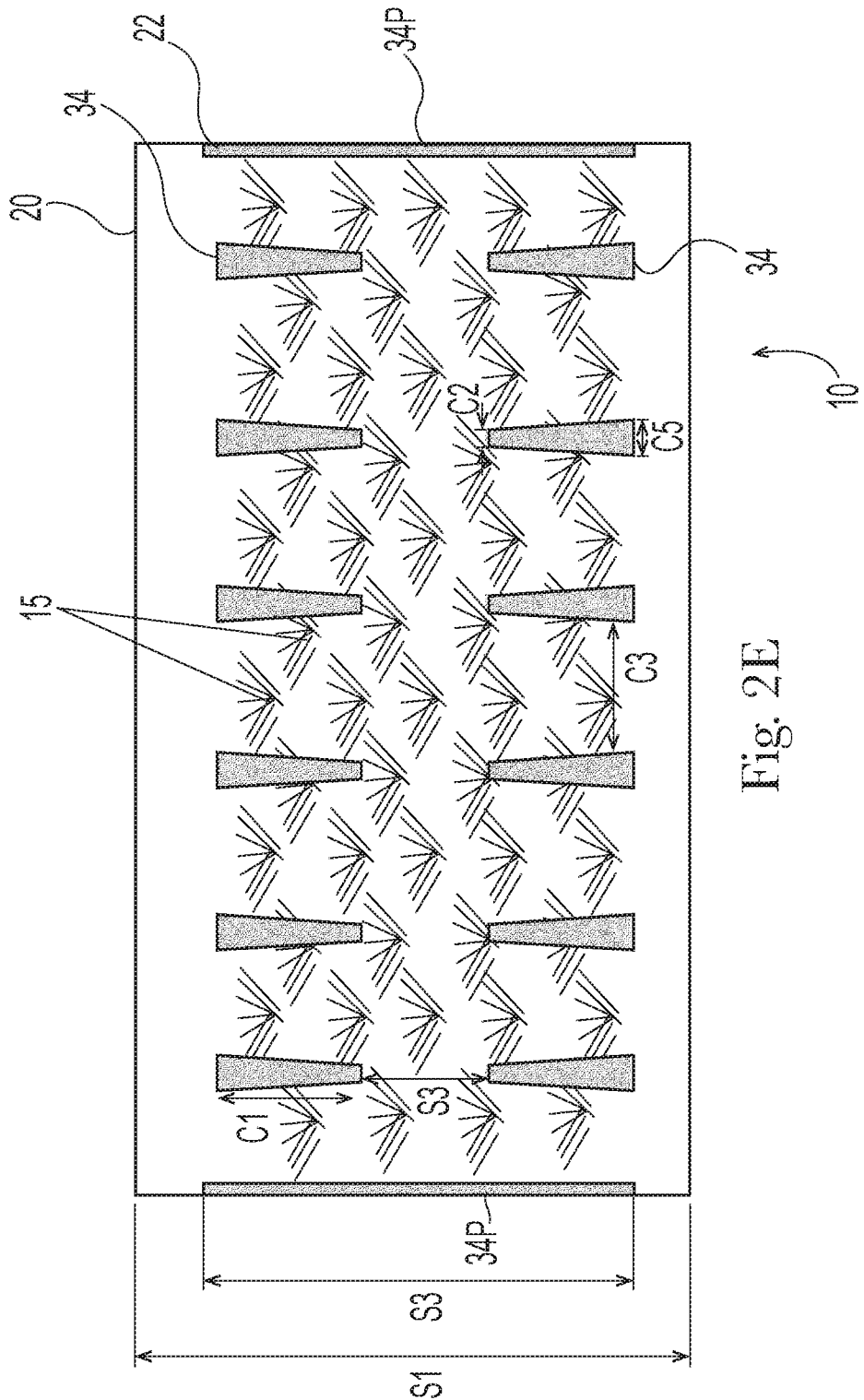
FIG. 2E is a top view of the cleaning article of FIG. 2D having discrete tufts represented with a common proximal end for each tuft.

Referring to FIGS. 2D-2F, the secondary bonds 34 may be monotonically tapered. This arrangement provides the benefit that as debris enters the channel created by the secondary bond, the debris will become entrapped when the secondary bonds 34 is narrow enough to intercept the debris.

Figure 3A:
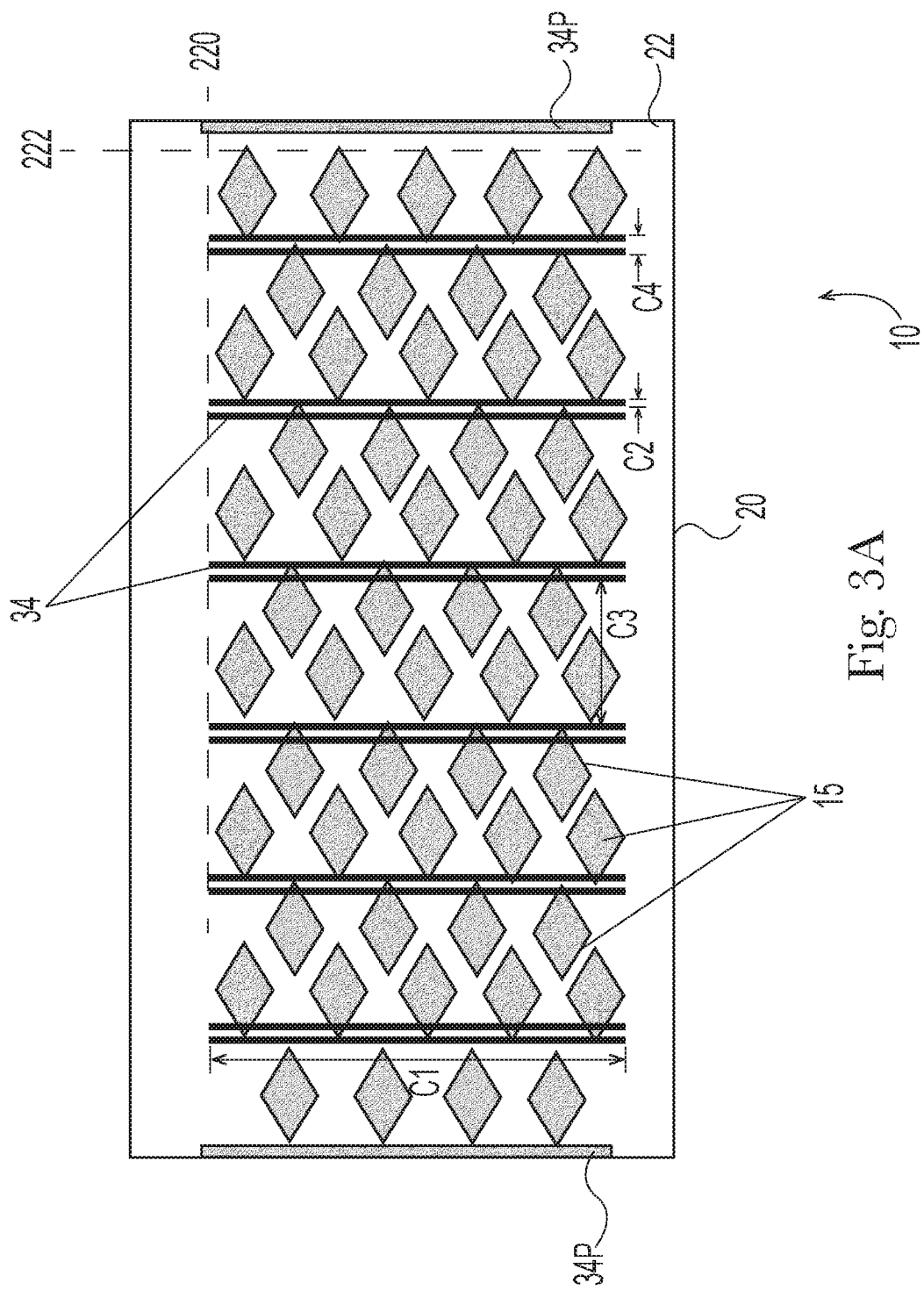
FIG. 3A is a top view of a cleaning article according to the present invention and having discrete tufts represented as diamonds, with continuous paired secondary bonds oriented generally parallel to the transverse axis.
Figure 3B:
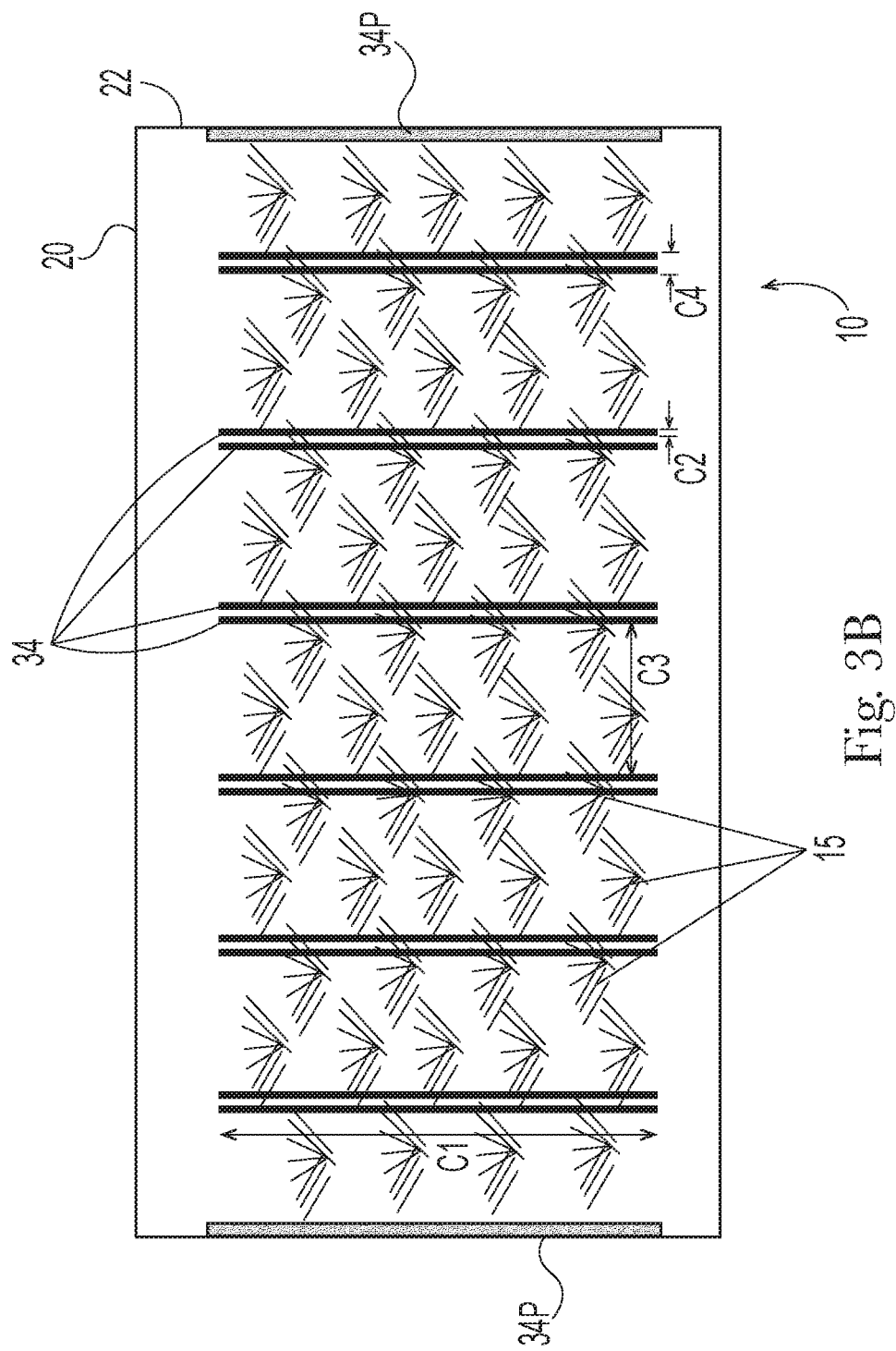
FIG. 3B is a top view of the cleaning article of FIG. 3A having discrete tufts represented with a common proximal end for each tuft.

Referring particularly to FIGS. 3A-3C, the cleaning article 10 may have continuous paired secondary bonds 34 which are parallel to the transverse axis TA. By paired secondary bonds 34 it is meant two describe two secondary bonds 34 relatively closely and proximately spaced and which pair is spaced apart from another pair of secondary bonds 34.

Paired secondary bonds 34, for each of the embodiments described herein having paired secondary bonds 34, provides the benefit that a channel can be formed for collection of debris without requiring a relatively wide width for the secondary bond. The secondary bonds 34 are typically formed in the cross-machine direction. As width of the secondary bond 34 increases (in the horizontal direction of FIGS. 3A-3B), the required amperage to accomplish bonding using heat sealing or ultrasonic bonding likewise increases. Using two, narrower, paired secondary bonds 34 requires less amperage spike than a single, wider secondary bond.

Referring particularly to FIGS. 3A-3C, each of the paired secondary bonds 34 may have a length C1 of 11 to 20 cm, and a width C2 of 0.1 to 1.5 cm. The secondary bond 34 pairs may have a spacing C3 therebetween of 1 to 10 cm. The channel between paired secondary bonds 34 may range from 0.1 to 1 cm. These secondary bonds 34 may intercept both longitudinal edges 220 of the field of tufts 15 to allow convenient entry of debris.

This geometry provides the benefit that the secondary bond 34 channels can allow debris to enter generally in the direction of forward and backward motion while having tufts 15 on and proximate to the longitudinal axis LA for retention of large debris.

While six pairs of equally spaced secondary bonds 34 are shown, the invention is not so limited. More or fewer secondary bonds 34 of similar or different size and/or spacing may be utilized. The secondary bonds 34 may have differing thickness within a secondary bond 34 pair, or differing thickness between bond pairs as shown.

Figure 4A:
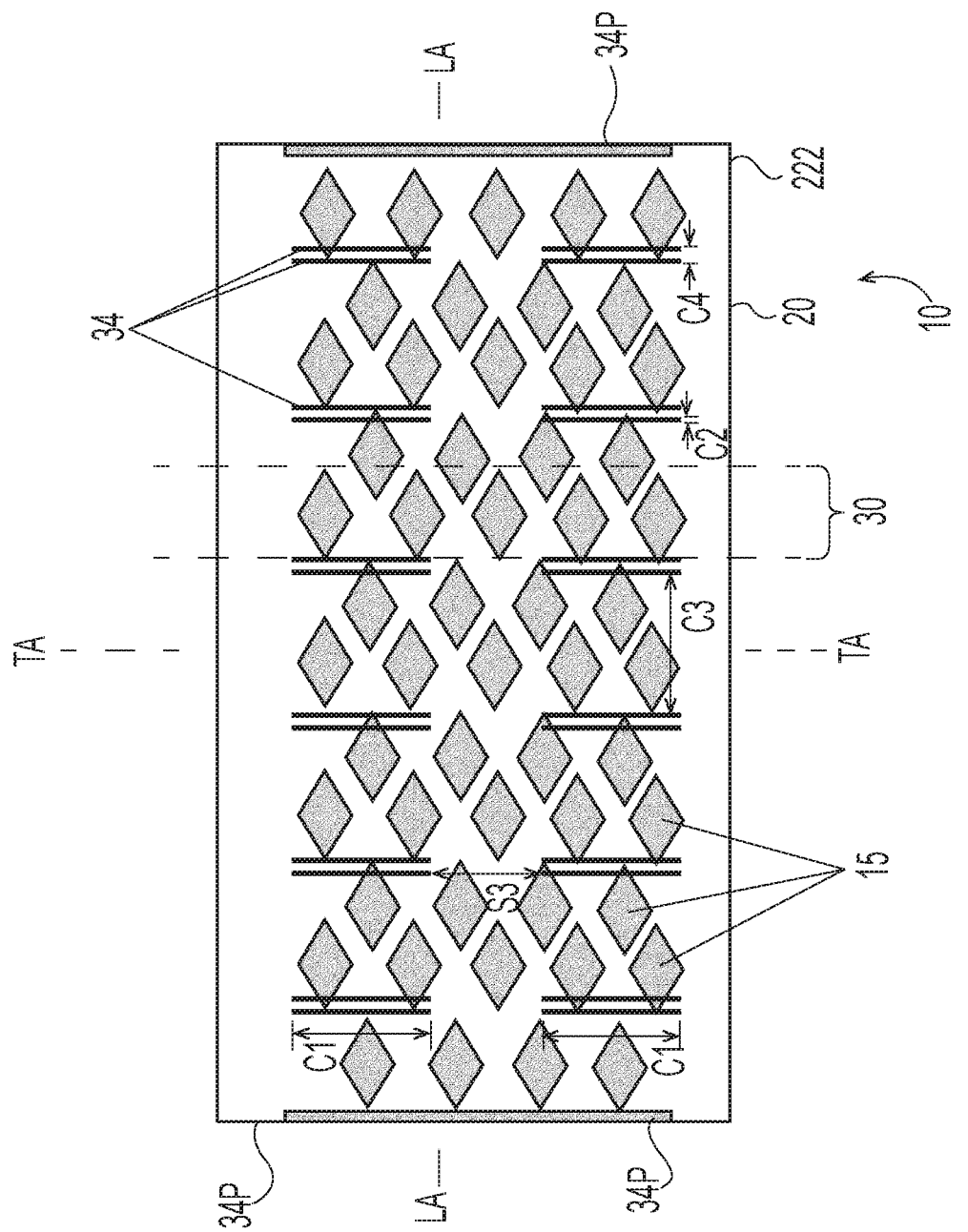
FIG. 4A is a top view of a cleaning article according to the present invention and having discrete tufts represented as diamonds, with paired, interrupted secondary bonds oriented generally parallel to the transverse axis.
Figure 4B:
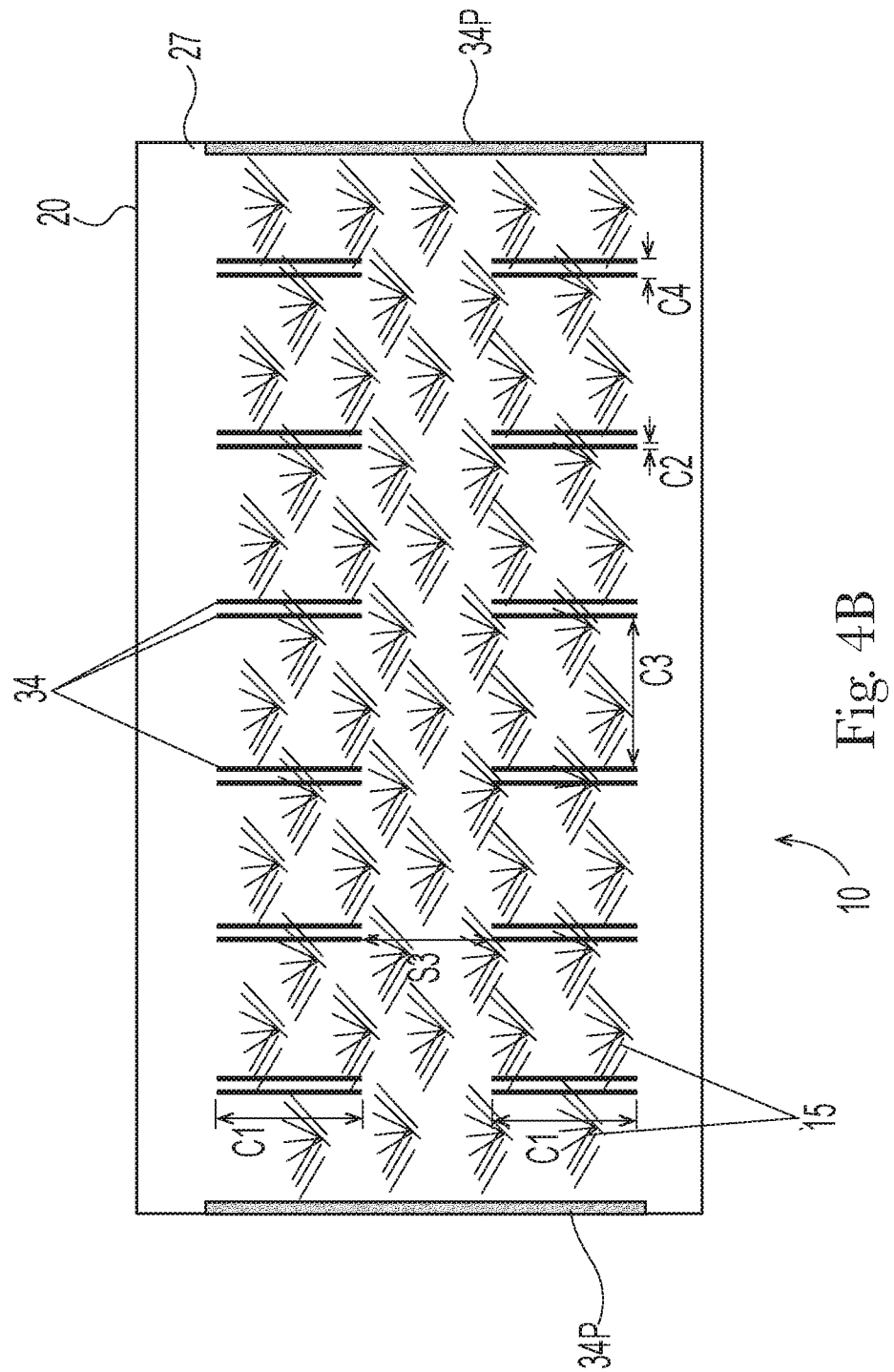
FIG. 4B is a top view of the cleaning article of FIG. 4A having discrete tufts represented with a common proximal end for each tuft.

Referring to FIGS. 4A-4C, the paired continuous secondary bonds 34 may be interrupted proximate the longitudinal axis LA. This geometry provides the benefit that the paired secondary bond 34 channels can allow debris to enter generally in the direction of forward and backward motion while having tufts 15 on and proximate to the longitudinal axis LA for retention of large debris.

The interruption between transversely opposed pairs of secondary bonds 34 further provides for reduced amperage during heat sealing or ultrasonic bonding. The reduced amperage potentially reduces manufacturing cost.

Each of the paired secondary bonds 34 may have a length C1 of 2 to 8 cm, and a width C2 of 0.05 to 0.5 cm. The secondary bond 34 pairs may have a spacing C3 therebetween of 1 to 10 cm. The channel C4 between paired secondary bonds 34 may range from 0.1 to 1 cm. The secondary bonds 34 may have a spacing S3 across the longitudinal axis LA in the transverse direction of 1 to 6 cm. These secondary bonds 34 may intercept both longitudinal edges 220 of the field of tufts 15 to allow convenient entry of debris.

While 12 pairs of equally spaced secondary bonds 34 are shown, the invention is not so limited. More or fewer pairs of secondary bonds 34 of similar or different size and/or spacing may be utilized.

Referring to FIGS. 5A-8C, and 15A-16C, the secondary bonds 34 may be continuous and diagonally oriented relative to the longitudinal axis LA. The diagonal orientation, for all such embodiments described and claimed herein, provides the benefit that during back and forth motion debris entering the channels formed by the secondary bonds 34 can intercept a tuft 15 bordering the channel and be retained thereby. Further, the channels can intercept debris during turns and lateral motions which occur during cleaning.

Furthermore, for all diagonal secondary bond 34 embodiments described and claimed herein, the instantaneous amperage draw of the bonding step during manufacture, is reduced compared to a secondary bond 34 oriented in the transverse direction during ultrasonic bonding or thermal bonding. The reduction in amperage occurs due to less bond area being present at any point in time.

Figure 5A:
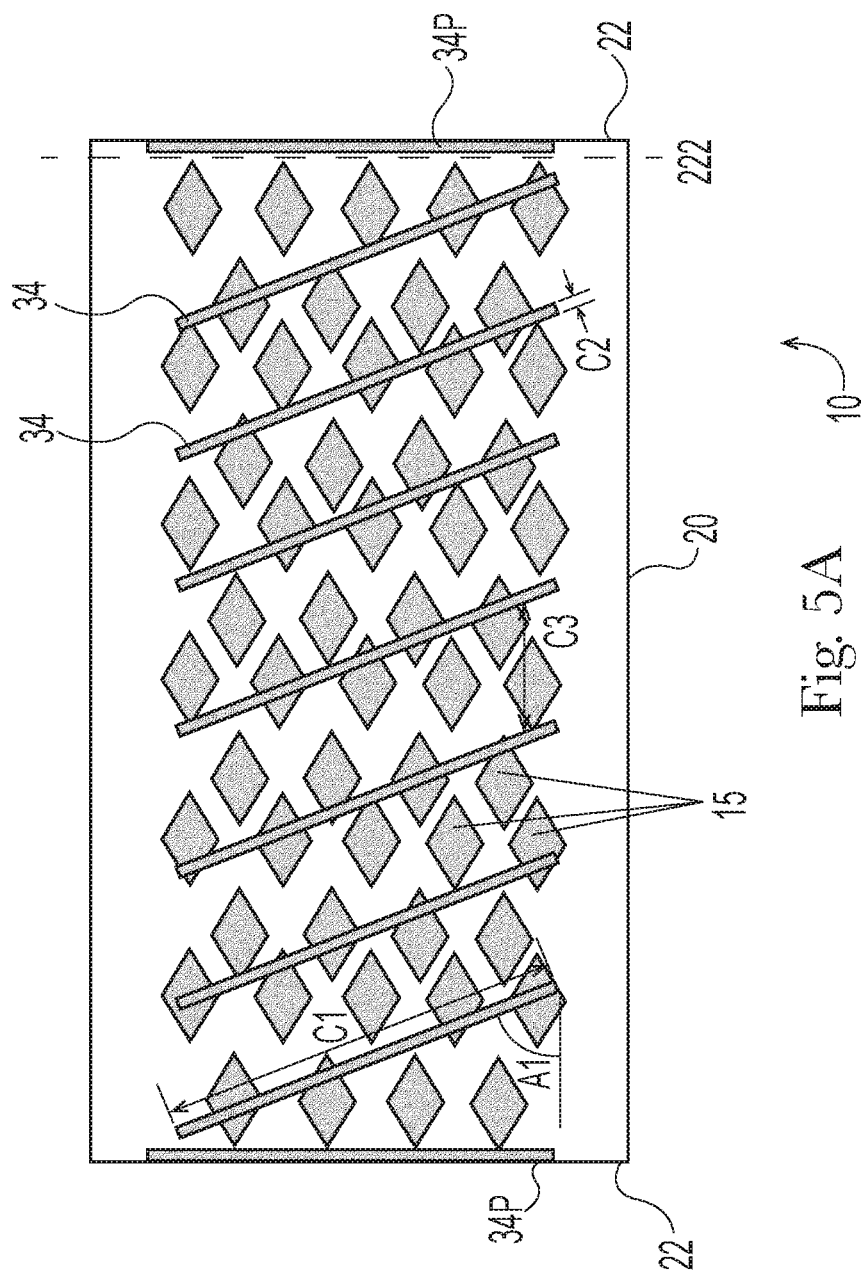
FIG. 5A is a top view of a cleaning article according to the present invention and having discrete tufts represented as diamonds, with continuous secondary bonds oriented diagonal to the transverse axis.
Figure 5B:
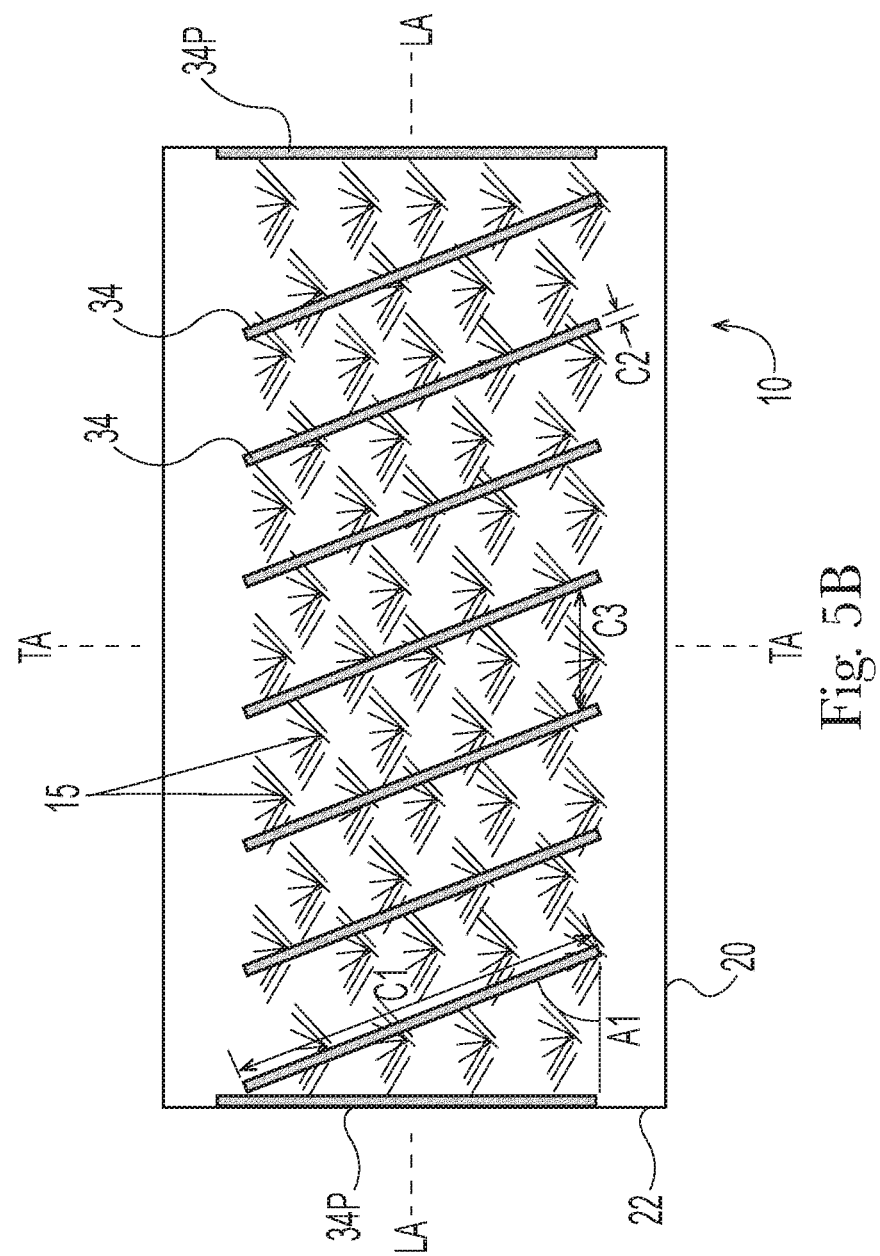
FIG. 5B is a top view of the cleaning article of FIG. 5A having discrete tufts represented with a common proximal end for each tuft.
Figure 5C:
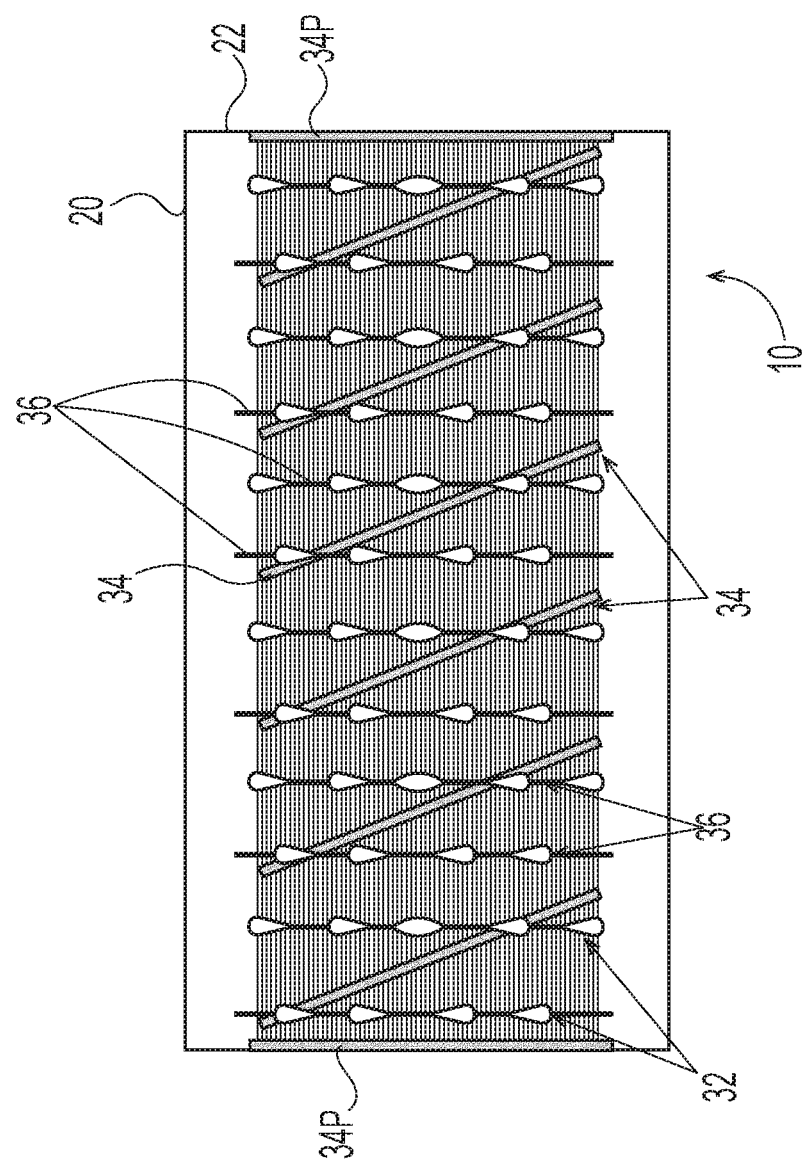
FIG. 5C is a bottom plan view of the cleaning article of FIGS. 5A and 5B.

Referring to FIGS. 5A-5C, each of the secondary bonds 34 may have a length C1 of 11 to 20 cm, and a width C2 of 0.1 to 1 cm. The secondary bonds 34 may have a spacing C3 therebetween of 1 to 10 cm. The secondary bonds 34 may form an angle A1 with the longitudinal axis LA of 30 to 75 degrees. These secondary bonds 34 may intercept both longitudinal edges 220 of the field of tufts 15 to allow convenient entry of debris.

While seven equally spaced secondary bonds 34 are shown, the invention is not so limited. More or fewer secondary bonds 34 of similar or different size and/or spacing may be utilized.

Figure 6A:
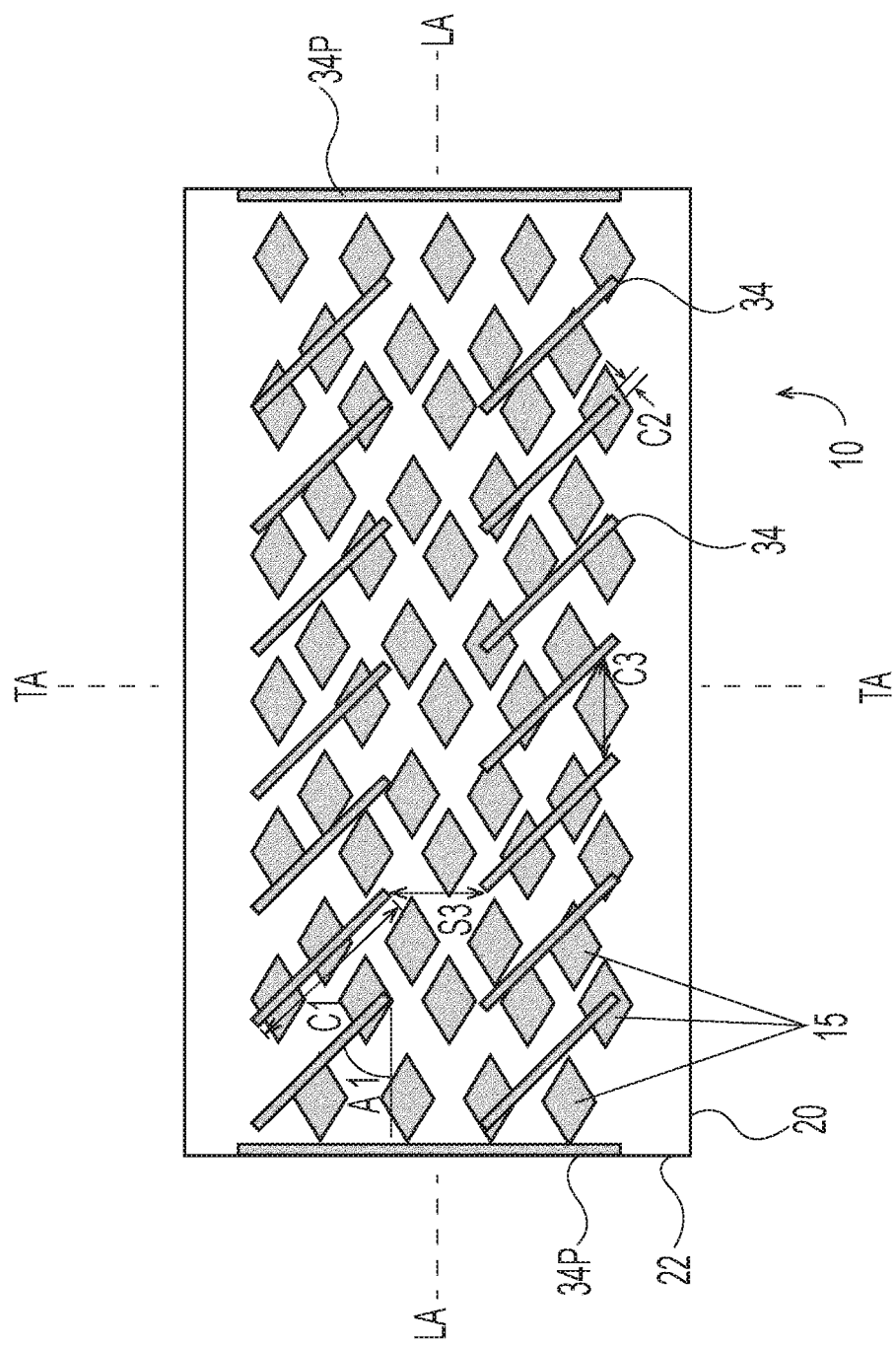
FIG. 6A is a top view of a cleaning article according to the present invention and having discrete tufts represented as diamonds, with offset interrupted secondary bonds oriented diagonal to the longitudinal axis.
Figure 6B:
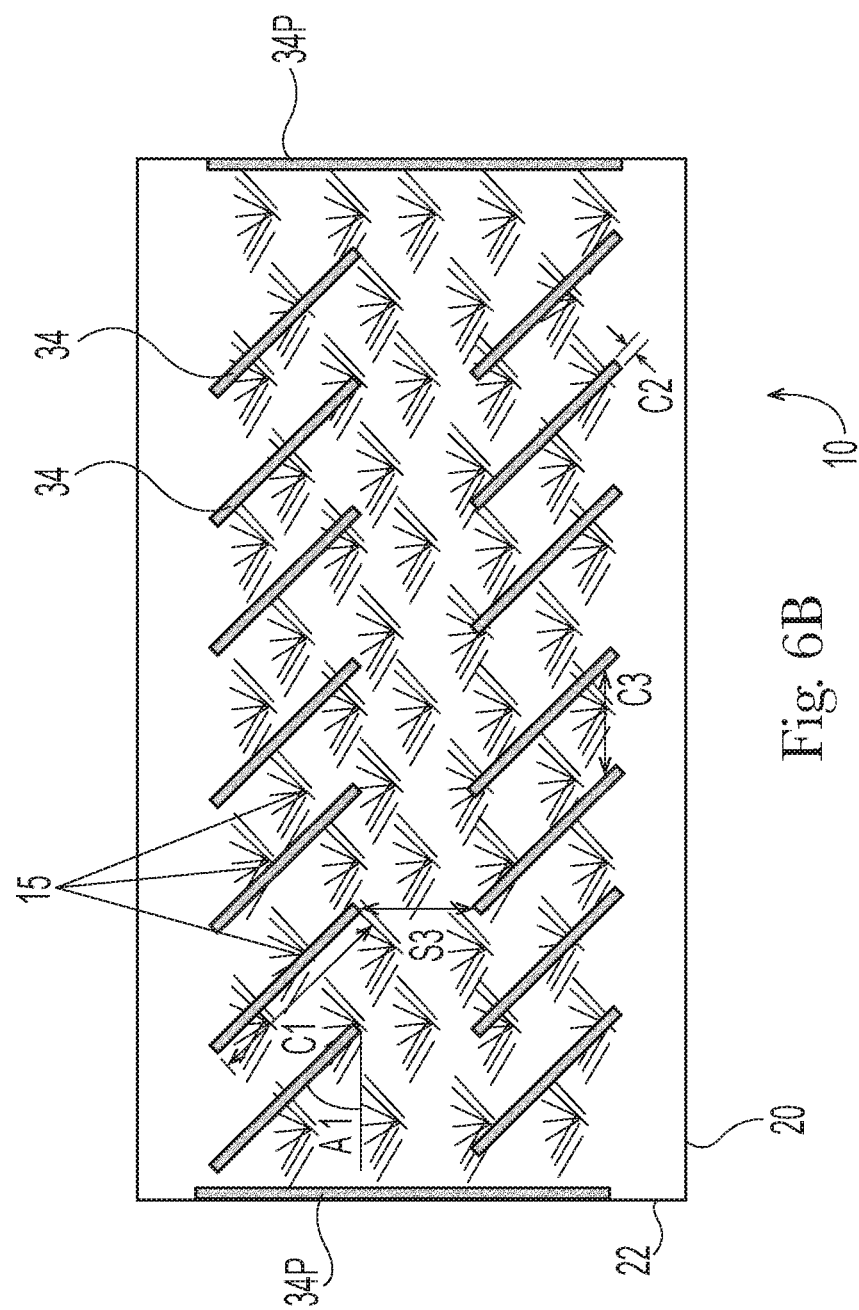
FIG. 6B is a top view of the cleaning article of FIG. 6A having discrete tufts represented with a common proximal end for each tuft.
Figure 6C:
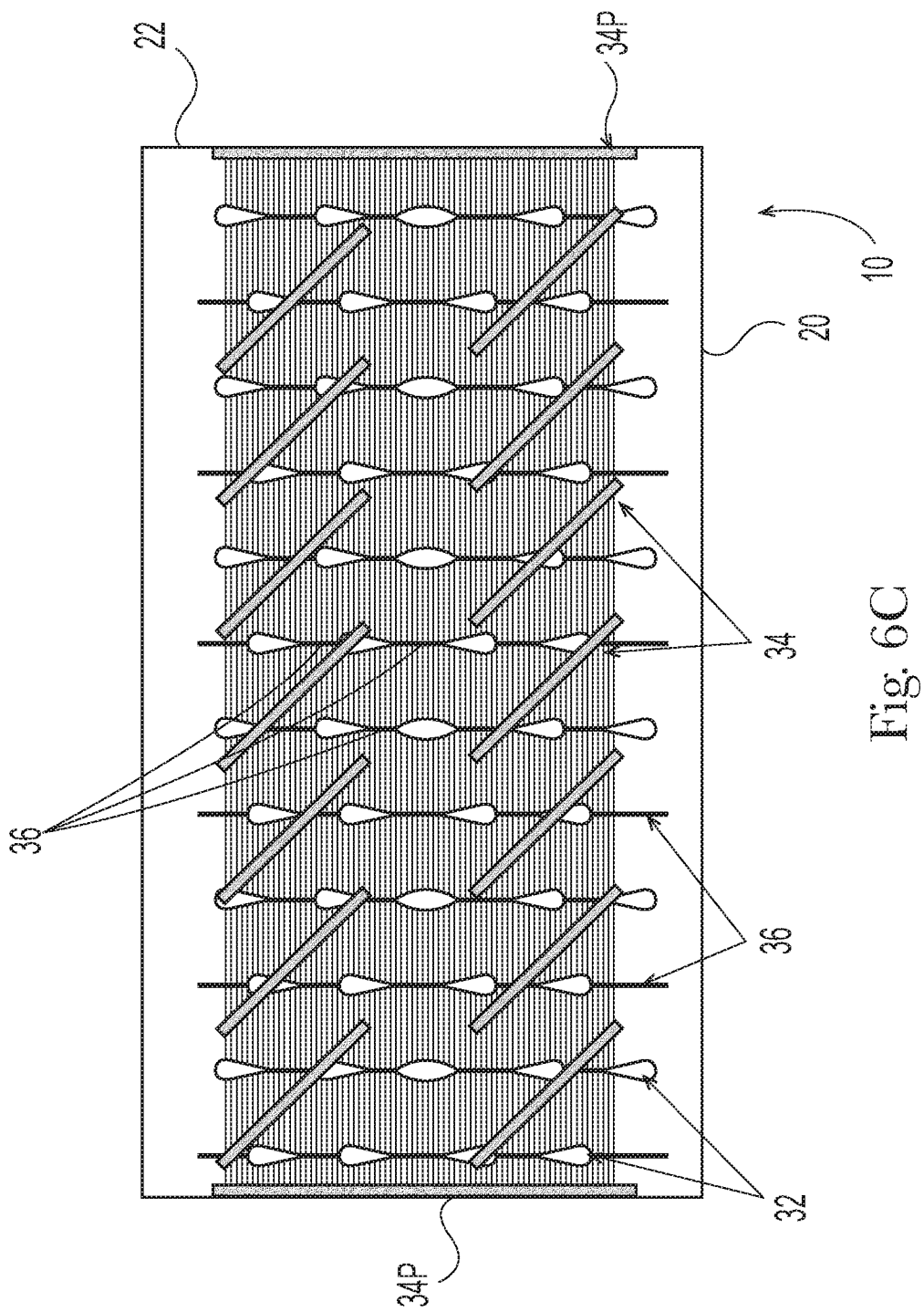
FIG. 6C is a bottom plan view of the cleaning article of FIGS. 6A and 6B.

Referring to FIGS. 6A-6C, the diagonally oriented secondary bonds 34 may be interrupted proximate the longitudinal axis LA. Again, this embodiment provides the benefit of tufts 15 on the longitudinal axis for retention of debris and diagonal bonds to reduce the instantaneous amperage required during manufacture. The secondary bonds 34 may be offset from other secondary bonds 34 in the diagonal direction. This arrangement provides the benefit that placement of the secondary bonds 34 may be customized to the intended cleaning task. As shown in FIGS. 6A-6B, the secondary bonds 34 may be equally or unequally spaced from adjacent secondary bonds 34.

Each of the secondary bonds 34 may have a length C1 of 2 to 8 cm, and a width C2 of 0.1 to 1 cm. The secondary bonds 34 may have a spacing C3 therebetween of 1 to 10 cm. The secondary bonds 34 may form an angle A1 with the longitudinal axis of 30 to 75 degrees. The secondary bonds 34 may have a spacing S3 across the longitudinal axis LA in the transverse direction of 1 to 6 cm. These secondary bonds 34 may intercept both longitudinal edges 220 of the field of tufts 15 to allow convenient entry of debris.

While 14 generally equally spaced secondary bonds 34 are shown, the invention is not so limited. More or fewer secondary bonds 34 of similar or different size and/or spacing may be utilized.

Figure 7A:
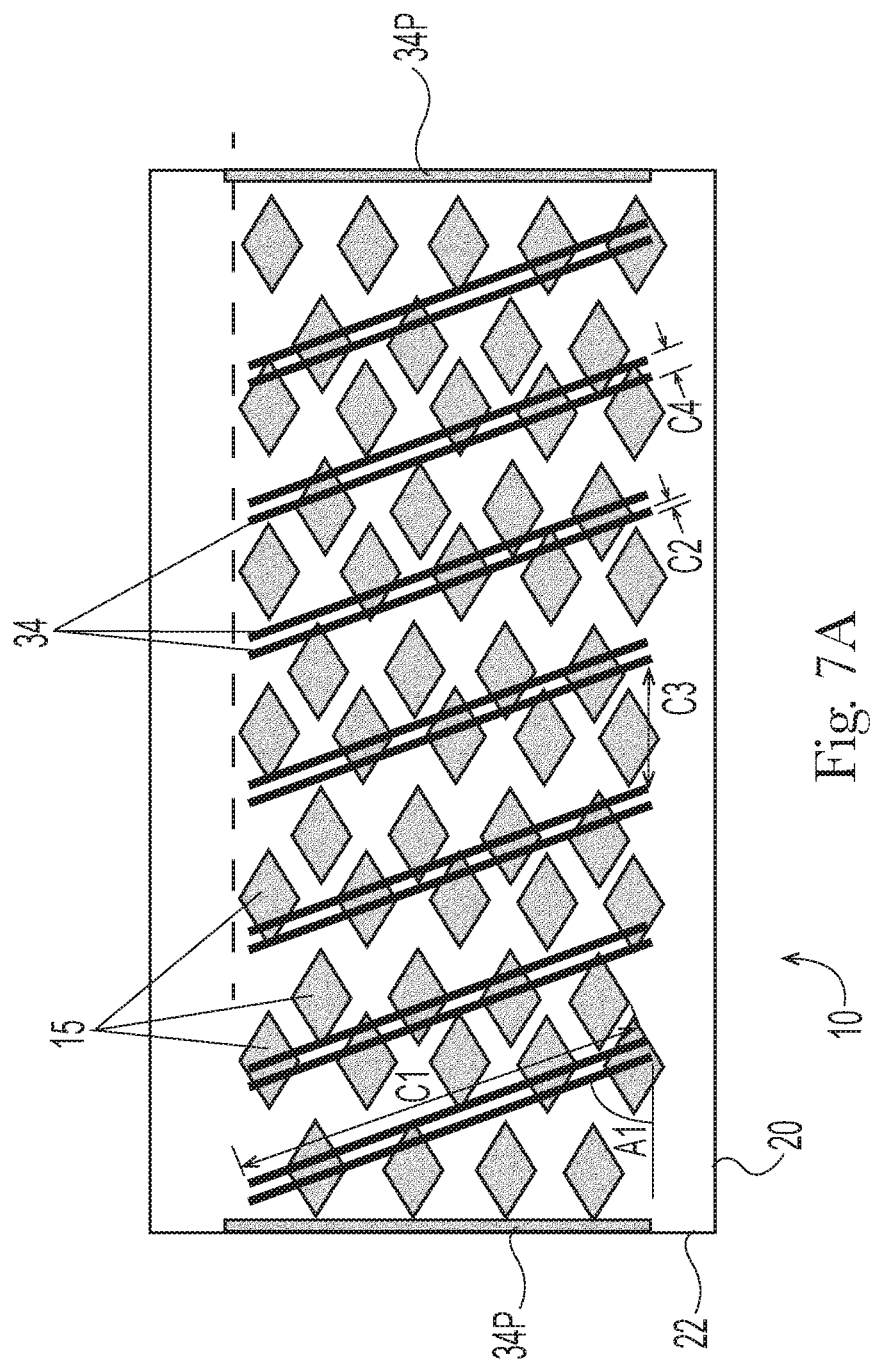
FIG. 7A is a top view of a cleaning article according to the present invention and having discrete tufts represented as diamonds, with paired continuous secondary bonds oriented diagonal to the transverse axis.
Figure 7B:
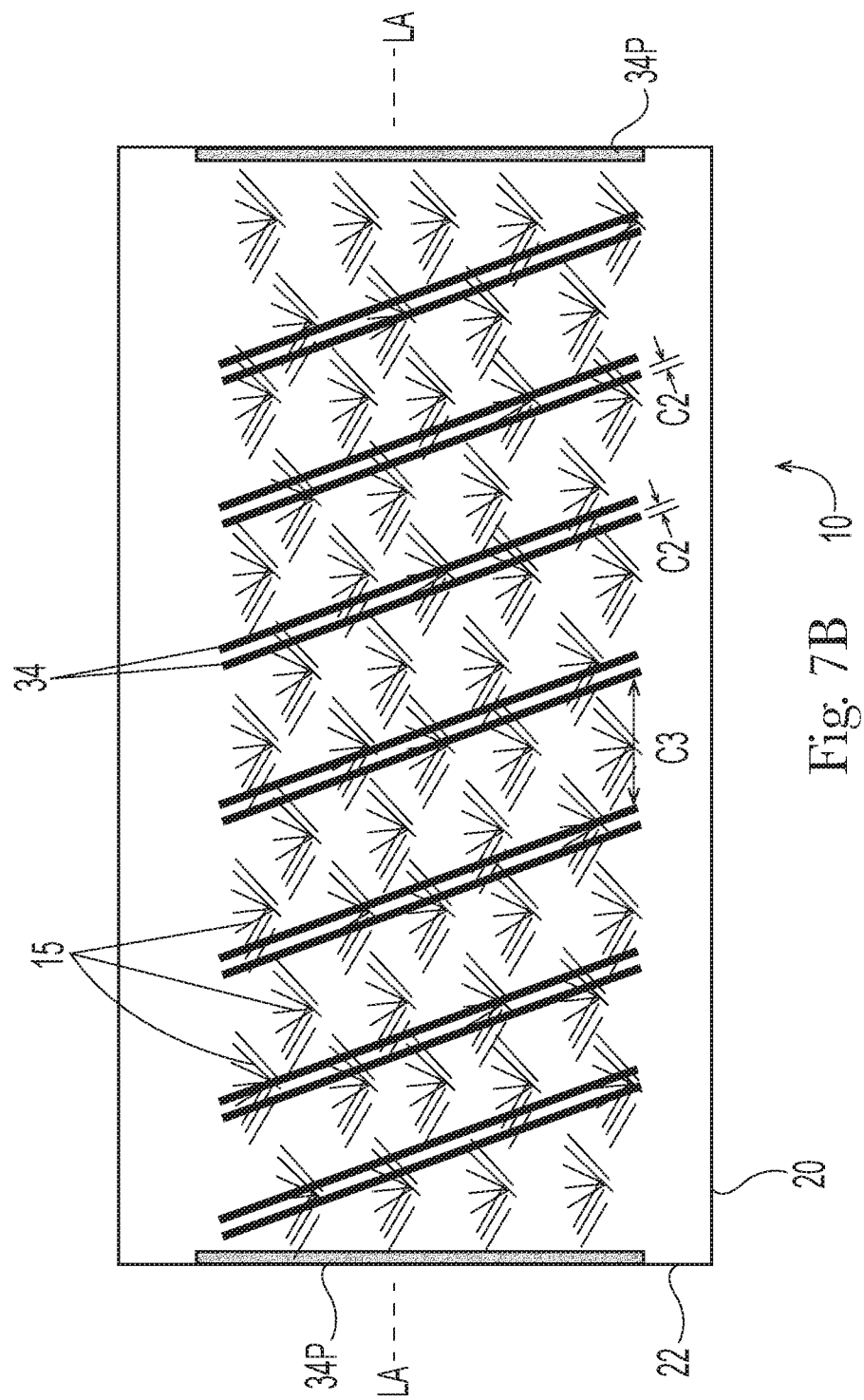
FIG. 7B is a top view of the cleaning article of FIG. 7A having discrete tufts represented with a common proximal end for each tuft.
Figure 7C:
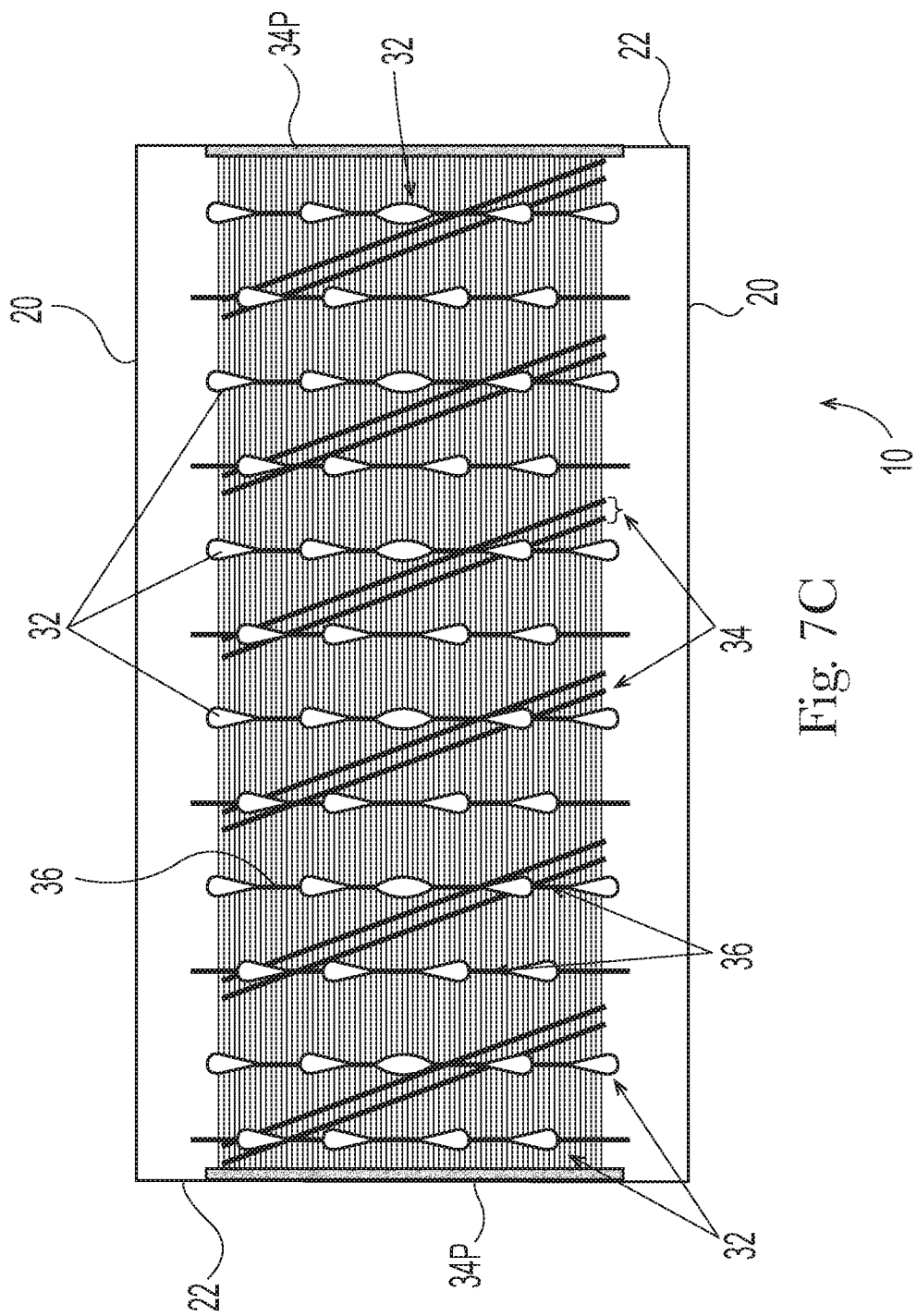
FIG. 7C is a bottom plan view of the cleaning article of FIGS. 7A and 7B.

Referring to FIGS. 7A-7C, the continuous diagonal secondary bond 34 lines may be paired. This arrangement provides the benefit of reduced instantaneous amperage requirements at any point in time due to the advantageous combination of paired secondary bonds 34 and diagonal orientation.

Each of the secondary bonds 34 may have a length C1 of 11 to 20 cm, and a width C2 of 0.05 to 0.5 cm. The secondary bond 34 pairs may have a spacing C3 therebetween of 1 to 10 cm. The secondary bonds 34 may have a spacing from a paired secondary bond 34 of 0.1 to 1 cm. The secondary bonds 34 may form an angle A1 with the longitudinal axis of 30 to 75 degrees. These secondary bonds 34 may intercept both longitudinal edges 220 of the field of tufts 15 to allow convenient entry of debris.

While 7 pairs of equally spaced secondary bonds 34 are shown, the invention is not so limited. More or fewer pairs of secondary bonds 34 of similar or different size and/or spacing may be utilized.

Figure 8A:
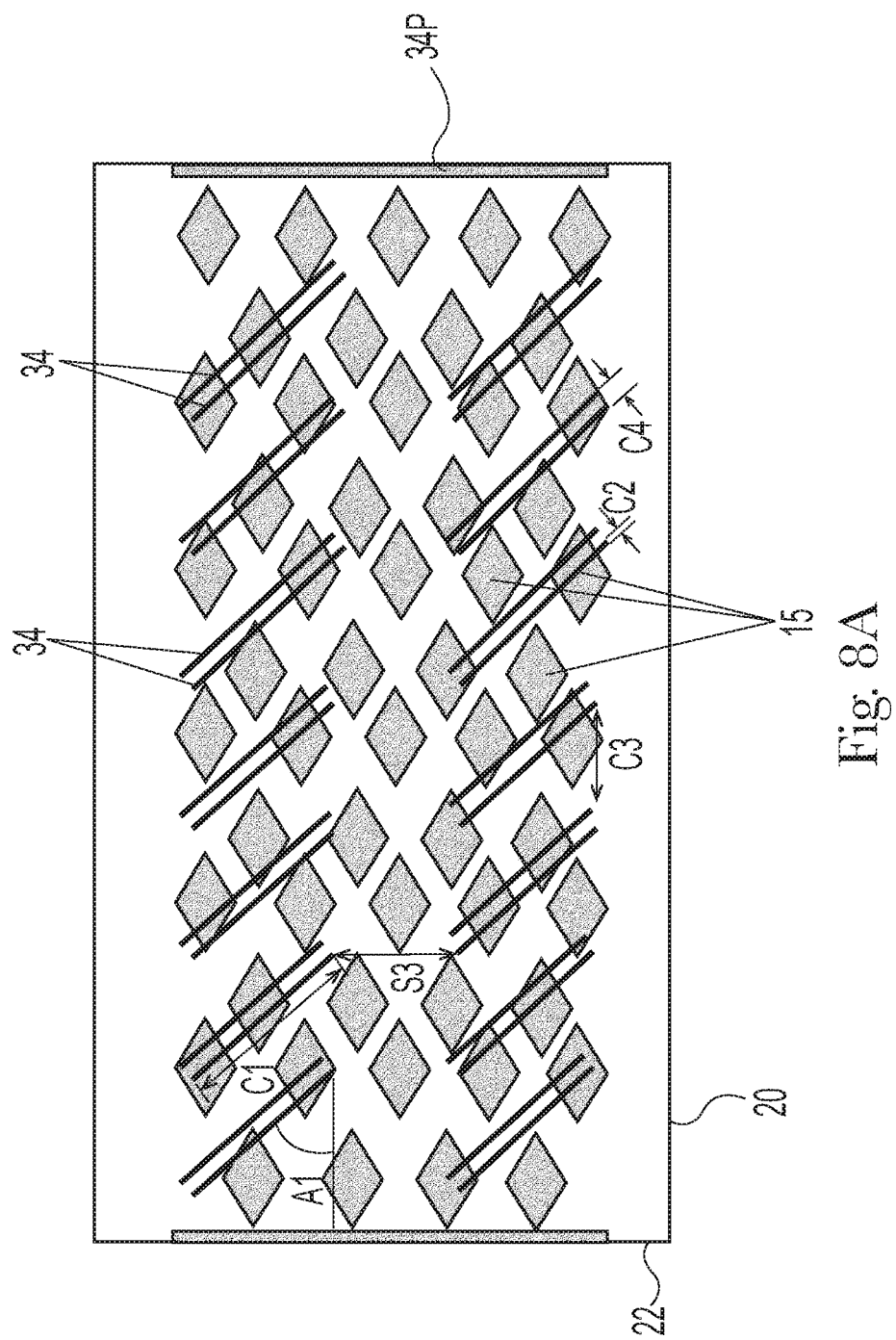
FIG. 8A is a top view of a cleaning article according to the present invention and having discrete tufts represented as diamonds, with offset paired interrupted secondary bonds oriented diagonal to the transverse axis.
Figure 8B:
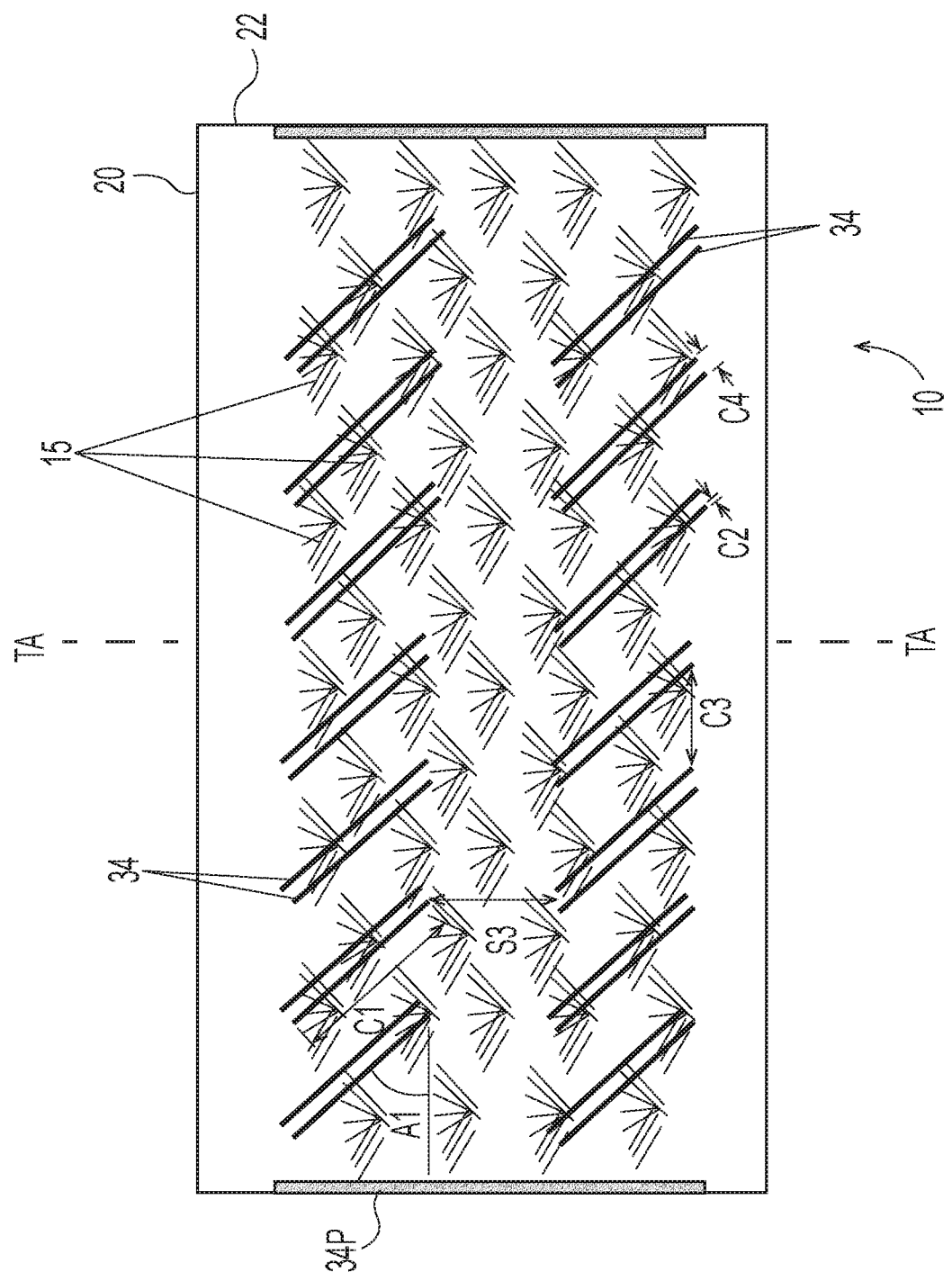
FIG. 8B is a top view of the cleaning article of FIG. 8A having discrete tufts represented with a common proximal end for each tuft.
Figure 8C:
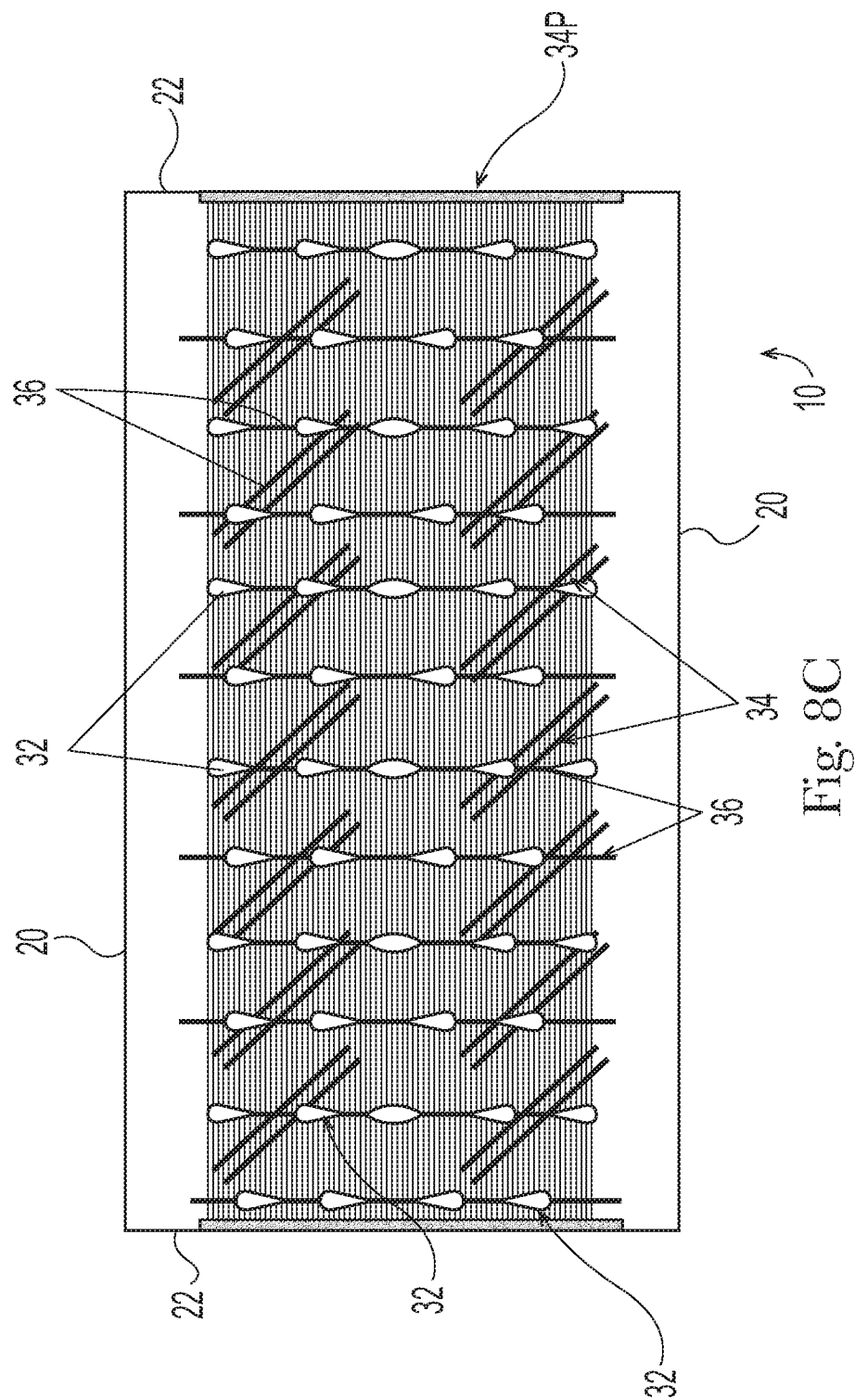
FIG. 8C is a bottom plan view of the cleaning article of FIGS. 8A and 8B.

Referring to FIGS. 8A-8C, the secondary bonds 34 may be paired, diagonally oriented, interrupted and offset from the secondary bonds 34 disposed on the other side of the longitudinal axis LA. This arrangement advantageously further reduces the instantaneous amperage required for ultrasonically bonding or thermally bonding the secondary bonds 34. Again, the tufts 15 proximate the longitudinal axis LA are retained, advantageously increasing capacity for debris.

Each of the secondary bonds 34 may have a length C1 of 2 to 8 cm, and a width C2 of 0.5 to 5 cm. The secondary bond 34 pairs may have a spacing C3 therebetween of 1 to 10 cm and a spacing C4 between paired secondary bonds 34 of 01 to 1 cm. The secondary bonds 34 may form an angle A1 with the longitudinal axis of 30 to 75 degrees. The secondary bonds 34 may have a spacing S3 across the longitudinal axis LA in the transverse direction of 1 to 6 cm. These secondary bonds 34 may intercept both longitudinal edges 220 of the field of tufts 15 to allow convenient entry of debris.

While 14 pairs of generally equally spaced secondary bonds 34 are shown, the invention is not so limited. More or fewer secondary bonds 34 of similar or different size and/or spacing may be utilized.

Referring to FIGS. 9A-12C, 19A-19C and 22A-22C, the secondary bonds 34 may be continuous chevrons, bridging across the longitudinal axis LA. Chevrons provide the benefit of reduced instantaneous amperage requirements for thermal bonding and ultrasonic bonding of the secondary bonds 34. The diagonal legs of the chevron each provide for retention of debris in the channels of the secondary bonds 34. The chevrons advantageously provide for diagonally oriented channels in two different directions. The two different orientations provide the benefit of intercepting dirt in different directions as the cleaning motion occurs in various directions.

Figure 9B:
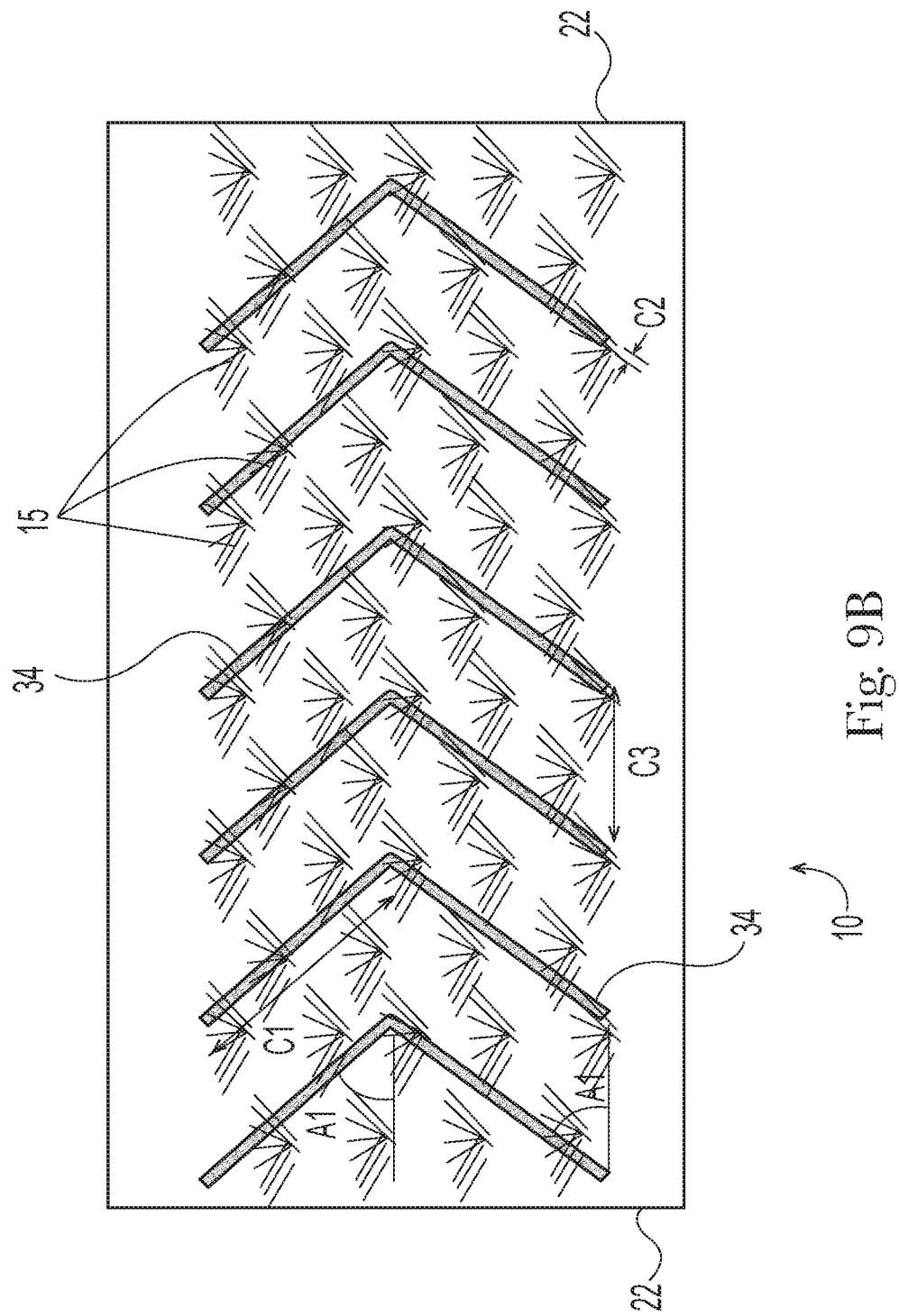
FIG. 9B is a top view of the cleaning article of FIG. 9A having discrete tufts represented with a common proximal end for each tuft.
Figure 9C:
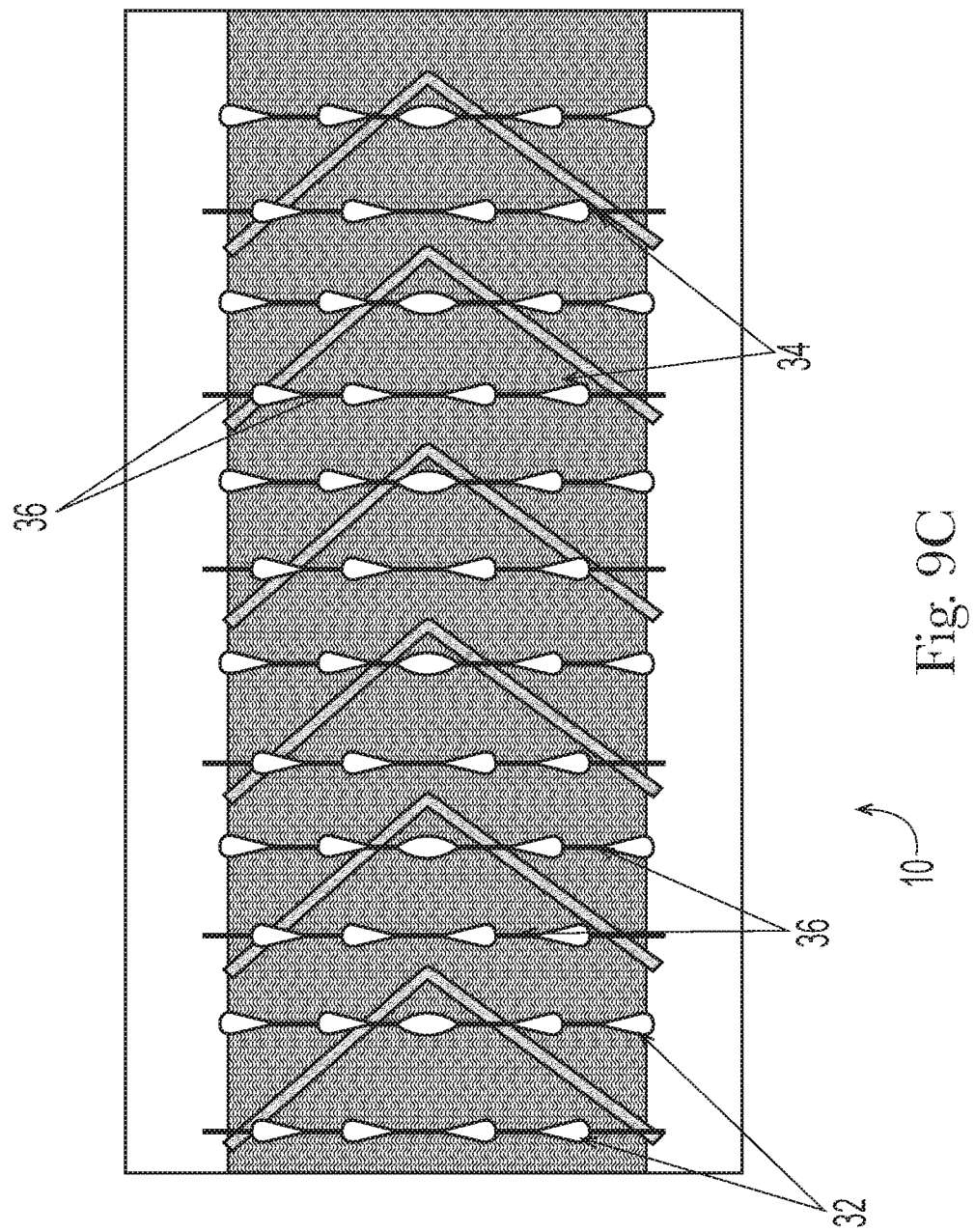
FIG. 9C is a bottom plan view of the cleaning article of FIGS. 9A and 9B.

FIGS. 9A-9C also show the absence of optional perimeter bonds 34P Eliminating the perimeter bonds 34P provides the benefit of reduced amperage necessary to form the perimeter bonds 34P, particularly if the perimeter bonds 34P are parallel to the transverse direction. Of course, tow fibers may become dislodged without the perimeter bonds 34P.

Each leg of the secondary bonds 34 may have a length C1 of 5 to 10 cm, and a width C2 of 0.1 to 1 cm. The secondary bond 34 may have a spacing C3 therebetween of 1 to 10 cm. The secondary bonds 34 may form an angle A1 with the longitudinal axis of 30 to 75 degrees. These secondary bonds 34 may intercept both longitudinal edges 220 of the field of tufts 15 to allow convenient entry of debris.

While six equally spaced secondary bonds 34 are shown, the invention is not so limited. More or fewer secondary bonds 34 of similar or different size and/or spacing may be utilized.

Figure 10A:
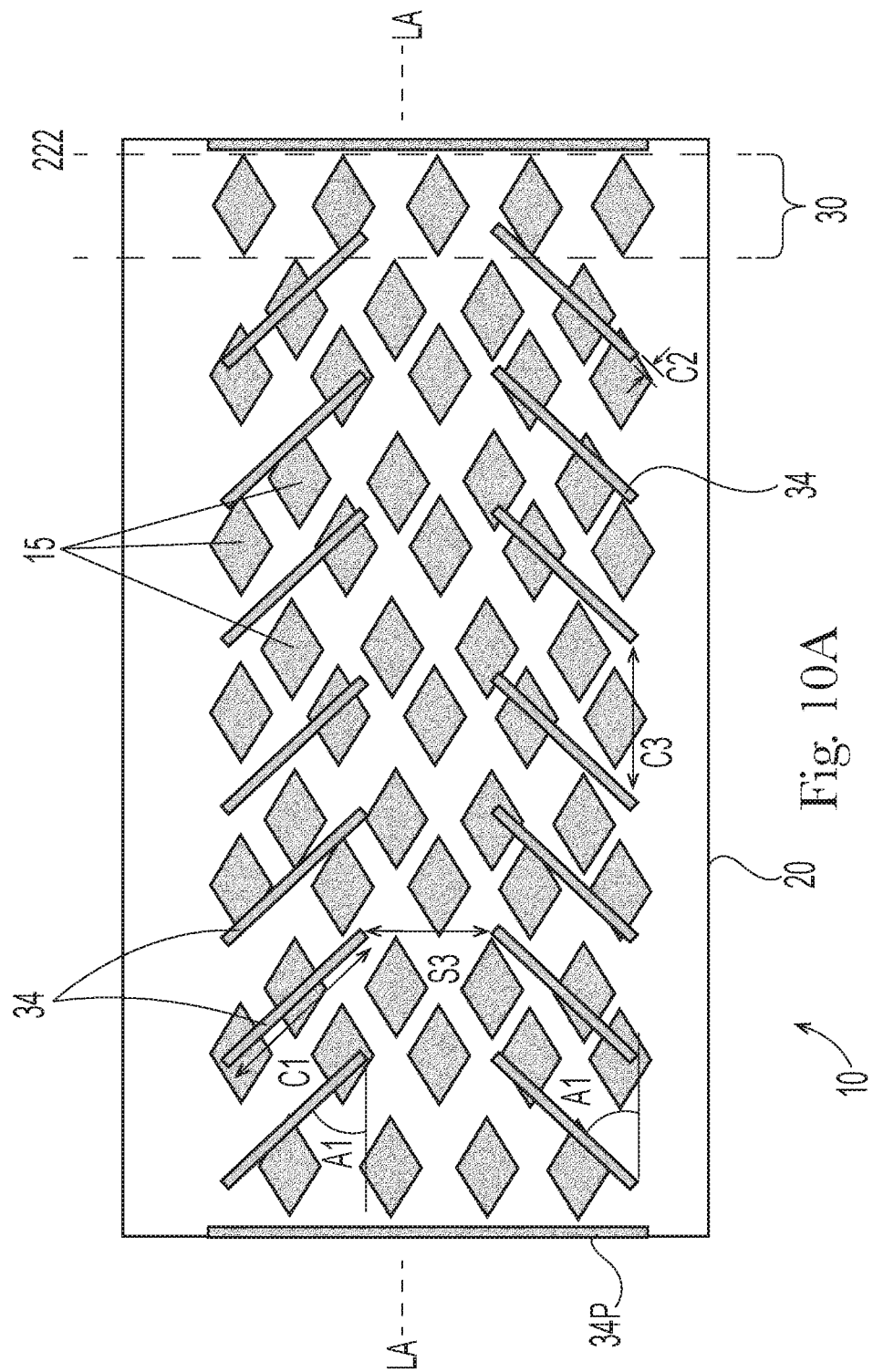
FIG. 10A is a top view of a cleaning article according to the present invention and having discrete tufts represented as diamonds, with interrupted chevron secondary bonds, forming herring bones oriented in the longitudinal direction.
Figure 10B:
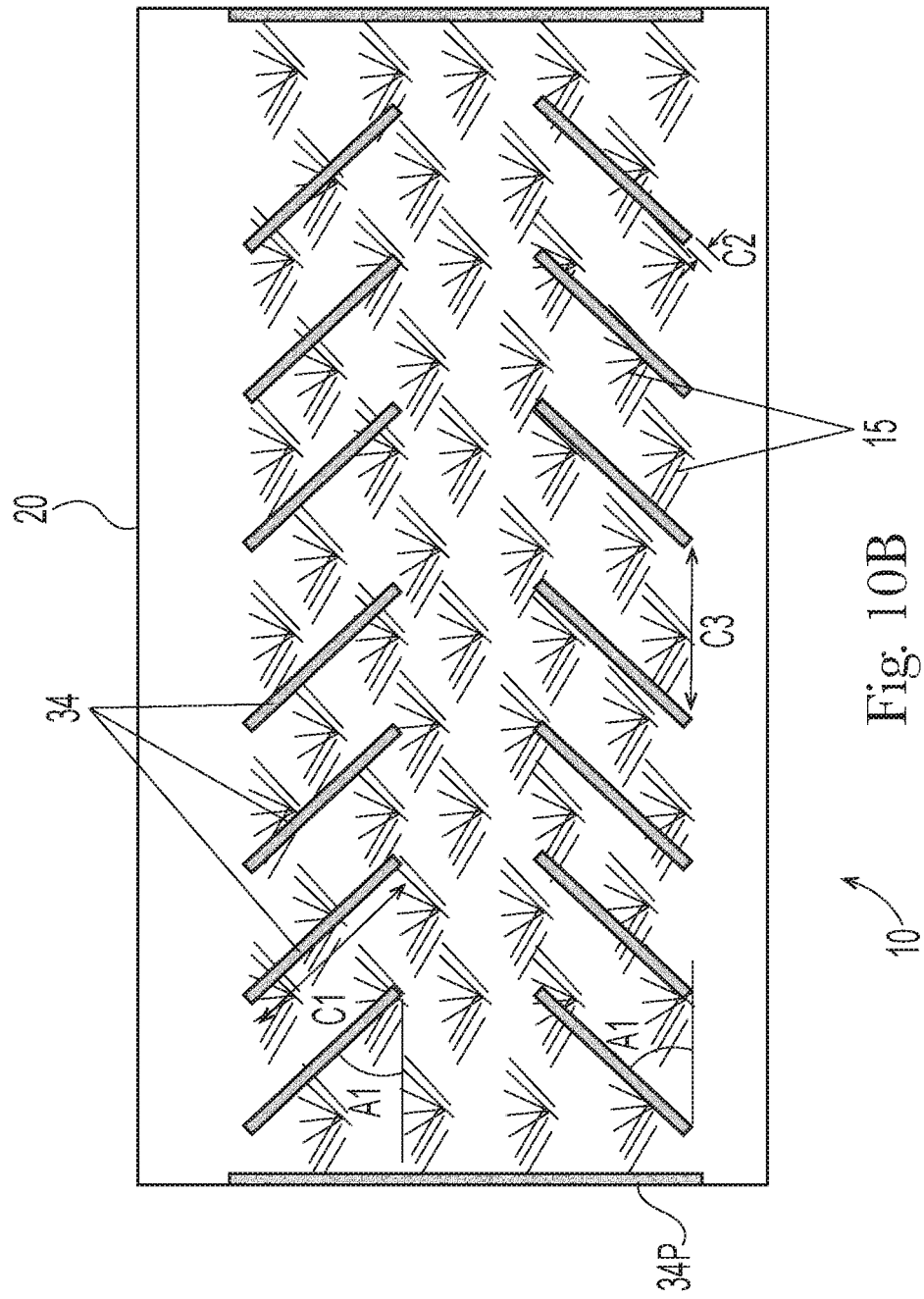
FIG. 10B is a top view of the cleaning article of FIG. 10A having discrete tufts represented with a common proximal end for each tuft.
Figure 10C:
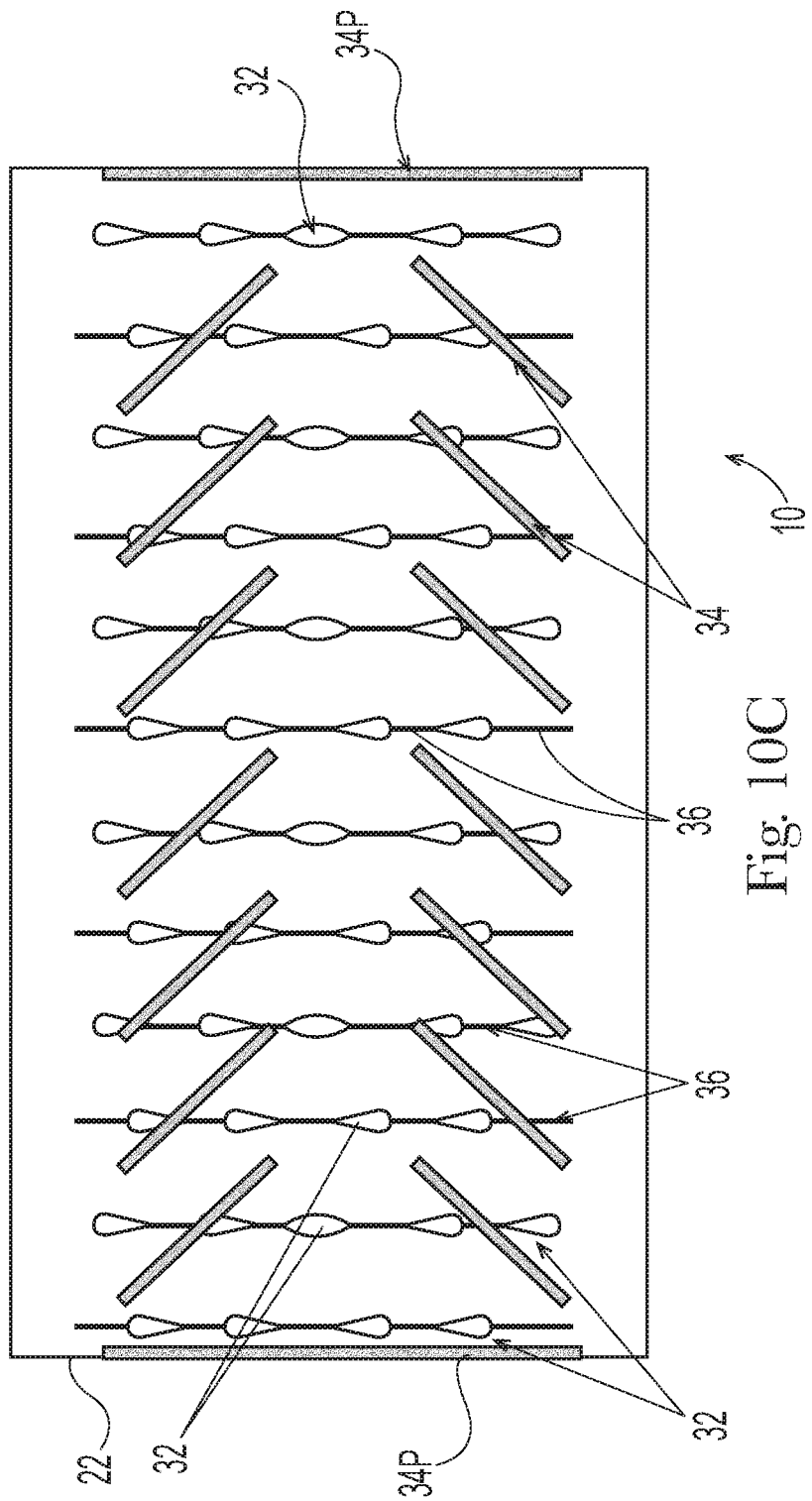
FIG. 10C is a bottom plan view of the cleaning article of FIGS. 10A and 10B.

Referring to FIGS. 10A-10C, the secondary bonds 34 may form an interrupted chevron pattern, forming a herring bone pattern oriented in the longitudinal direction. The herring bone pattern provides the benefit of reduced instantaneous amperage requirements for thermal bonding and ultrasonic bonding of the secondary bonds 34. The diagonal legs of each herring bone provide for retention of debris in the channels of the secondary bonds 34. The herring bone pattern advantageously provides for diagonally oriented channels in two different directions. The two different orientations provide the benefit of intercepting dirt in different directions as the cleaning motion occurs in various directions. The tufts 15 proximate the longitudinal axis LA provide the benefit of increased capacity for debris retention and further reduces the amperage required to form the secondary bonds 34.

While six secondary bonds 34 are shown, the invention is not so limited. More or fewer secondary bonds 34 of similar or different size and/or spacing may be utilized.

Figure 11A:
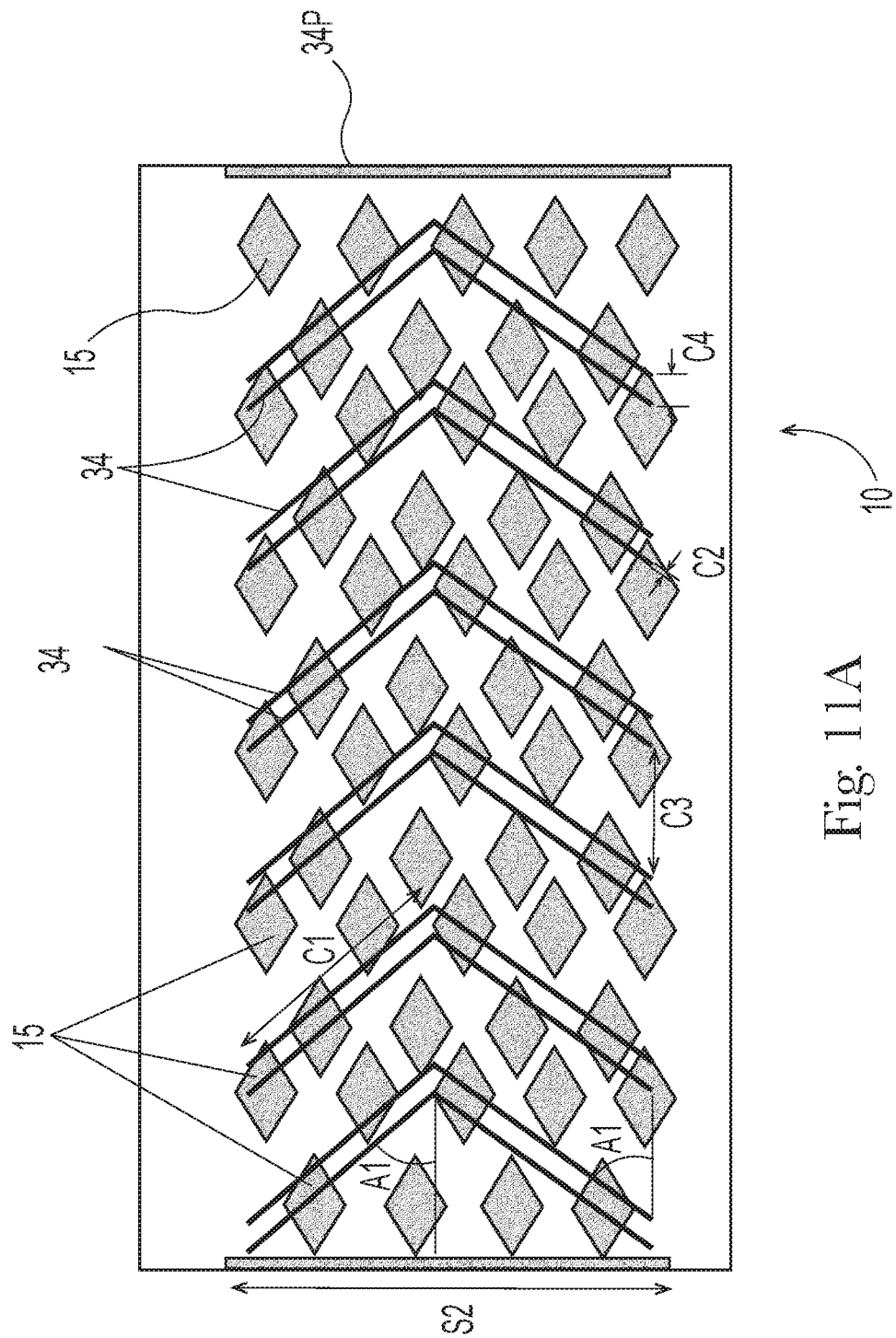
FIG. 11A is a top view of a cleaning article according to the present invention and having discrete tufts represented as diamonds, with paired continuous chevron secondary bonds oriented in the longitudinal direction.

Referring to FIGS. 11A-11C, the secondary bonds 34 may be in the form of paired continuous chevrons. This arrangement provides the benefit of retention at the vertices and more secondary bonds 34 to intercept debris. The secondary bonds 34 may have a transverse span S2 of 10 to 18 cm, each leg of the chevron secondary bond 34 having a length C1 of 5 to 10 cm, a secondary bond 34 width C2 of 0.1 to 1 cm, a spacing C3 between pairs of secondary bonds 34 of 0.1 to 10 cm and a spacing C4 between secondary bonds 34 within a pair of 0.1 to 1 cm. The secondary bonds 34 may be formed on an angle A1 relative to the longitudinal axis LA of 30 to 75 degrees.

While six equally spaced secondary bond 34 pairs are shown, the invention is not so limited. More or fewer secondary bonds 34 of similar or different size and/or spacing may be utilized.

Figure 12A:
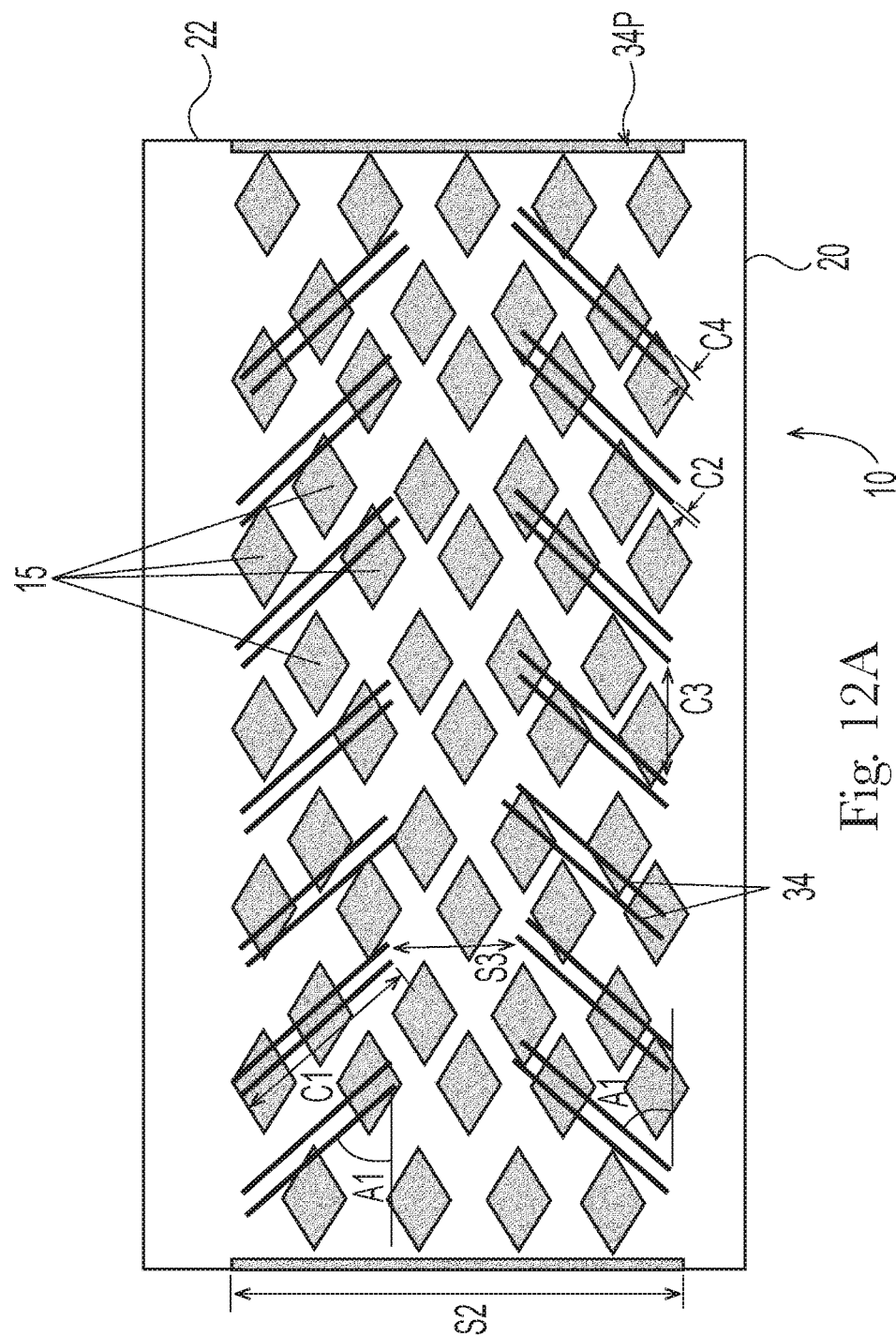
FIG. 12A is a top view of a cleaning article according to the present invention and having discrete tufts represented as diamonds, with pared, interrupted, constant width chevron secondary bonds, forming herring bones oriented in the longitudinal direction.
Figure 12B:
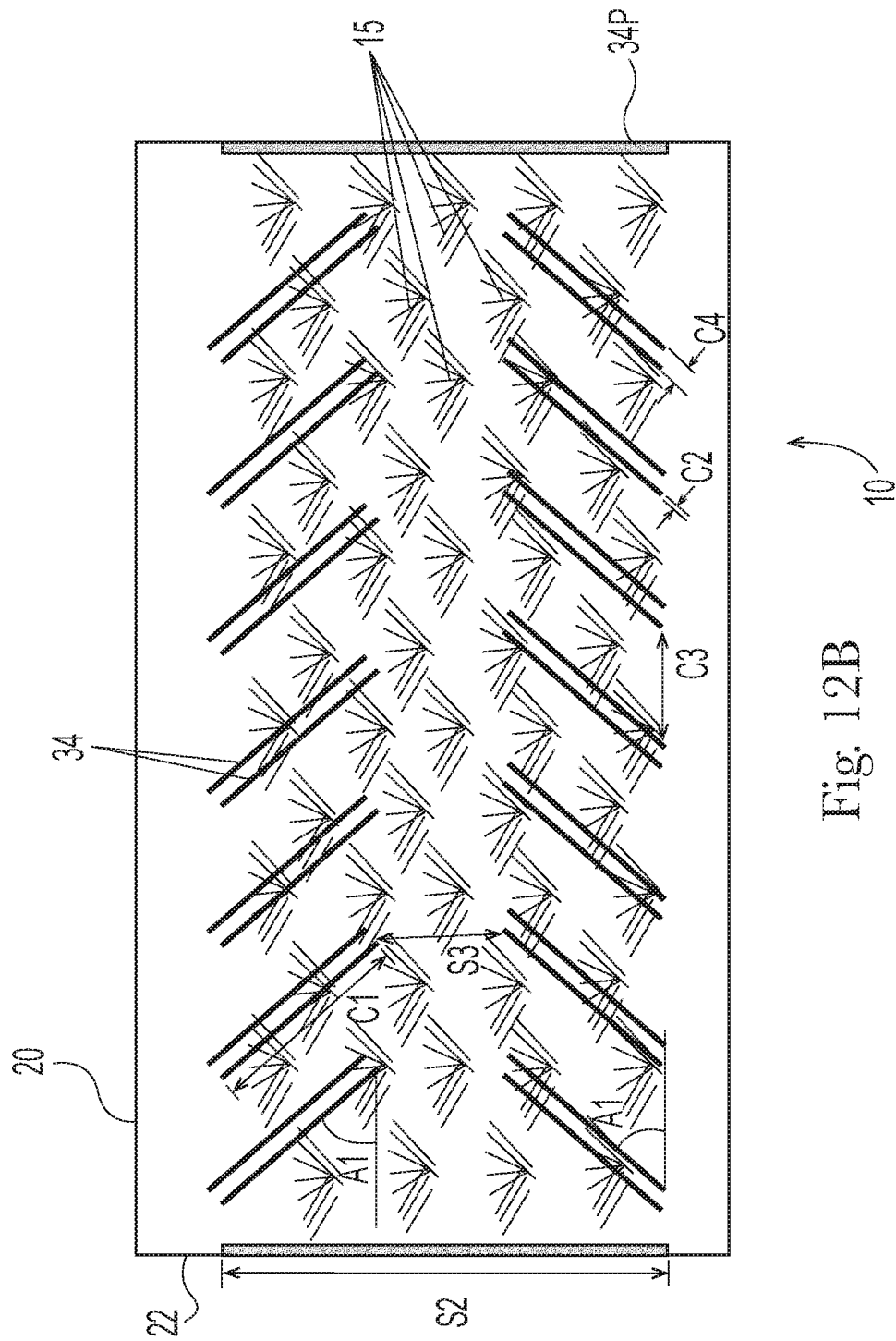
FIG. 12B is a top view of the cleaning article of FIG. 12A having discrete tufts represented with a common proximal end for each tuft.
Figure 12C:
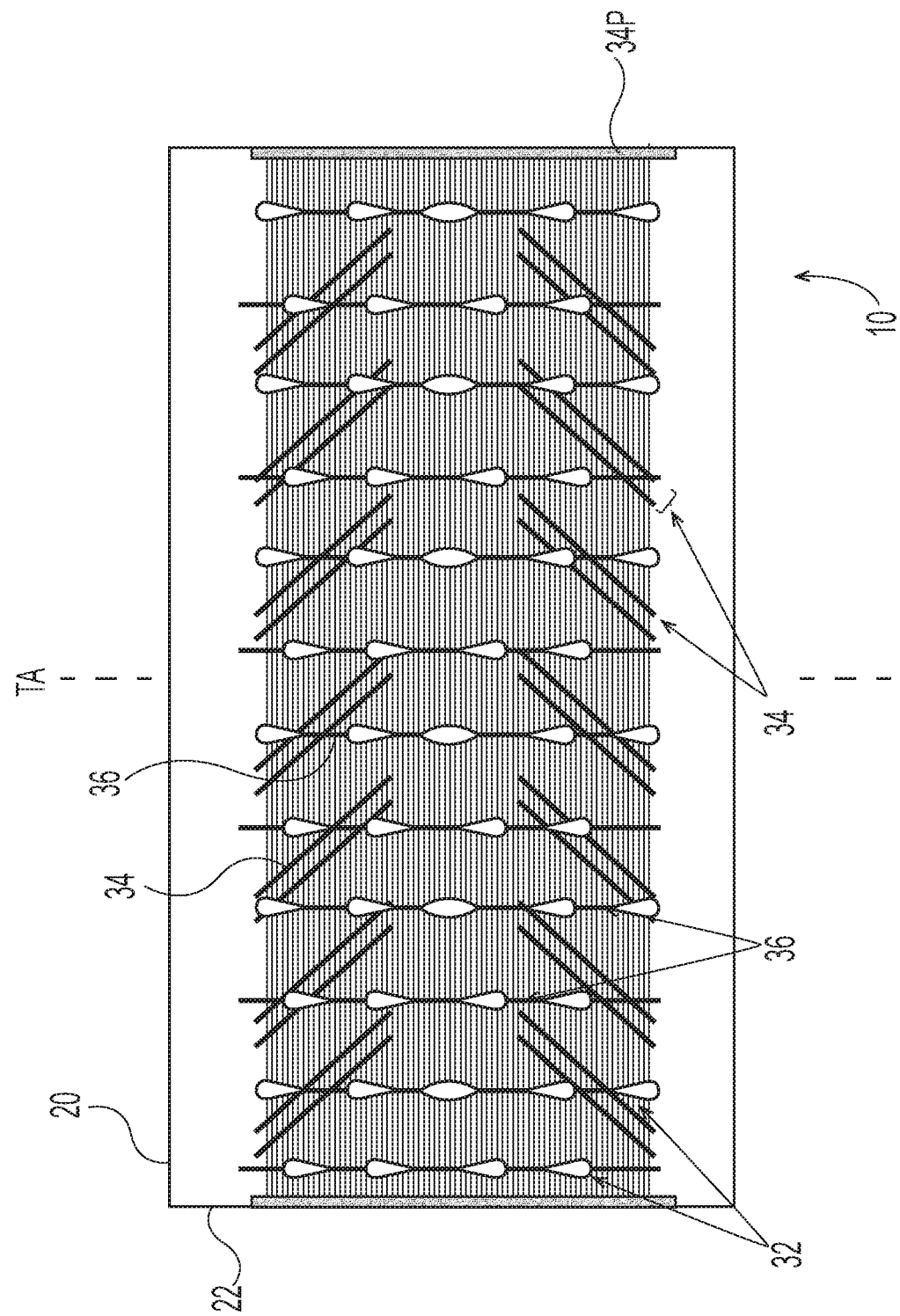
FIG. 12C is a bottom plan view of the cleaning article of FIGS. 12A and 12B.

Referring to FIGS. 12A-12C, the interrupted chevron-shaped secondary bonds 34 may be paired, to provide more channels to intercept debris. The secondary bonds 34 may be spaced apart a distance S3 across the longitudinal axis LA of 1 to 6 cm.

While 14 generally equally spaced secondary bond 34 pairs are shown, the invention is not so limited. More or fewer secondary bonds 34 of similar or different size and/or spacing may be utilized.

Figure 12D:
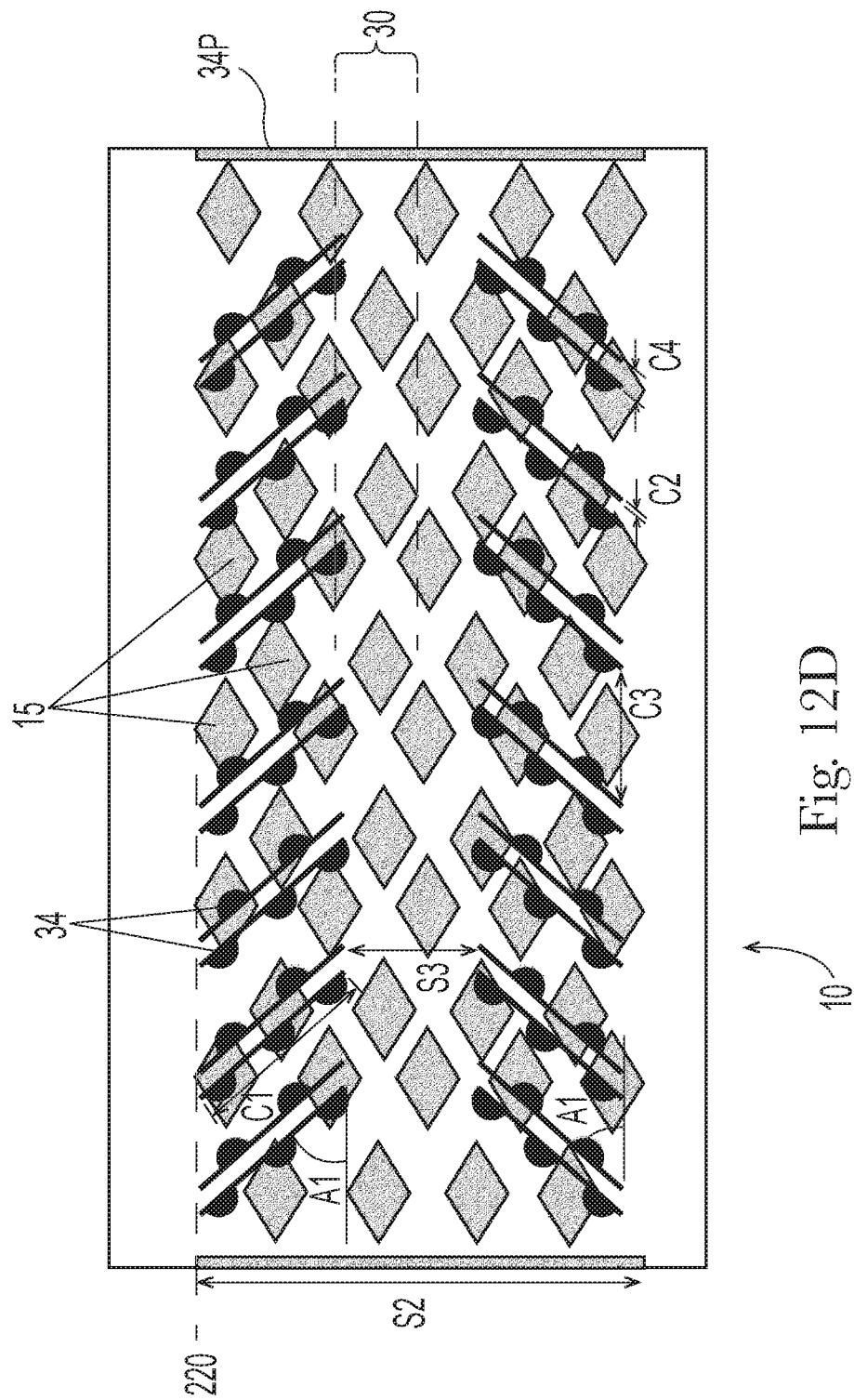
FIG. 12D is a top view of a cleaning article according to the present invention and having discrete tufts represented as diamonds, with pared, interrupted variable width chevron secondary bonds, forming herring bones oriented in the longitudinal direction with offset zones for collection of debris.
Figure 12F:
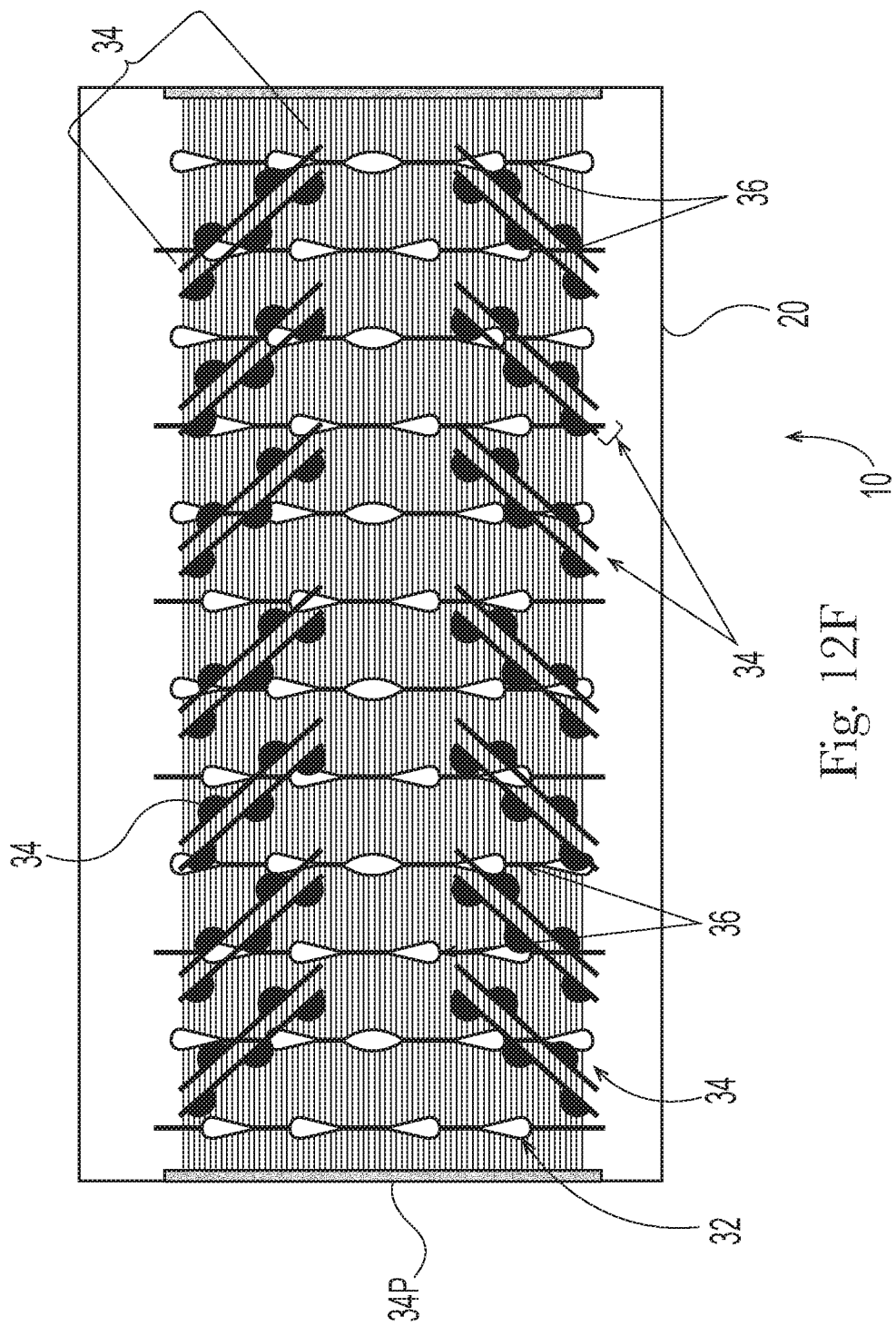
FIG. 12F is a bottom plan view of the cleaning article of FIGS. 12D and 12E.

Referring to FIGS. 12D-12F, any of the aforementioned embodiments may have secondary bonds 34 of variable width. This arrangement provides the benefit of more surface area within the channel formed by a secondary bond. Prophetically, the increased surface area is believed to provide more entrapment of debris within the channel. Likewise the enlarged and relatively wider portion of the secondary bond 34 is believed to increase the reservoir available for accumulation of debris. The enlarged portions of the secondary bonds 34 may be offset in the longitudinal direction provide for accumulation as the user moves the cleaning article in various directions.

Referring to FIGS. 13A-16C, the may be diamond shaped. Of course it is to be recognized that similar shapes, having curvilinear sides and no vertices may be used for the secondary bonds 34. The diamond shaped secondary bonds 34 again provide the benefit of reduced amperage draw during the bonding step of the manufacturing process, due to less bond area being presented at any point in time. The diamond shapes provide the benefit for the secondary bonds 34 of channels which are oriented in opposed directions relative to the longitudinal axis LA, providing more opportunity to entrap debris. The is a symmetrical secondary bond 34 pattern for capturing debris during back and forth cleaning motion.

Figure 13A:
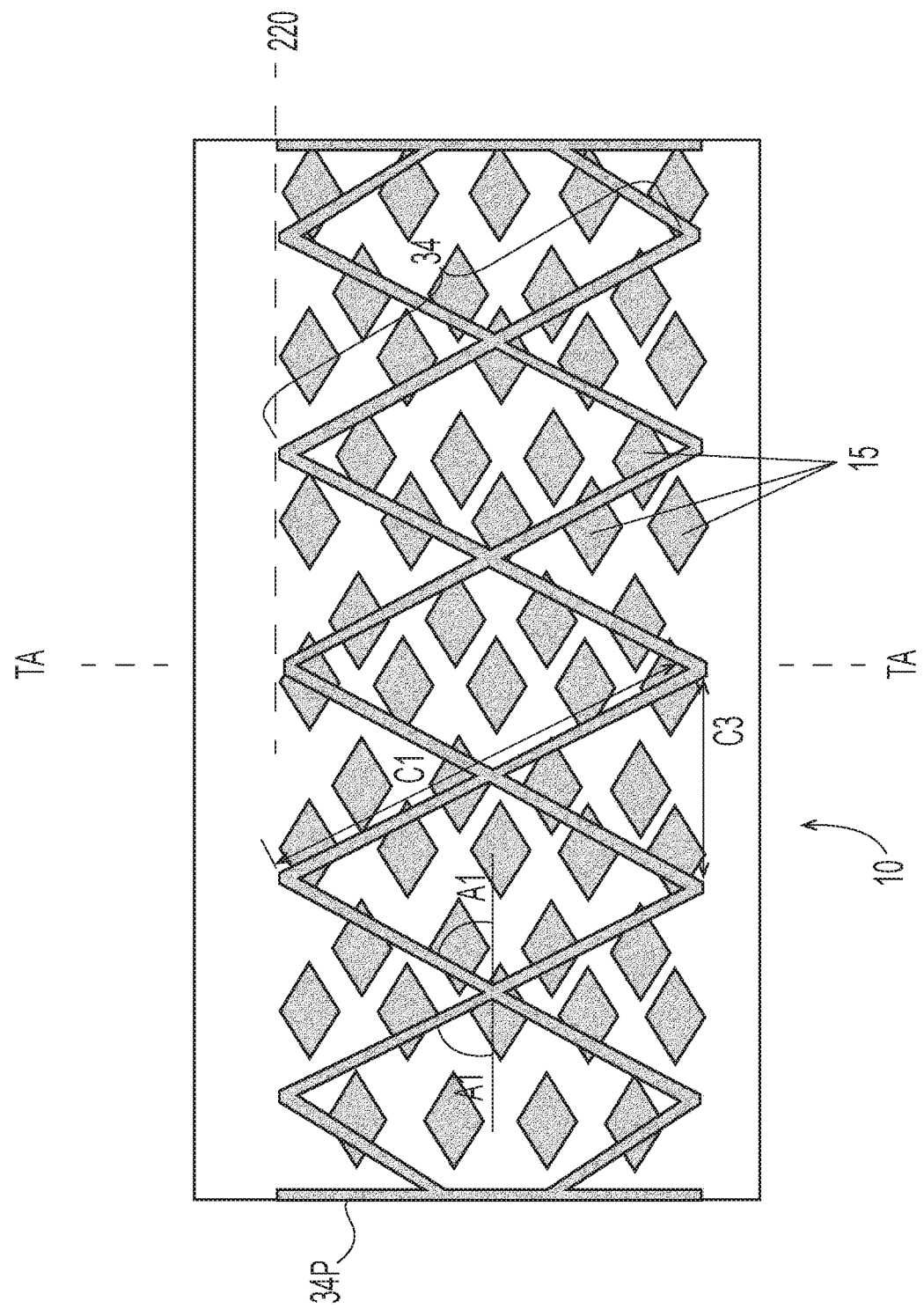
FIG. 13A is a top view of a cleaning article according to the present invention and having discrete tufts represented as diamonds, with continuous secondary bonds forming diamond patterns.
Figure 13B:
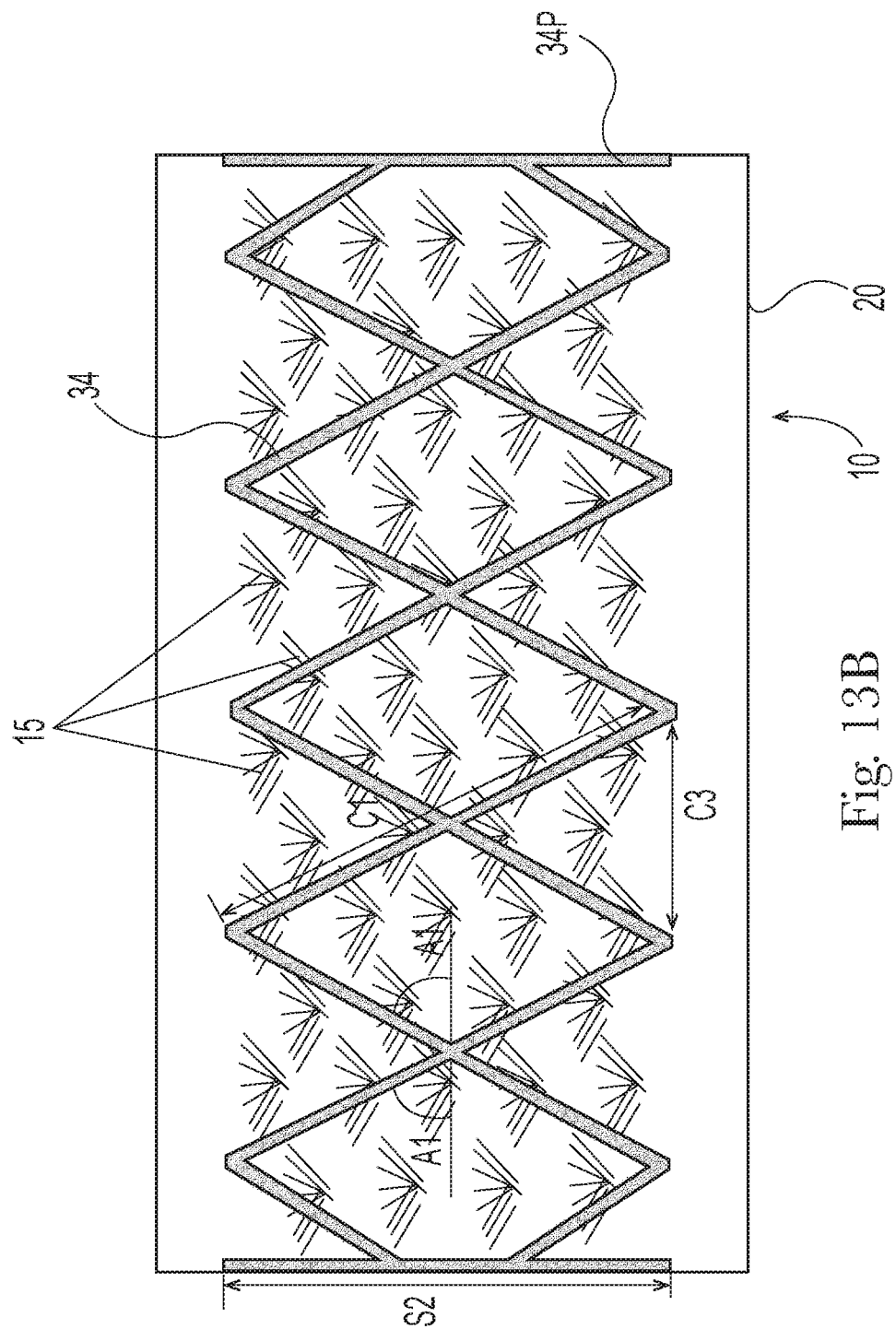
FIG. 13B is a top view of the cleaning article of FIG. 13A having discrete tufts represented with a common proximal end for each tuft.
Figure 13C:
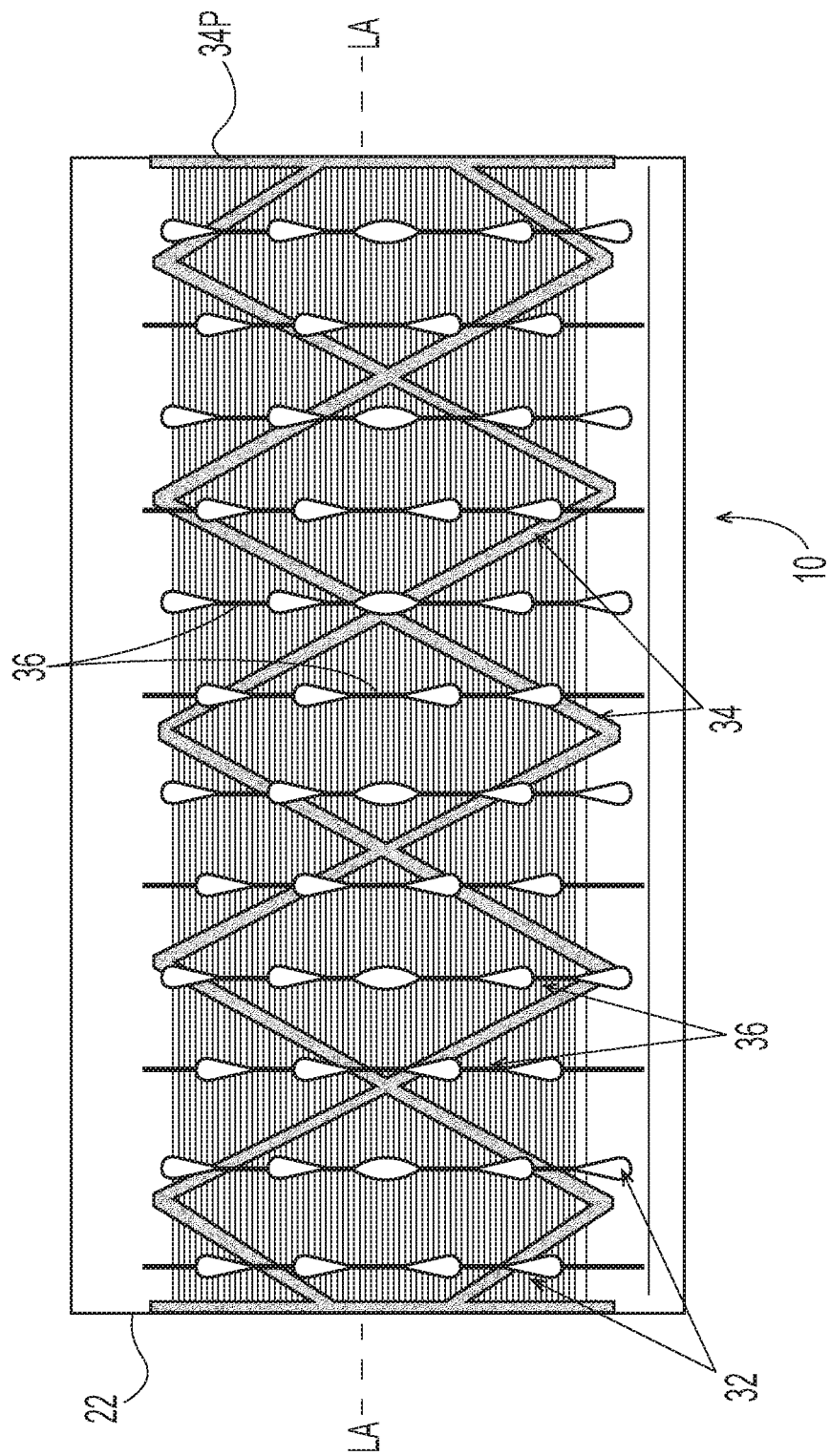
FIG. 13C is a bottom plan view of the cleaning article of FIGS. 13A and 13B.

Referring to FIGS. 13A-13C, the secondary bonds 34 may be solid and continuous from essentially one longitudinal edge of the tuft field 220 to the other. This arrangement provides the benefit of greater secondary bond 34 length. The dimensions of the secondary bonds 34 cited above are believed suitable for this embodiment, with a spacing C3 between vertices of adjacent bonds of 2 to 20 cm and a length C1 of the secondary bond 34 of 11 to 20 cm.

While five full and partial equally spaced diamond shaped secondary bonds 34 are shown, the invention is not so limited. More or fewer secondary bonds 34 of similar or different size and/or spacing may be utilized.

Figure 14A:
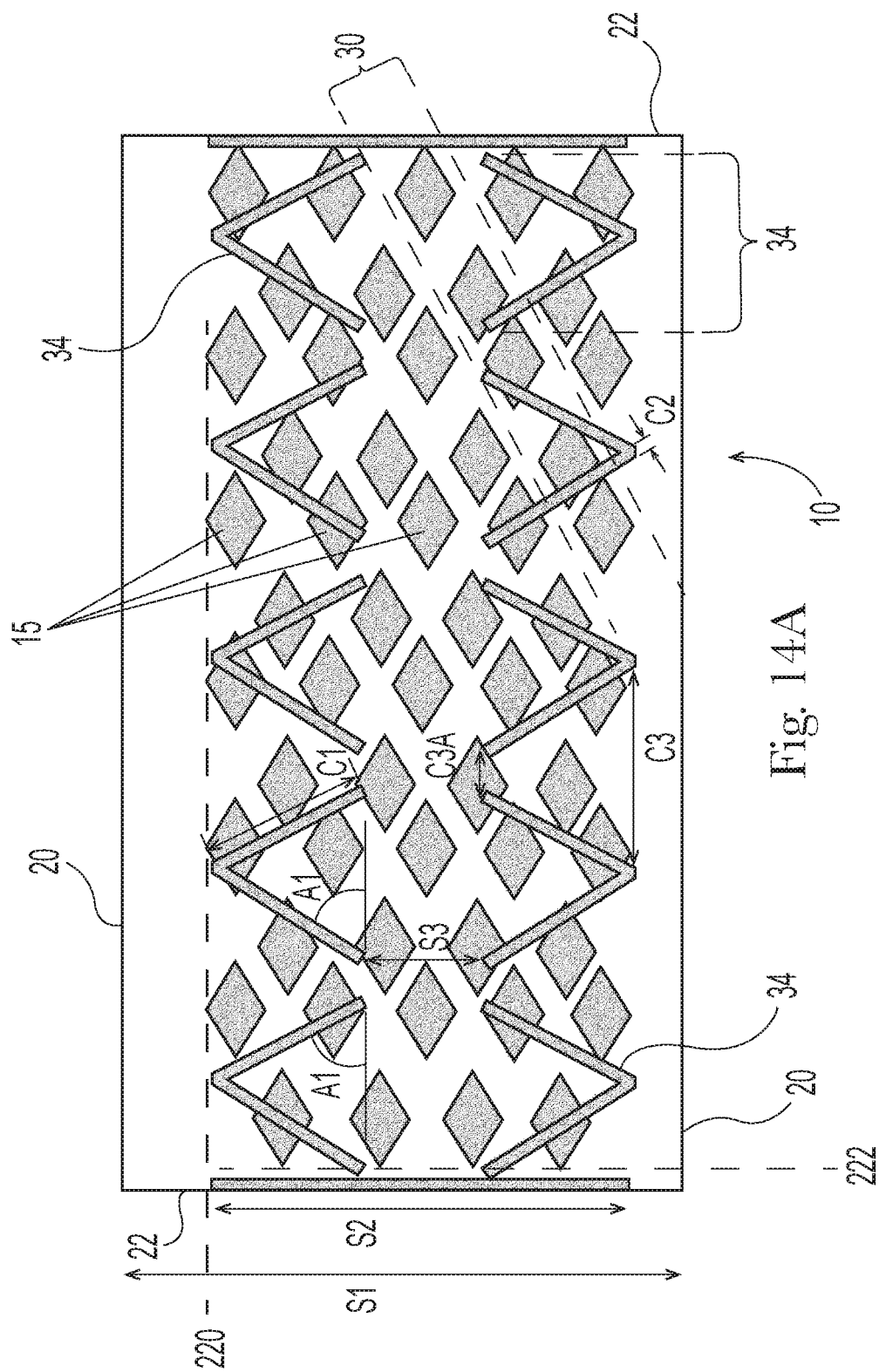
FIG. 14A is a top view of a cleaning article according to the present invention and having discrete tufts represented as diamonds, with interrupted secondary bonds forming diamond patterns.
Figure 14B:
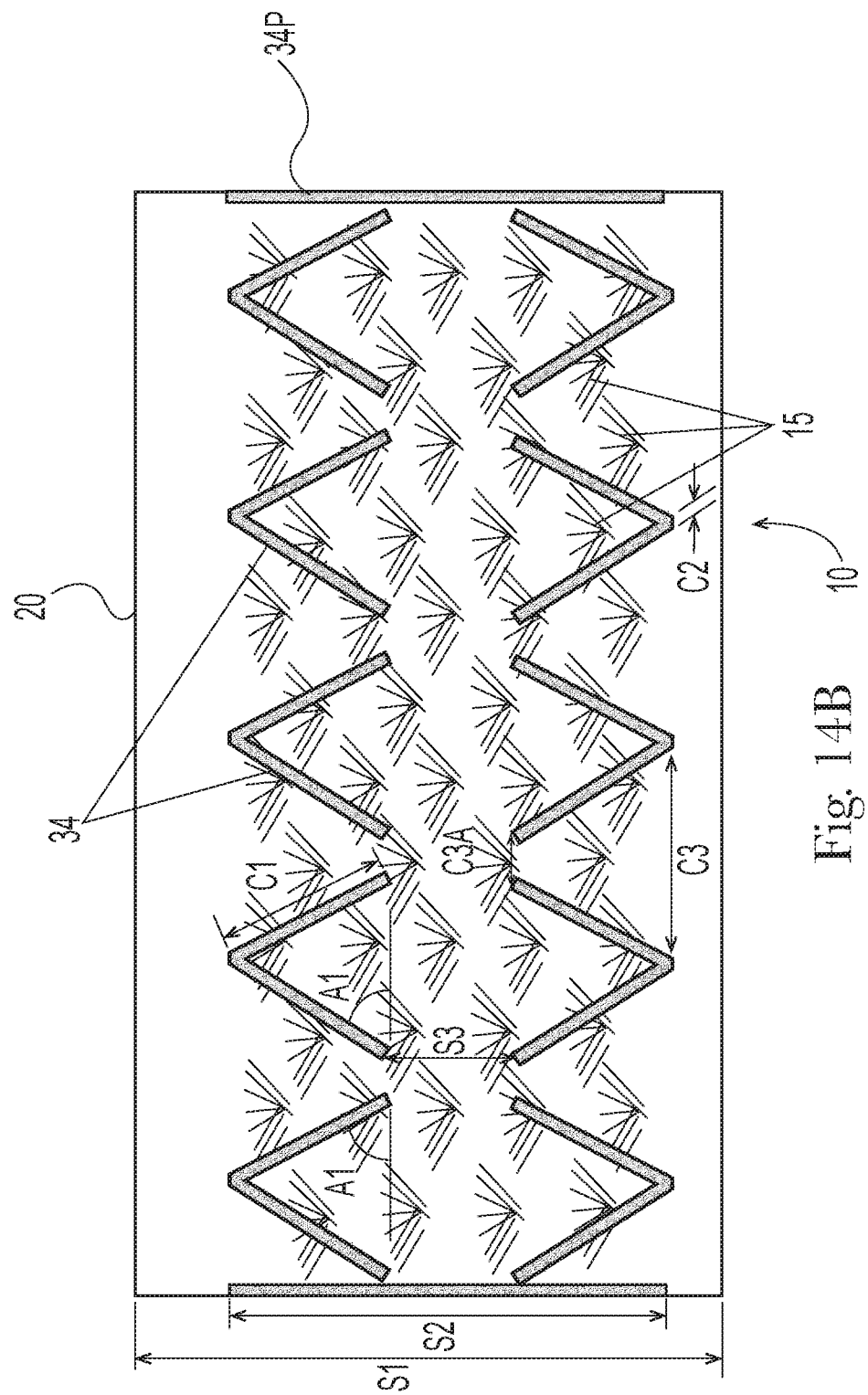
FIG. 14B is a top view of the cleaning article of FIG. 14A having discrete tufts represented with a common proximal end for each tuft.
Figure 14C:
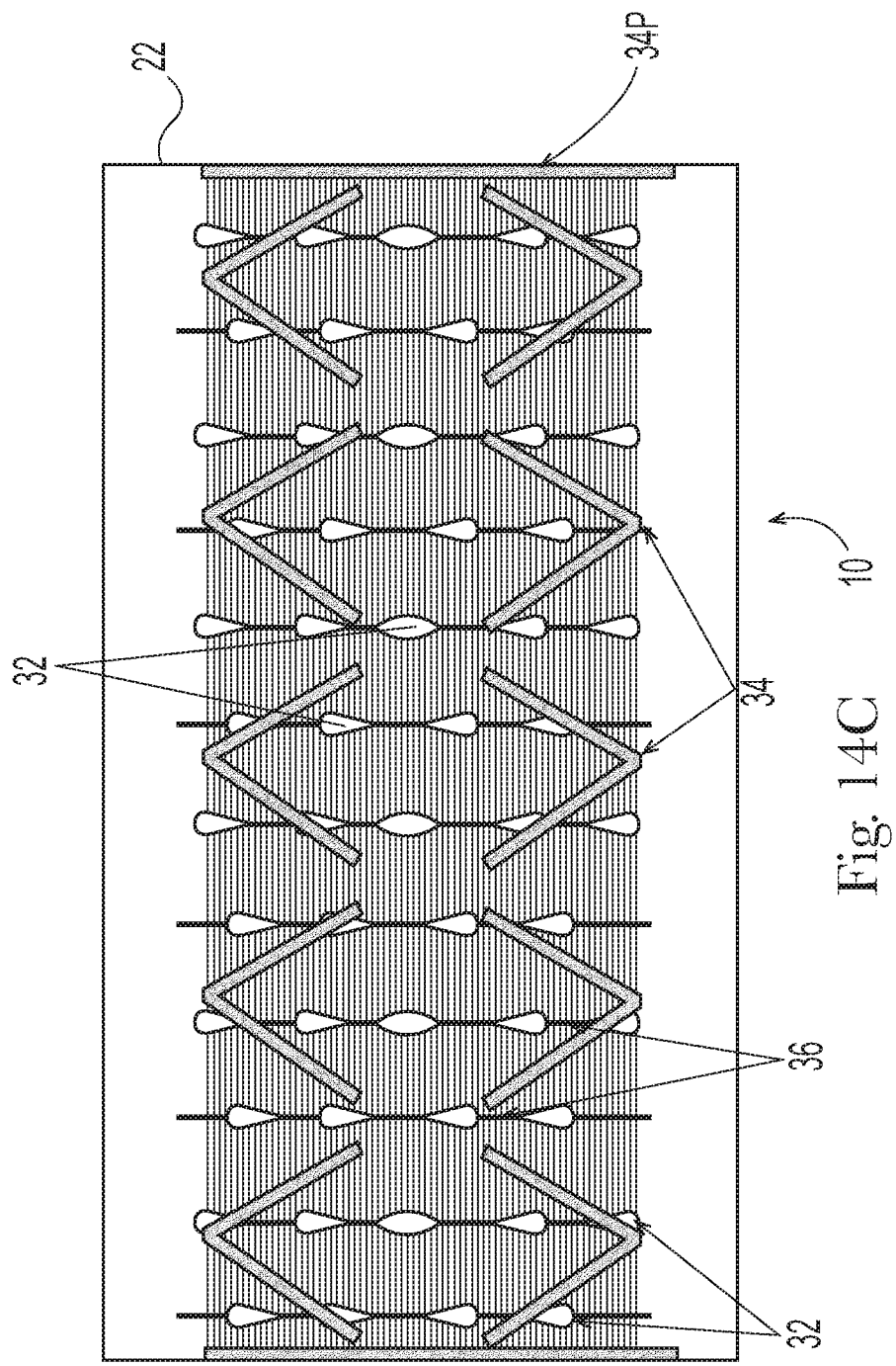
FIG. 14C is a bottom plan view of the cleaning article of FIGS. 14A and 14B.

Referring to FIGS. 14A-14C, the diamond shaped secondary bonds 34 may be interrupted proximate the centerline. This arrangement provides the benefit of tufts 15 proximate the longitudinal axis LA for capacity, while retaining the aforementioned symmetry. The secondary bonds 34 may be spaced apart a distance in the transverse direction S3 of 1 to 6 cm. The open end of a secondary bond 34 may be spaced from an adjacent open end a longitudinal distance A3A 2 to 10 cm.

While 10 equally spaced diamond shaped secondary bonds 34 are shown, the invention is not so limited. More or fewer secondary bonds 34 of similar or different size and/or spacing may be utilized.

Figure 15A:
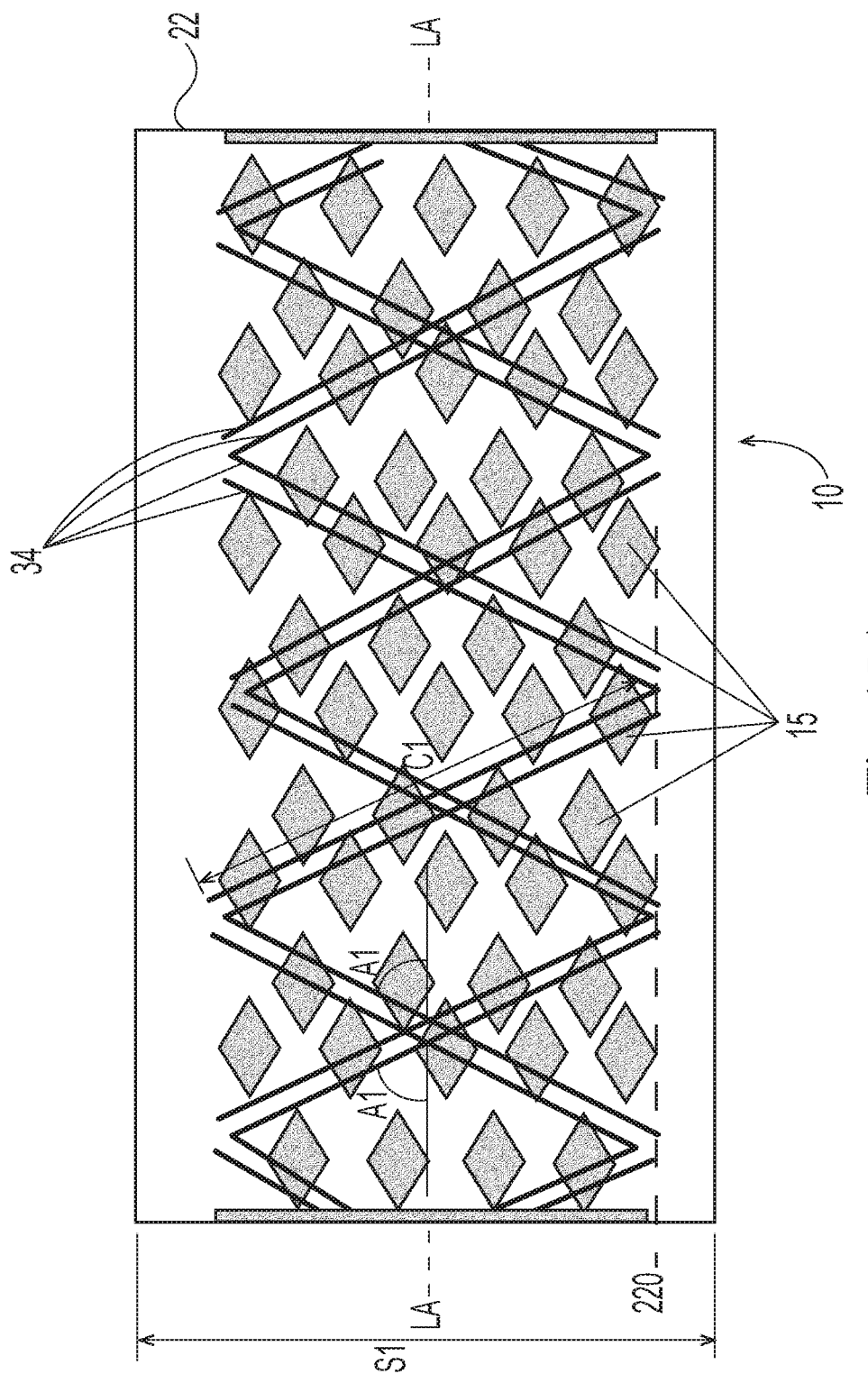
FIG. 15A is a top view of a cleaning article according to the present invention and having discrete tufts represented as diamonds, with paired continuous secondary bonds forming diamond patterns.
Figure 15C:
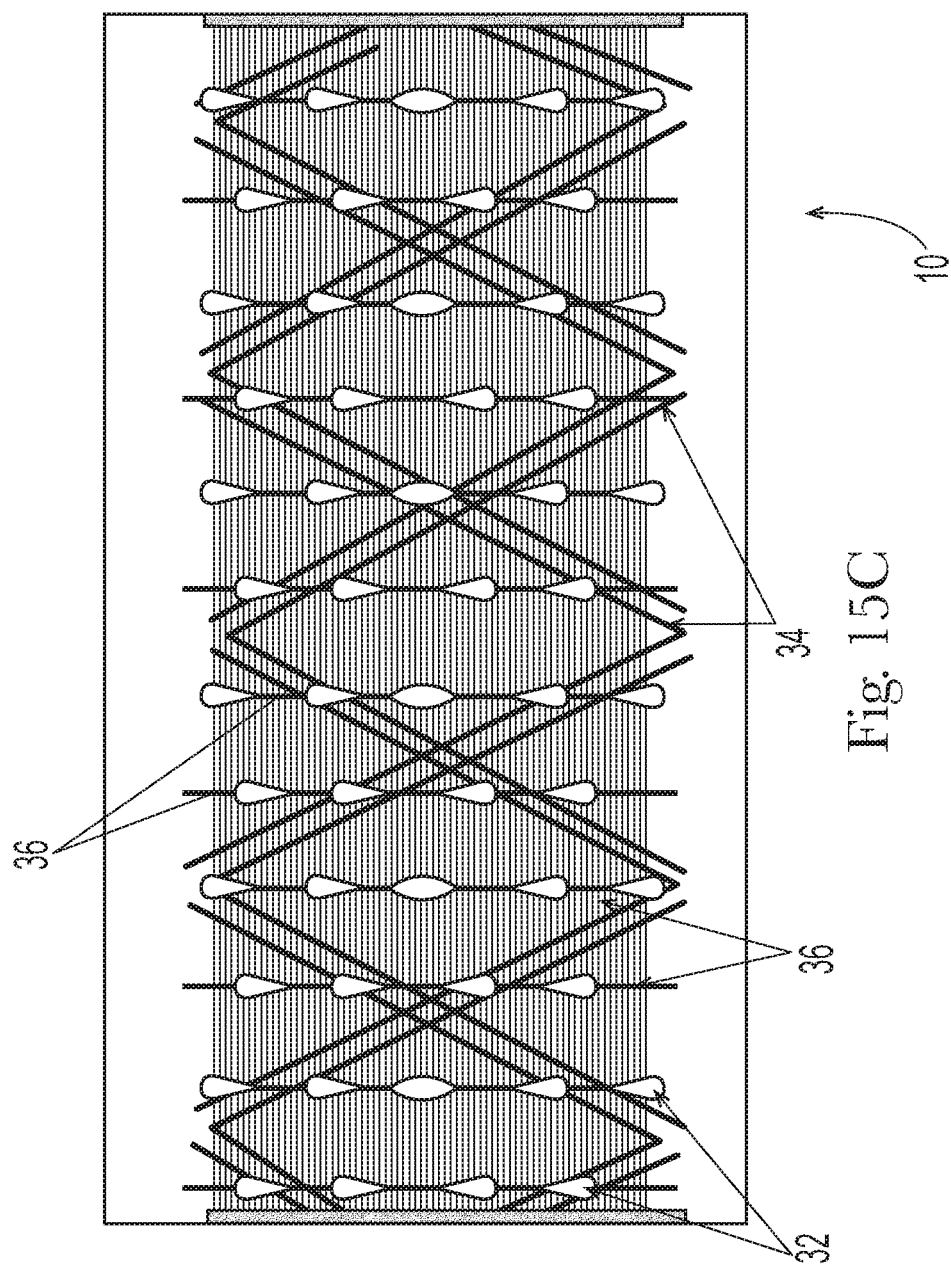
FIG. 15C is a bottom plan view of the cleaning article of FIGS. 15A and 15B.

Referring to FIGS. 15A-15C, the continuous diamond shaped secondary bonds 34 may be paired, to provide more channels to intercept debris. Again, the aforementioned symmetry is retained.

While five full and partial equally spaced diamond shaped secondary bonds 34 are shown, the invention is not so limited. More or fewer secondary bonds 34 of similar or different size and/or spacing may be utilized.

Figure 16A:
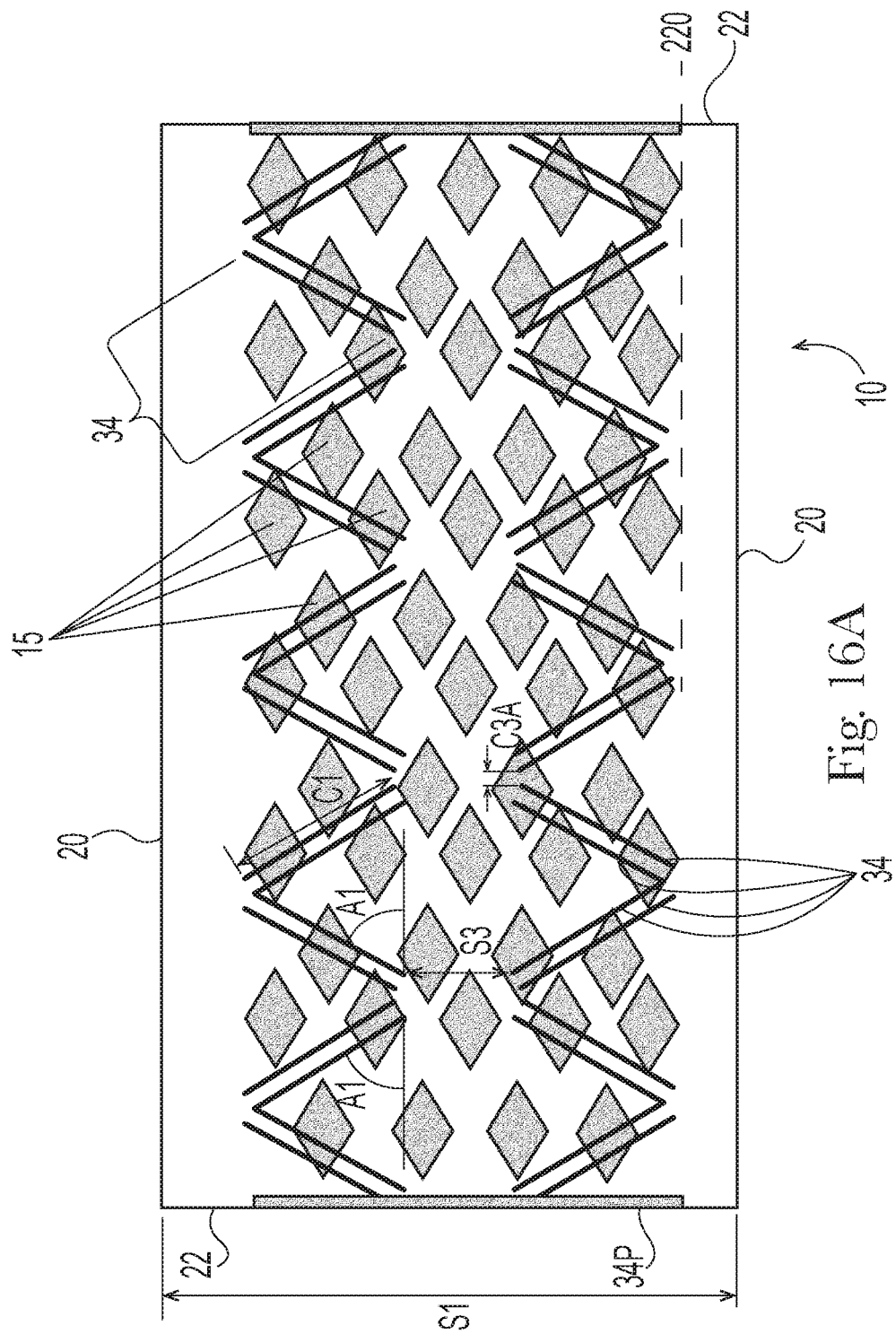
FIG. 16A is a top view of a cleaning article according to the present invention and having discrete tufts represented as diamonds, with paired interrupted secondary bonds forming diamond patterns.
Figure 16B:
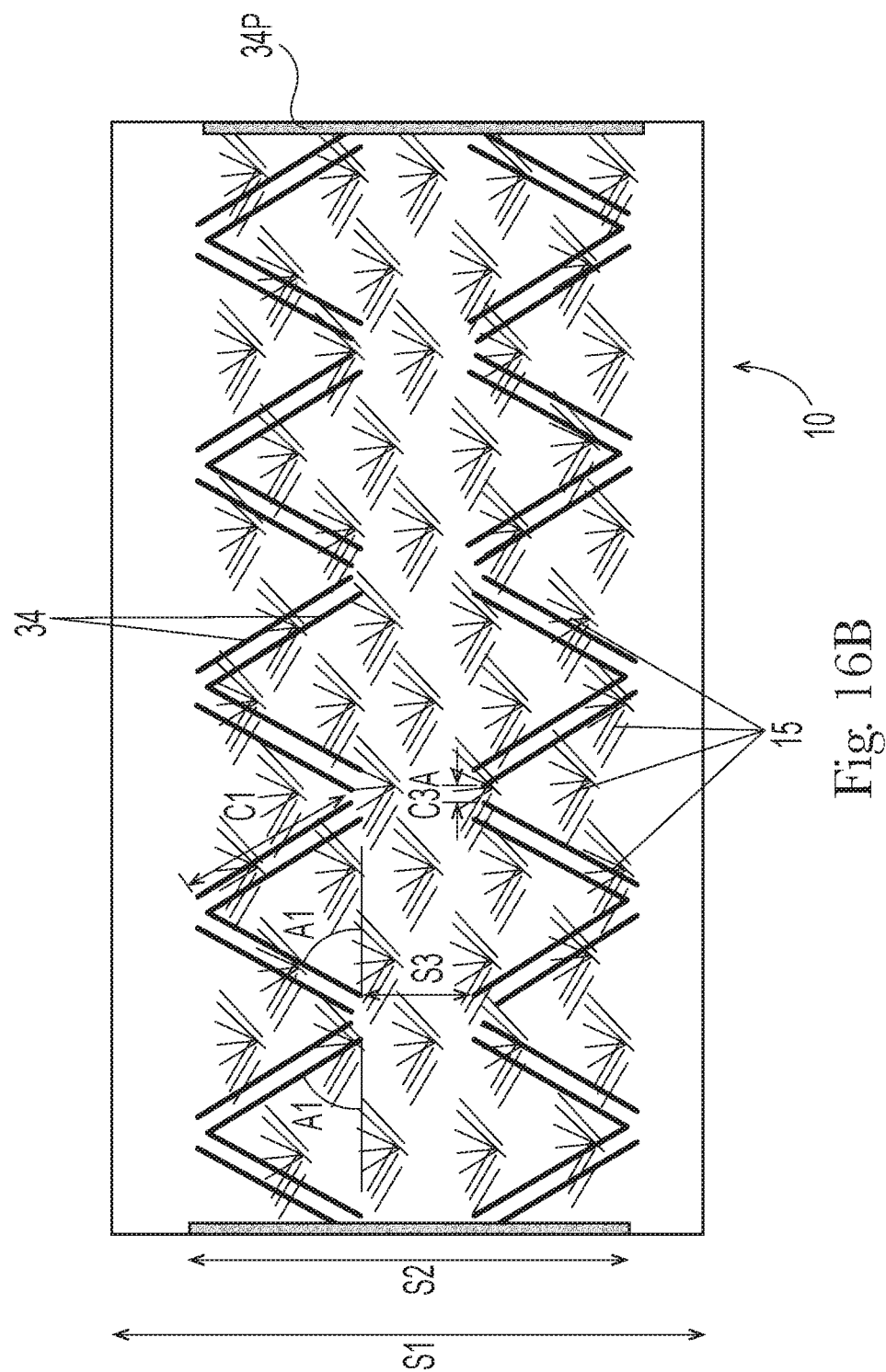
FIG. 16B is a top view of the cleaning article of FIG. 16A having discrete tufts represented with a common proximal end for each tuft.
Figure 16C:
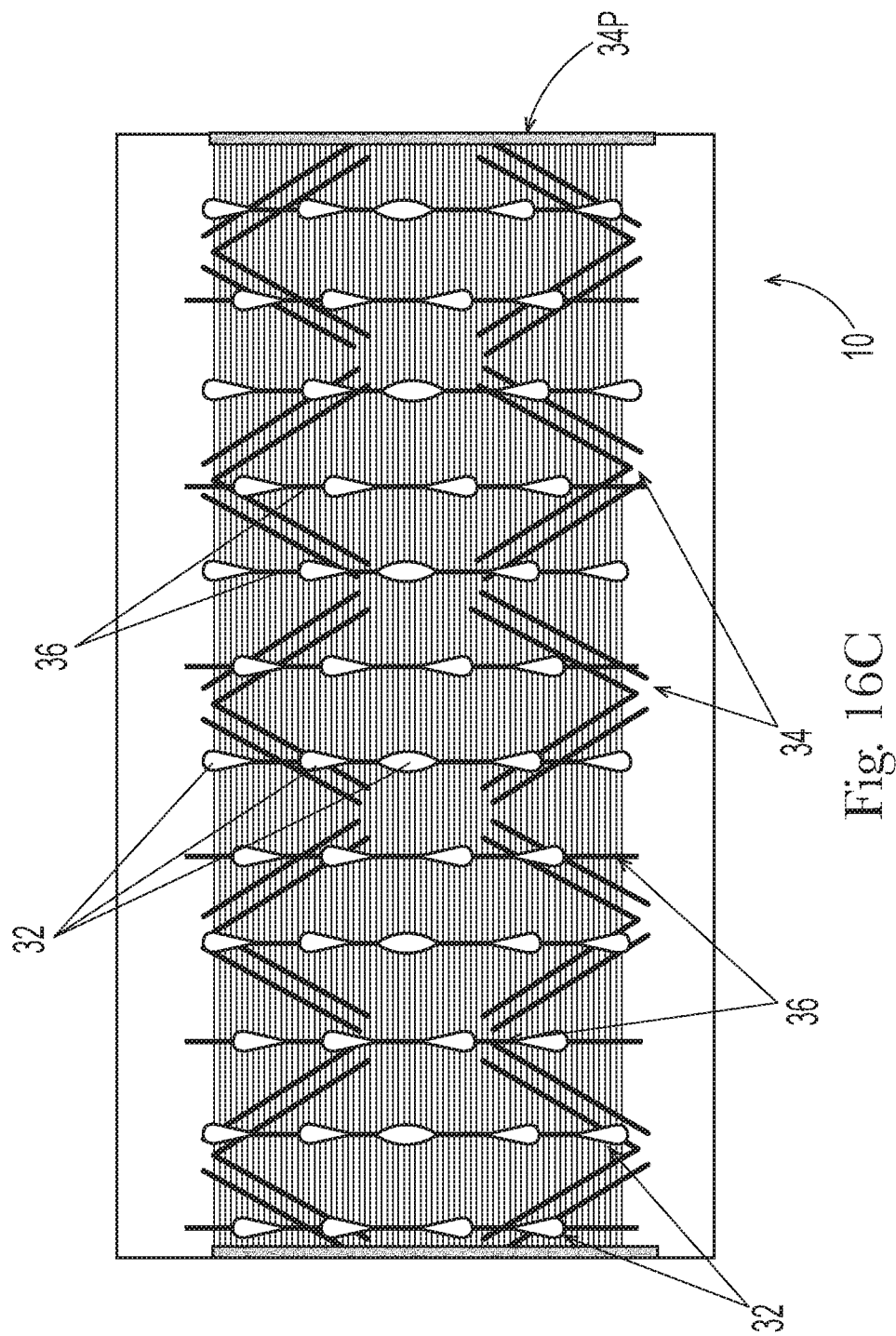
FIG. 16C is a bottom plan view of the cleaning article of FIGS. 16A and 16B.

Referring to FIGS. 16A-16C, the paired secondary bonds 34 may be interrupted, to provide more tuft capacity proximate the longitudinal axis LA. The aforementioned dimensions for the preceding diamond shaped secondary bond 34 embodiments are believed to be suitable.

While 10 full and partial equally spaced diamond shaped secondary bond 34 pairs are shown, the invention is not so limited. More or fewer of similar or different size and/or spacing may be utilized.

Referring to FIGS. 3A-4C, 7A-8C, 11A-12F, 15A-16C and 17, pairs of secondary bonds 34 may be utilized as shown. But the invention is not so limited. Three, four or more secondary bonds 34 may be closely spaced and disposed away from other closely spaced secondary bonds 34. Paired secondary bonds 34, or closely spaced secondary bonds 34 in general, provide the benefit that the thickness of the tufts 15 therebetween is greater than the thickness directly subjacent the secondary bond, and less than the thickness of a tuft 15 which is not bonded. This arrangement provides the benefit that regions of three different thicknesses in the z-direction of the cleaning article 10 are formed.

Figure 17:
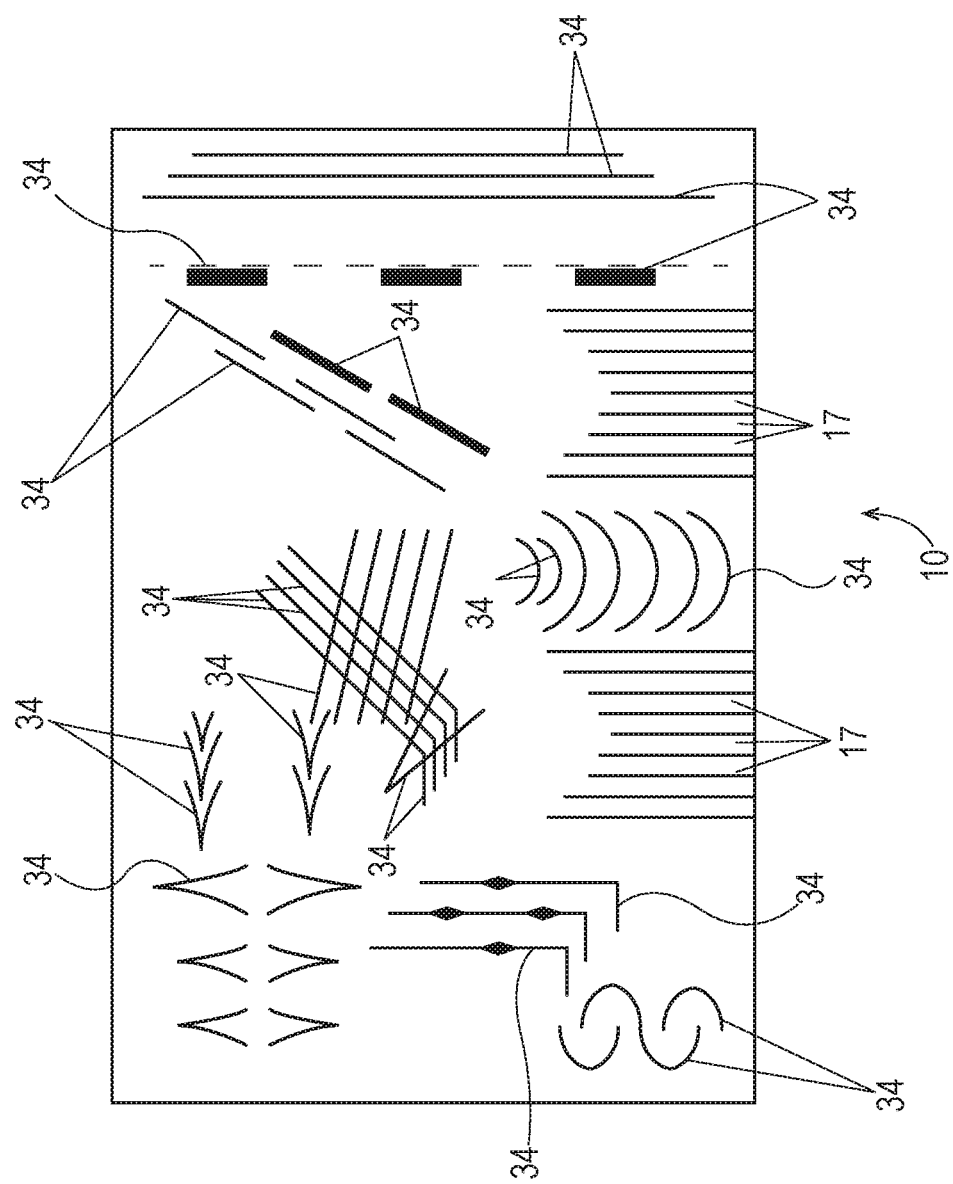
FIG. 17 is a schematic top plan view of a cleaning article according to the present invention and various combinations of the aforementioned secondary bonds, having the tufts omitted for clarity.

Referring to FIG. 17, the secondary bonds 34 may be equally or unequally spaced from adjacent secondary bonds 34. The secondary bonds 34 may be of like geometry, size, angular orientation and shape or may be of mutually different geometry, size, angular orientation and/or shape. The cleaning article 10 may optionally have strips 17. The strips 17 have an aspect ratio of length to width greater than 1. Optionally, an elongate tow fiber rope oriented generally parallel to and optionally coincident the longitudinal axis LA may be used.

Figure 18:
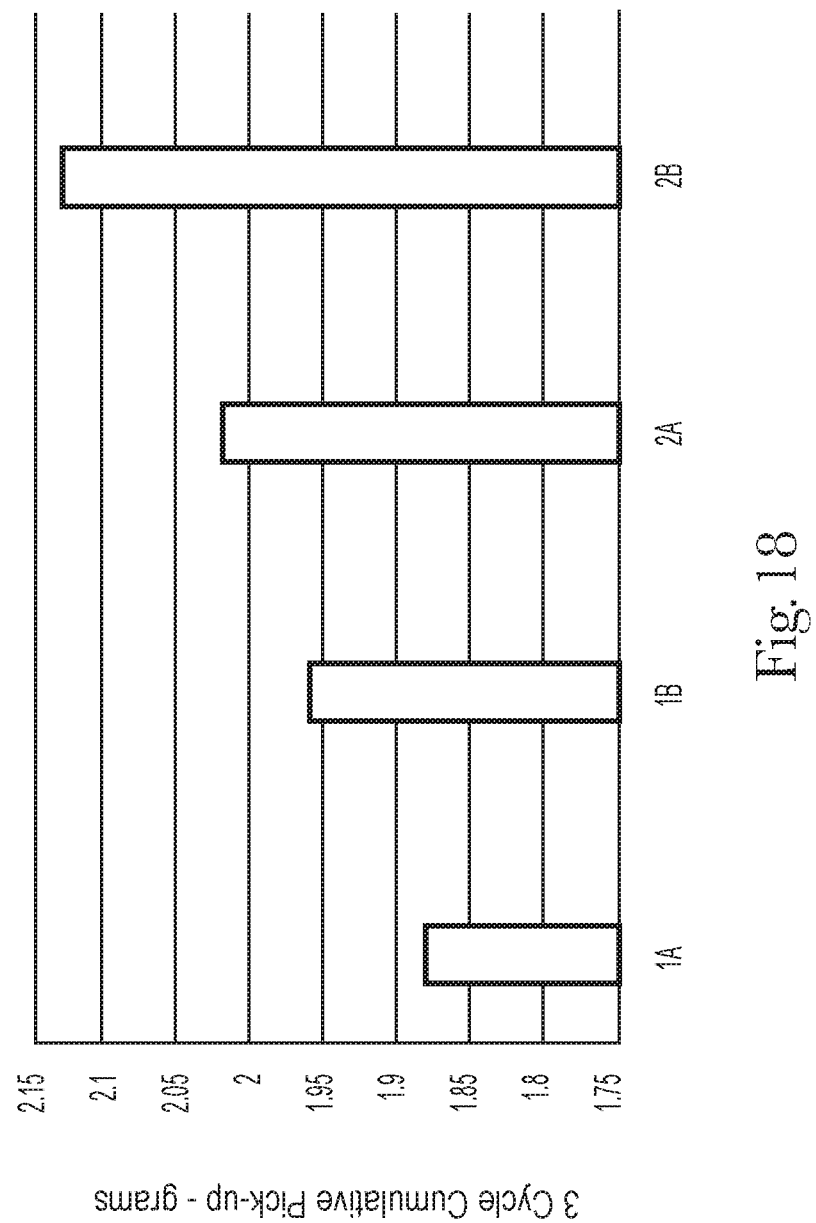
FIG. 18 is a bar graph showing the performance of cleaning articles according to the present invention.

Referring to FIG. 18, uniform grid, tufted cleaning articles according to the prior art having a low level of coating and high level of coating was tested for pickup, as shown by control Samples 1A and 2A, respectively.

Figure 19A:
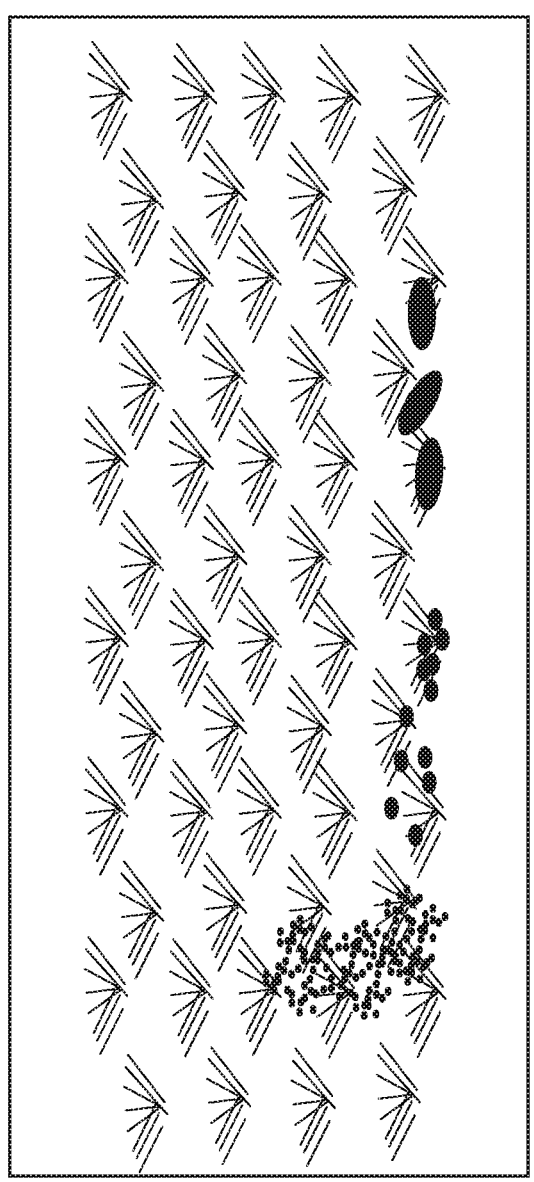
FIG. 19A is a top view of a cleaning article according to the prior art and having discrete tufts disposed in a uniform grid and represented with a common proximal end for each tuft.
Figure 19B:
FIG. 19B is a side elevational view of the cleaning article of FIG. 19A, showing constant thickness of the tufts in the z direction.

Referring to FIGS. 19A-19B, the control cleaning articles were made according to U.S. Pat. No. 8,617,685 and had a uniform grid of tufts 15.

These cleaning articles according to the prior art picked up about 1.88 grams and 2.02 grams of debris respectively.

Two cleaning articles 10 according to the present invention having the same coating levels were also tested, as shown by Samples 1B and 2B, respectively.

The cleaning articles had the bond pattern shown in FIGS. 5A-5C. These cleaning articles 10 secondary bonds 34 which were 4 mm wide on a 30 mm pitch. These cleaning articles 10 according to the present invention unexpectedly picked up about 1.96 grams and 2.13 grams of debris, respectively.

As shown in Table 1 below, the unpredicted improvement in pickup is shown in Table 1 below.

TABLE 1

| Sample | Pickup in Grams | Percentage Improvement over Control |
|---|---|---|
| 1A | 1.88 | Control |
| 1B | 2.02 | 7.4 |
| 2A | 1.96 | Control |
| 2B | 2.13 | 8.7 |

As shown in Table 1, the improvement in pickup is 7.4% for the low coating cleaning article 10 and 8.7% for the high coating cleaning article 10. The average improvement in performance as measured by pickup is 8.05%. An 8% performance improvement is considered significant, as the control cleaning articles according to the prior art are considered to be very efficacious.

Referring to FIG. 20A, the cleaning article 10 may be removably attachable to a cleaning implement 70 for use with dry, wet and/or prewetted cleaning, depending upon the particular task. The cleaning implement 70 may have a head 74 for receiving the cleaning article 10 and an elongate handle 72 joined thereto. A typical floor cleaning implement 70 has a handle 72 for grasping by the user and a head 74 attached thereto, and preferably pivotally attached thereto. The head 74 moves against the floor, or other target surface. The cleaning article 10 may be removably attached to the bottom of the head 74. An attachment system may provide for removable attachment of the cleaning article 10 to a suitable and optional handle 72. Removable attachment of the cleaning article 10 to the implement 70 may be accomplished using adhesive 32, hook and loop systems, elongate sleeves, grippers, etc. Grippers and a suitable cleaning implement 70 are disclosed in commonly assigned U.S. Pat. No. 6,484,356.

Referring to FIG. 20B, the cleaning article 10 may optionally be used with a cleaning solution or other solution usable for other purposes such as treating the surface for appearance or disinfectant, etc. A floor cleaning implement 70 may allow for cleaning of the floor while the user is upright, and may also provide for spraying of cleaning solution or other liquid to the floor from a reservoir 75 through one or more nozzles 76. Suitable spray implements 70 are disclosed in commonly assigned U.S. Pat. Nos. 5,888,006; 5,988,920; 6,842,936; 7,182,537; 7,536,743; 7,676,877 and 8,186,898. The cleaning solution may be pre-applied to the cleaning article 10, creating a pre-moistened cleaning article 10 or may be contained within a separate reservoir 75 for dosing onto the cleaning article 10 and/or target surface. The cleaning solution may comprise a majority water, and at least about 0.5, 2, 5 or 10 weight percent solids, or at least about 30 or 50 weight percent aqueous solvents, non-aqueous solutions or mixtures thereof. A suitable implement 70 having an optional vacuum is disclosed in U.S. Pat. No. 7,137,169.

Referring to FIG. 20C, the implement 70 may have a handle 72 and head 74 used in fixed relationship and comprising one or more tines 73. The tines 73 may be inserted into sleeves in the cleaning article 10. This arrangement allows the cleaning article 10 to be conveniently used as a duster for cleaning small object and tights spaces 31. Suitable implements 70 for a duster type cleaning article 10 are disclosed in commonly assigned U.S. Pat. Nos. 8,578, 564 and D674,949 S.

If desired, the cleaning article 10 may be used with and removably attached to an autonomously moving robot or drone. Suitable examples of robots and drones for use with the cleaning article of the present invention are found in commonly assigned U.S. Pat. Nos. 6,941,199; 6,810,305; 6,779,217; 6,481,515; 6,459,955 and Ser. No. 14/992,195, filed Jan. 11, 2016, P&G Case 14189. Examples of robots for use with wet and dry cleaning are found in U.S. Pat. Nos. 7,389,156; 8,774,966 and 8,855,813. A data control system may be utilized with the cleaning article 10, as described in U.S. Pat. No. 7,431,524.

The cleaning article 10 may also be used manually, without a handle 72 or implement 70. If desired, various cleaning articles 10 described herein may be packaged and sold in a kit. This arrangement provides the benefit that the user has a choice of different cleaning articles 10 for different tasks. For example, if desired, plural sizes of the cleaning articles 10 may be sold together as a single kit. This arrangement allows the user to select the particular cleaning article 10 best suited for the immediate task.

The cleaning article 10 may be made according to any of the following nonlimiting paragraphs in any combination thereof.

A. A cleaning article 10 bounded by edges 20, 22 defining an XY plane and a Z-direction perpendicular thereto, said article 10 comprising:
a carrier sheet having a first side and a second side opposed thereto, and
a plurality of discrete tow fibers joined to said first side of said carrier sheet by a plurality of primary bonds 32 and extending outwardly therefrom in the Z-direction to have a tow thickness in the z-direction, and
at least one elongate secondary bond 34 disposed on at least one plurality of tow fibers and having a secondary bond 34 thickness in the Z-direction, said secondary bond 34 thickness being less than said tow thickness in the Z-direction, said secondary bond 34 bridging at least two adjacent pluralities of tow fibers.

B. A cleaning article 10 bounded by alternating longitudinal and transverse edges 20, 22 defining an XY plane and a Z-direction perpendicular thereto, said article having a longitudinal axis and comprising:
a carrier sheet having a first side and a second side opposed thereto, and
a plurality of discrete spaced apart tufts 15 of tow fibers joined to said first side of said carrier sheet by a plurality of primary bonds 32 and extending outwardly therefrom in the Z-direction to have a tuft 15 thickness in the Z-direction, and
at least one elongate secondary bond 34 disposed in at least one tuft 15 and having a secondary bond 34 thickness in the Z-direction, said secondary bond 34 thickness being less than said tuft 15 thickness, each said secondary bond 34 bridging at least two adjacent tufts 15 of tow fibers.

C. A cleaning article 10 bounded by alternating longitudinal and transverse edges 20, 22 defining an XY plane and a Z-direction perpendicular thereto, having a longitudinal axis and comprising:
a carrier sheet having a first side and a second side opposed thereto, and
a plurality of discrete spaced apart tufts 15 of tow fibers joined to said first side of said carrier sheet by a plurality of primary bonds 32, said tufts 15 having at least one secondary bond 34 therethrough creating a channel at least partially through said plurality of tufts 15 in said XY plane.

D. A cleaning article 10 according to paragraph A wherein said plurality of tow fibers comprises plural lines of tow fibers.

E. A cleaning article 10 according to paragraphs A, B and C wherein said at least one secondary bond 34 comprises a plurality of spaced apart secondary bonds 34.

F. A cleaning article 10 according to paragraphs A, B, C, D and E wherein said at least one secondary bond 34 comprises a plurality of spaced apart secondary bonds 34, said plurality of spaced apart secondary bonds 34 continuously bridging at least three adjacent pluralities of tow fibers.

G. A cleaning article 10 according to paragraphs A, B, C, D, E and F wherein said at least one secondary bond 34 comprises a plurality of secondary bonds 34, said plurality of secondary bonds 34 being heat sealed secondary bonds 34.

H. A cleaning article 10 according to paragraphs A, B, C, D, E, F and G wherein said at least one secondary bond 34 comprises a plurality of secondary bonds 34, said plurality of secondary bonds 34 being ultrasonic secondary bonds 34.

I. A cleaning article 10 according to paragraphs A, B, C, D, E, F, G and H wherein said at least one secondary bond 34 comprises a plurality of secondary bonds 34, said plurality of secondary bonds 34 being of substantially uniform geometry.

J. A cleaning article 10 according to paragraph C wherein said at least one secondary bond 34 comprises a plurality of secondary bonds 34, each said secondary bond 34 of said plurality of secondary bonds 34 extending throughout said tow fibers in a direction transverse thereto.

K. A cleaning article 10 according to paragraphs A, B, C, D, E, F, G, H, I and J wherein said at least one secondary bond 34 comprises a plurality of secondary bonds 34, each said secondary bond 34 of said plurality of secondary bonds 34 being mutually parallel.

L. A cleaning article 10 according to paragraphs A, B, C, D, E, F, G, H, I, J and K wherein said at least one secondary bond 34 comprises a plurality of secondary bonds 34, each said secondary bond 34 of said plurality of secondary bonds 34 being rectilinear and extending throughout said plurality of said tow fibers in a direction transverse thereto.

M. A cleaning article 10 according to paragraphs A, B, C, D, E, F, G, H, I, J, K and L wherein said at least one secondary bond 34 comprises a plurality of secondary bonds 34, each said secondary bond 34 of said plurality of secondary bonds 34 intercepting an edge 220, 222 of said plurality of tufts 15 of tow fibers and extending therefrom to a distal end.

N. A cleaning article 10 according to paragraphs A, B, C, D, E, F, G, H, I, J, K, L and M wherein said at least one secondary bond 34 comprises a plurality of secondary bonds 34, each said secondary bond 34 of said plurality of secondary bonds 34 intercepting a respective edge 220, 222 of said plurality of tufts 15 of tow fibers and extending therefrom to a distal end, said distal end not being coincident said longitudinal axis.

O. A cleaning article 10 according to paragraphs A, B, C, D, E, F, G, H, I, J, K, L, M and N wherein said at least one secondary bond 34 comprises a first plurality of secondary bonds 34 intercepting a first longitudinal edge 220 of said plurality of tufts 15 and extending therefrom to a respective first plurality of distal ends and comprises a second plurality of secondary bonds 34 intercepting a second longitudinal edge 220 of said plurality of tufts 15 and extending therefrom to a plurality of respective second distal ends.

P. A cleaning article 10 according to paragraphs A, B, C, D, E, F, G, H, I, J, K, L, M, N and O wherein said at least one secondary bond 34 comprises a first plurality of secondary bonds 34 intercepting a first longitudinal edge 220 of said plurality of tufts 15 and extending therefrom to a respective first plurality of distal ends and comprises a second plurality of secondary bonds 34 intercepting a longitudinal edge 220 of said plurality of tufts 15 and extending therefrom to a respective second plurality of distal ends, said first plurality of secondary bonds 34 and said second plurality of secondary bonds 34 being arranged in a chevron pattern.

Q. A cleaning article 10 according to paragraphs A, B, C, D, E, F, G, H, I, J, K, L, M, N and O wherein said at least one secondary bond 34 comprises a plurality of secondary bonds 34, each said secondary bond 34 of said plurality of secondary bonds 34 intercepting a said longitudinal edge 220 of said tufts 15 and converging therefrom to a distal end.

R. A cleaning article 10 according to paragraphs A, B, C, D, E, F, G, H, I, J, K, L, M, N and O wherein said at least one secondary bond 34 comprises a plurality of secondary bonds 34, each said secondary bond 34 of said plurality of secondary bonds 34 intercepting a longitudinal edge 220 of said plurality of tufts 15 and extending therefrom to a distal end, said secondary bonds 34 having a constant width of 2 to 12 mm S. A cleaning article 10 according to paragraphs A, B, C, D, E, F, G, H, I, J, K, L, M, N and O wherein said at least one secondary bond 34 comprises a plurality of secondary bonds 34, each said secondary bond 34 of said plurality of secondary bonds 34 intercepting one longitudinal edge 220 of said plurality of tufts 15 and extending generally perpendicular to said longitudinal axis.

T. A cleaning article 10 according to paragraphs A, B, C, D, E, F, G, H, I, J, K, L, M, N and O wherein said at least one secondary bond 34 comprises a plurality of secondary bonds 34, each said secondary bond 34 of said plurality of secondary bonds 34 intercepting one said longitudinal edge 220 of said plurality of tufts 15 and extending diagonally therefrom.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article bounded by alternating longitudinal and transverse edges defining an XY plane and a Z-direction perpendicular thereto, having a longitudinal axis and comprising:
   a carrier sheet having a first side and a second side opposed thereto;
   a plurality of discrete spaced apart tufts of tow fibers, wherein said tow fibers are generally aligned in a longitudinal direction and joined to said first side of said carrier sheet by a plurality of primary bonds, wherein said primary bonds are between slits, wherein said slits extend from one primary bond to an adjacent primary bond in a direction transverse to said longitudinal direction, and wherein said slits are through said carrier sheet and said tow fibers; and
   a plurality of secondary bonds, each said secondary bond extending continuously throughout said tow fibers across a full width of said tow fibers in a direction transverse to said longitudinal direction, wherein each said secondary bond forms an individual channel.

2. A cleaning article according to claim 1 wherein said plurality of secondary bonds are mutually parallel.

3. A cleaning article according to claim 1 wherein said secondary bonds are rectilinear.

4. A cleaning article according to claim 1 wherein said secondary bonds have a constant width of 2 to 12 mm.

5. A cleaning article according to claim 1 wherein said secondary bonds extend generally perpendicular to said longitudinal axis.

* * * * *